US010291056B2

(12) United States Patent
Bell et al.

(10) Patent No.: US 10,291,056 B2
(45) Date of Patent: May 14, 2019

(54) SYSTEMS AND METHODS OF CONTROLLING TRANSMISSION OF WIRELESS POWER BASED ON OBJECT INDENTIFICATION USING A VIDEO CAMERA

(71) Applicant: ENERGOUS CORPORATION, San Jose, CA (US)

(72) Inventors: Douglas Bell, Pleasanton, CA (US); Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 398 days.

(21) Appl. No.: 15/053,292

(22) Filed: Feb. 25, 2016

(65) Prior Publication Data

US 2017/0077764 A1    Mar. 16, 2017

Related U.S. Application Data

(63) Continuation-in-part of application No. 14/861,285, filed on Sep. 22, 2015, now Pat. No. 9,948,135, and
(Continued)

(51) Int. Cl.
*H02J 7/00* (2006.01)
*G06K 9/18* (2006.01)
(Continued)

(52) U.S. Cl.
CPC ............... *H02J 7/025* (2013.01); *G06K 9/18* (2013.01); *G06K 9/52* (2013.01); *G06T 7/60* (2013.01);
(Continued)

(58) Field of Classification Search
CPC .. H02J 7/025; H02J 50/80; H02J 50/90; H02J 50/60
(Continued)

(56) References Cited

U.S. PATENT DOCUMENTS

| 787,412 A | 4/1905 | Tesla |
|---|---|---|
| 3,167,775 A | 1/1965 | Guertler |

(Continued)

FOREIGN PATENT DOCUMENTS

| CN | 203826555 U | 9/2014 |
|---|---|---|
| CN | 104090265 A | 10/2014 |

(Continued)

OTHER PUBLICATIONS

S. Brewster, Here's a New Way to Step Into a Virtual World, readwrite, Mar. 27, 2015, 3 pages.

(Continued)

*Primary Examiner* — M Baye Diao
(74) *Attorney, Agent, or Firm* — Morgan, Lewis & Bockius LLP

(57) ABSTRACT

Embodiments disclosed herein discloses a wireless charging system configured to generate and transmit power waves that, due to physical waveform characteristics converge at a predetermined location in a transmission field to generate a pocket of energy. Receivers associated with an electronic device being powered by the wireless charging system, may extract energy from these pocket of energy and then convert that energy into usable electric power for the electronic device associated with a receiver. The pocket of energy may manifest as a three-dimensional field (e.g., transmission field) where energy may be harvested by a receiver positioned within or nearby the pocket of energy. Video sensors capture actual video images of fields of view within the transmission field, and a processor identifies selected
(Continued)

objects, selected events, and/or selected locations within the captured video images.

20 Claims, 16 Drawing Sheets

Related U.S. Application Data a continuation-in-part of application No. 14/856,337, filed on Sep. 16, 2015.

(60) Provisional application No. 62/387,467, filed on Dec. 24, 2015.

(51) Int. Cl.
| | |
|---|---|
| G06K 9/52 | (2006.01) |
| G06T 7/60 | (2017.01) |
| H04B 5/00 | (2006.01) |
| H02J 7/02 | (2016.01) |
| H02J 7/04 | (2006.01) |
| H02J 50/90 | (2016.01) |
| H02J 50/80 | (2016.01) |
| H02J 50/60 | (2016.01) |
| H04N 5/04 | (2006.01) |
| H04N 7/18 | (2006.01) |

(52) U.S. Cl.
CPC .............. *H02J 7/027* (2013.01); *H02J 7/045* (2013.01); *H02J 50/60* (2016.02); *H02J 50/80* (2016.02); *H02J 50/90* (2016.02); *H04B 5/0037* (2013.01); *H04N 5/04* (2013.01); *H04N 7/18* (2013.01); *H02J 2007/0096* (2013.01)

(58) Field of Classification Search
USPC .......................................... 320/108; 307/104
See application file for complete search history.

(56) References Cited

U.S. PATENT DOCUMENTS

| | | | |
|---|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,183,748 B1 | 2/2007 | Unno et al. |
| 7,191,013 B1 | 3/2007 | Miranda et al. |
| 7,193,644 B2 * | 3/2007 | Carter ................... H04N 7/142 348/14.06 |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,801,645 B2 | 9/2010 | Taylor et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,893,564 B2 | 2/2011 | Bennett |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |

(56) References Cited

U.S. PATENT DOCUMENTS

| | | |
|---|---|---|
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,781,217 B2 | 7/2014 | Gurman et al. |
| 8,786,682 B2 | 7/2014 | Shpunt et al. |
| 8,786,757 B2 | 7/2014 | Shpunt et al. |
| 8,787,663 B2 | 7/2014 | Litvak et al. |
| 8,823,319 B2 | 9/2014 | Von Novak, III et al. |
| 8,824,737 B2 | 9/2014 | Gurman et al. |
| 8,824,781 B2 | 9/2014 | Litvak |
| 8,829,406 B2 | 9/2014 | Akerman et al. |
| 8,832,646 B1 | 9/2014 | Wendling |
| 8,848,039 B2 | 9/2014 | Spektor et al. |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 * | 10/2015 | Zhou ................ G06F 1/163 |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,806,564 B2 | 10/2017 | Leabman |
| 9,819,230 B2 | 11/2017 | Petras et al. |
| 9,866,279 B2 | 1/2018 | Bell et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |

(56) References Cited

U.S. PATENT DOCUMENTS

| | | |
|---|---|---|
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0281435 A1* | 12/2006 | Shearer ............ G06K 19/0707 455/343.1 |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0291165 A1* | 12/2007 | Wang ................... H04N 7/185 348/372 |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |

(56) References Cited

U.S. PATENT DOCUMENTS

| | | |
|---|---|---|
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057606 A1 | 3/2011 | Saunamaki |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |

(56) References Cited

U.S. PATENT DOCUMENTS

| | | |
|---|---|---|
| 2012/0201173 A1 | 8/2012 | Jian et al. |
| 2012/0206299 A1 | 8/2012 | Valdes-Garcia |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0242809 A1* | 9/2012 | White ............... G08G 1/0175 348/51 |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |

(56) References Cited

U.S. PATENT DOCUMENTS

| | | |
|---|---|---|
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | EK et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0236520 A1 | 8/2015 | Baarman |
| 2015/0244070 A1 | 8/2015 | Cheng et al. |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |

(56) References Cited

U.S. PATENT DOCUMENTS

| | | |
|---|---|---|
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0356482 A1* | 12/2015 | Whipple .......... G06Q 10/06313 705/7.23 |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | IM et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0368510 A1* | 12/2016 | Simon .................. B61D 15/12 |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0110914 A1 | 4/2017 | Bell |
| 2017/0134686 A9 | 5/2017 | Leabman |
| 2017/0163076 A1 | 6/2017 | Park et al. |
| 2017/0179763 A9 | 6/2017 | Leabman |

FOREIGN PATENT DOCUMENTS

| | | |
|---|---|---|
| DE | 2000216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 | 9/2011 |
| GB | 2404497 A | 2/2005 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 2004077550 A1 | 9/2004 |
| WO | 2003091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

T. Gill et al., "A System for Change Detection and Human Recognition in Voxel Space Using the Microsoft Kinect Sensor", 2011

(56) References Cited

OTHER PUBLICATIONS

IEEE Applied Imagery Pattern Recognition Workshop, Oct. 2011, 8 pages.
J. Han et al., Enhanced Computer Vision with Microsoft Kinect Sensor: A Review, IEEE Transactions on Cybernetics, vol. 43, No. 5, Oct. 2013, p. 1318-1334.
International Search Report dated Sep. 12, 2014 corresponding to International Patent Application No. PCT/US2014/037072, 3 pages.
International Search Report dated Sep. 15, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Energous Corp., Written Opinion, PCT/US2014/037170, dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec. 29, 2015, 7 pgs.
Energous Corp., IPRP, PCT/US2014/046956, dated Jan. 19, 2016, 7 pgs.
Energous Corp., Written Opinion, PCT/US2014/037072, dated Sep. 12, 2014, 5 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/067291, dated Mar. 4, 2016, 10 pgs.
Energous Corp., IPRP, PCT/US2015/067291, dated Jul. 4, 2017, 4 pgs.
Energous Corp., ISRWO, PCT/US2015/067242, dated Mar. 16, 2016, 9 pgs.
Energous Corp., IPRP, PCT/US2015/067242, dated Jun. 27, 2017, 7 pgs.
Energous Corp., ISRWO, PCT/US2015/067243, dated Mar. 10, 2016, 11 pgs.
Energous Corp., IPRP, PCT/US2015/067243, dated Jun. 27, 2017, 7 pgs.
Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.

(56) References Cited

OTHER PUBLICATIONS

Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP , PCT/US2014/045237, dated Jan. 12, 2016, 12 pgs.
Energous Corp., ISRWO , PCT/US2014/054897, dated Feb. 17, 2015, 10 pgs.
Energous Corp., IPRP , PCT/US2014/054897, dated Mar. 15, 2016, 8 pgs.
Energous Corp., ISRWO , PCT/US2015/067334, dated Mar. 3, 2016, 6 pgs.
Energous Corp., IPRP , PCT/US2015/067334, dated Jul. 4, 2017, 5 pgs.
Energous Corp., ISRWO , PCT/US2014/047963, dated Nov. 7, 2014, 13 pgs.
Energous Corp., IPRP , PCT/US2014/047963, dated Jan. 26, 2016, 10 pgs.
Energous Corp., ISRWO , PCT/US2014/054891, dated Dec. 18, 2014, 12 pgs.
Energous Corp., IPRP , PCT/US2014/054891, dated Mar. 15, 2016, 10 pgs.
Energous Corp., ISRWO , PCT/US2014/054953, dated Dec. 4, 2014, 7 pgs.
Energous Corp., IPRP , PCT/US2014/054953, dated Mar. 22, 2016, 5 pgs.
Energous Corp.,ISRWO , PCT/US2015/067294, dated Mar. 29, 2016, 7 pgs.
Energous Corp.,IPRP , PCT/US2015/067294, dated Jul. 4, 2017, 6 pgs.
Energous Corp.,ISRWO , PCT/US2014/062672 dated Jan. 26, 2015, 11 pgs.
Energous Corp., IPRP , PCT/US2014/062672 dated May 10, 2016, 8 pgs.
Energous Corp.ISRWO, PCT/US2014/044810 dated Oct. 21, 2014, 12 pgs.
Energous Corp., IPRP , PCT/US2014/044810, dated Jan. 5, 2016, 10 pgs.
Energous Corp., ISRWO , PCT/US2015/067271, dated Mar. 11, 2016 6 pgs.
Energous Corp., IPRP , PCT/US2015/067271, dated Jul. 4, 2017, 5 pgs.
Energous Corp., ISRWO , PCT/US2014/040648, dated Oct. 10, 2014, 11 pgs.
Energous Corp., IPRP , PCT/US2014/040648, dated Dec. 8, 2015, 8 pgs.
Energous Corp., ISRWO , PCT/US2014/049673, dated Nov. 18, 2014, 10 pgs.
Energous Corp., IPRP , PCT/US2014/049673, dated Feb. 9, 2016, 6 pgs.
Energous Corp., ISRWO , PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316 , dated Mar. 16, 2017, 15 pgs.
Energous Corp., ISRWO, PCT/US2018/012806 , dated Mar. 23, 2018, 9 pgs.
Energous Corp., ISRWO, PCT/US2017/046800 , dated Sep. 11, 2017, 13 pgs.
Energous Corp., ISRWO, PCT/US2017/065886, dated Apr. 6, 2018, 13 pgs.
Order Granting Reexamination Request Control No. 90013793 Aug. 31, 2016, 23 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
ReExam Ordered Control No. 90013793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.

(56) References Cited

OTHER PUBLICATIONS

European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 9 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.

\* cited by examiner

SYSTEMS AND METHODS OF CONTROLLING TRANSMISSION OF WIRELESS POWER BASED ON OBJECT INDENTIFICATION USING A VIDEO CAMERA

CROSS-REFERENCE TO RELATED APPLICATIONS

This application is a non-provisional application of U.S. Provisional Patent Application Ser. No. 62/387,467, entitled "Systems and Methods of Object Detection in Wireless Power Charging Systems," filed Dec. 24, 2015, which is incorporated by reference herein in its entirety.

This application is a continuation-in-part of U.S. patent application Ser. No. 14/856,337, entitled "Systems and Methods for Wireless Power Charging," filed Sep. 16, 2015, which is incorporated by reference herein in its entirety.

This application is a continuation-in-part of U.S. patent application Ser. No. 14/861,285, entitled "Systems and Methods for Identifying Sensitive Objects in a Wireless Power Transmission Field," filed Sep. 22, 2015, which is incorporated by reference herein in its entirety.

TECHNICAL FIELD

This application generally relates to wireless charging systems and the hardware and software components used in such systems.

BACKGROUND

Numerous attempts have been made to wirelessly transmit energy to electronic devices, where a receiver device can consume the transmission and convert it to electrical energy. However, most conventional techniques are unable to transmit energy at any meaningful distance. For example, magnetic resonance provides electric power to devices without requiring an electronic device to be wired to a power resonator. However, the electronic device is required to be proximately located to a coil of the power resonator (i.e., within a magnetic field). Other conventional solutions may not contemplate user mobility for users who are charging their mobile devices or such solutions do not allow devices to be outside of a narrow window of operability.

Wirelessly powering a remote electronic device requires a means for identifying the location of electronic devices within a transmission field of a power-transmitting device. Conventional systems typically attempt to proximately locate an electronic device, so there are no capabilities for identifying and mapping the spectrum of available devices to charge, for example, in a large coffee shop, household, office building, or other three-dimensional space in which electrical devices could potentially move around. Moreover, what is needed is a system for managing power wave production, both for directionality purposes and power output modulation. Because many conventional systems do not contemplate a wide range of movement of the electronic devices they service, what is also needed is a means for dynamically and accurately tracking electronic devices that may be serviced by the power-transmitting devices.

Wireless power transmission may need to satisfy certain regulatory requirements. These devices transmitting wireless energy may be required to adhere to electromagnetic field (EMF) exposure protection standards for humans or other living beings. Maximum exposure limits are defined by US and European standards in terms of power density limits and electric field limits (as well as magnetic field limits). Some of these limits are established by the Federal Communications Commission (FCC) for Maximum Permissible Exposure (MPE), and some limits are established by European regulators for radiation exposure. Limits established by the FCC for MPE are codified at 47 CFR § 1. 1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$). In addition, there may be a need to avoid transmitting power waves where sensitive objects such as sensitive electronic devices, sensitive computing devices, or sensitive medical equipment may be located.

Accordingly, it is desirable to appropriately administer the systems and methods for wireless power transmission to satisfy these regulatory requirements. What is needed is a means for wireless power transmission that incorporates various safety techniques to ensure that humans or other living beings within a transmission field are not exposed to EMF energy near or above regulatory limits or other nominal limits, and that other sensitive objects are not exposed to EMF energy beyond a nominal limit. What is needed is a means for monitoring and tracking objects within a transmission field in real-time and providing a means for controlling the production of power waves to adaptively adjust to the environment within the transmission field.

SUMMARY

Disclosed herein are systems and methods intended to address the shortcomings in the art and may provide additional or alternative advantages as well. Embodiments disclosed herein may generate and transmit power waves that, as result of their physical waveform characteristics (e.g., frequency, amplitude, phase, gain, direction), converge at a predetermined location in a transmission field to generate a pocket of energy. Receivers associated with an electronic device being powered by the wireless charging system, may extract energy from these pocket of energy and then convert that energy into usable electric power for the electronic device associated with a receiver. The pocket of energy may manifest as a three-dimensional field (e.g., transmission field), where energy may be harvested by receivers positioned within or nearby a pocket of energy. In some embodiments, transmitters may perform adaptive pocket forming by adjusting transmission of the power waves in order to regulate power levels based on inputted sensor data from sensors or to avoid certain objects. One or more techniques for identifying receivers and people in the transmission field may be employed to determine where pocket of energy should be formed and where power waves should be transmitted. In order to identify people, objects, or other items populated within the transmitter's field of view, sensors may generate sensor data and cameras may generate image data and the sensor data and image data may be processed to identify areas that the power waves should avoid. This sensor data and the image data may be an additional or alternative form of device-mapping data generated by the transmitter, indicating where receivers are populated in the transmitter's field of view and where power transmission may be avoided.

In an embodiment, a method for wireless power transmission includes transmitting, by a transmitter, power waves that converge to form constructive interference at a location associated with a receiver. The method further includes generating, by at least one thermal imaging camera in communication with the transmitter, a thermal image of at least a portion of a transmission field of the transmitter. The method further includes identifying, by the transmitter, a living being in the transmission field of the transmitter based upon temperature data in the thermal image. The method further includes determining, by the transmitter, a proximity of the identified living being to the power waves. The method further includes adjusting, by the transmitter, a power level of the power waves upon determining that the proximity of the living being is within a predefined distance from the power waves.

In another embodiment, a transmitter for wireless power transmission includes a thermal imaging camera configured to generate a thermal image of at least a portion of a transmission field of the transmitter. The transmitter further includes a controller configured to receive a thermal image from the thermal imaging cameras, identify a living being in the transmission field of the transmitter based upon temperature data in the thermal image, determine a proximity of the identified living being to power waves generated by the transmitter, and adjust a power level of the power waves upon determining that the proximity of the living being is within a predefined distance from the power waves. In another embodiment, a method for wireless power transmission includes generating, by an imaging sensor in communication with a transmitter, visual imaging data for a living being or sensitive object within at least a portion of a transmission field of the transmitter. The method further includes generating, by at least two ultrasound transducers in communication with the transmitter, ultrasound detection data identifying one or more objects. The method further includes determining, by the transmitter, a location of the living being or the sensitive object in the transmission field based upon the visual imaging data and the ultrasound detection data. The method further includes transmitting, by the transmitter, power waves that converge at a location of a receiver based upon the location of the living being or sensitive object.

In another embodiment, a transmitter for wireless power transmission includes an imaging sensor configured to generate visual imaging data for a living being or sensitive object within at least a portion of a transmission field of the transmitter. The transmitter further includes at least two ultrasound transducers configured to generate ultrasound detection data identifying one or more objects. The transmitter further includes a processor configured to determine a location of the living being or the sensitive object in the transmission field based upon the visual imaging data and the ultrasound detection data, and control transmission of power waves that converge at a location of a receiver based upon the location of the living being or sensitive object.

In another embodiment, a transmitter for wireless power transmission includes an imaging sensor configured to generate visual imaging data in a two-dimensional plane for a living being or sensitive object within at least a portion of a transmission field of the transmitter. The transmitter further includes at least two ultrasound transducers configured to generate ultrasound detection data in a two-dimensional plane identifying one or more objects. The transmitter further includes a processor configured to determine a location of the living being or the sensitive object in the transmission field when a location of the living being or sensitive object in the two-dimensional plane of the visual imaging data corresponds to a location of an object in the two-dimensional plane of the ultrasound detection data, and control transmission of power waves that converge at a location of a receiver based upon the determined location of the living being or sensitive object.

In another embodiment, a system for wireless power transmission includes a video camera for capturing image data of one or more objects in a transmission field of a transmitter configured to transmit wireless power. The system further includes a processor of the transmitter configured to receive the image data from the video camera; and generate symbolic data by processing the image data, wherein the symbolic data corresponds to data represented by a numerical value for each of the one or more objects in the image data.

In another embodiment, a computer-implemented method for wireless power transmission includes capturing, by a video camera, image data of one or more objects in a transmission field of a transmitter configured to transmit wireless power. The computer-implemented method further includes receiving, by a processor of the transmitter, the image data capturing the one or more objects from the video camera. The computer-implemented method further includes generating, by the processor, symbolic data by processing the image data, wherein the symbolic data corresponds to data represented by a numerical value for each of the one or more objects in the image data.

In another embodiment, a system for wireless power transmission includes a video camera for capturing image data of at least a portion of a transmission field of the transmitter where the image data comprises a visual pattern. The system further includes a processor of the transmitter configured to identify an object when the visual pattern matches a pre-stored visual pattern representing the object; and control transmission of one or more power transmission waves based on a location of the identified object.

In another embodiment, a computer-implemented method for wireless power transmission includes generating, by a video camera of a transmitter, image data of at least a portion of a transmission field, wherein the image data comprises a visual pattern. The method further includes identifying, by a processor of the transmitter, an object when the visual pattern matches a pre-stored visual pattern representing the object. The method further includes controlling, by the processor, transmission of one or more power transmission waves based on a location of the identified object.

In another embodiment, a transmitter for wireless power transmission includes an image processor configured to receive image data from a camera and identify a first set of coordinates of an object in the image data with respect to a location of the camera. The transmitter further includes an ultrasound processor configured to receive ultrasound data from at least two ultrasound transducers and identify a second set of coordinates of an object in the ultrasound data with respect to a location of the camera. The transmitter further includes a decision manager processor configured to determine a distance of the object in the first image data from a location of the transmitter based upon the first set of coordinates to the second set of coordinates. The transmitter further includes a set of antennas configured to transmit a power transmission signal based upon the distance of the object in the first image data.

In another embodiment, a transmitter for wireless power transmission includes a first processor configured to receive first image data of a first type from a first sensor and identify a first set of coordinates of an object in the first image data with respect to a location of the first sensor. The transmitter further includes a second processor configured to receive second data of a second type from a set of second sensors and identify a second set of coordinates of an object in the second data with respect to a location of the first sensor. The transmitter further includes a third processor configured to determine a distance of the object in the first image data from a location of the transmitter based upon the first set of coordinates to the second set of coordinates. The transmitter further includes a set of antennas configured to transmit a power transmission signal based upon the distance of the object in the first image data. The functionality of two or more of the first, second, and third processors can be executed by a single processor.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the invention. The present disclosure can be better understood by referring to the following figures. The components in the figures are not necessarily to scale, emphasis instead being placed upon illustrating the principles of the disclosure.

DETAILED DESCRIPTION

Figure 1:
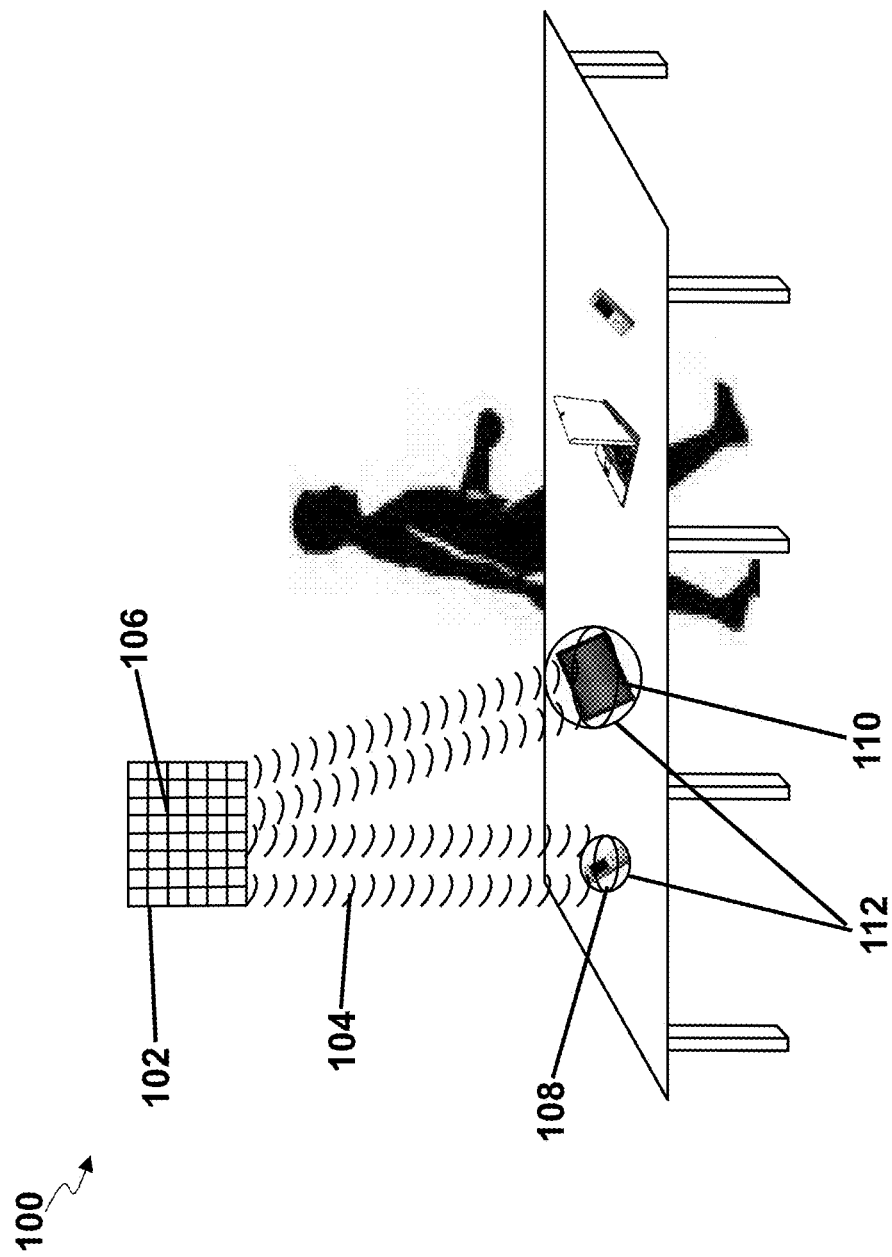
FIG. 1 shows components of an exemplary wireless charging system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

In a wireless power transmission system, the transmitters are devices that comprise, or are otherwise associated with, various components and circuits responsible for, e.g., generating and transmitting power waves, forming pockets of energy at locations in a transmission field, monitoring the conditions of the transmission field, and generating null spaces where needed. The transmitter may generate and transmit power waves for pocket-forming based on location of one or more receivers and/or may execute null steering based on location of one or more objects such as humans, animals, and other sensitive objects within a transmission field of the transmitter. One or more parameters recognizing the location of the receivers and objects, may be determined by a transmitter processor, based on data received from the one or more receivers, one or more video cameras internal to the transmitter, one or more video cameras external to the transmitter, one or more sensors internal to the transmitter, and/or one or more sensors external to the transmitter. With regard to the video cameras of the wireless power transmission system, it should be appreciated that an internal video camera may be an integral component of the transmitter. It should also be appreciated that an external video camera may be a camera that is placed within the transmission field of the transmitter, and may be in wired or wireless communication with one or more other transmitters of the wireless power transmission system. With regard to the sensors of the wireless power transmission system, it should be appreciated that an internal sensors may be an integral component of the transmitter. It should also be appreciated that an external sensor may be a sensor device that is placed within the transmission field of the transmitter, and may be in wired or wireless communication with one or more other transmitters of the wireless power transmission system.

The transmitters may wirelessly transmit power waves having certain physical waveform characteristics, which are particular to the particular waveform technology implemented. The power waves may be transmitted to the receivers within the transmission field of the transmitters in form of any physical media capable of propagating through space and being converted into useable electrical energy for charging the one or more electronic devices. The examples of the physical media may include radio frequency (RF) waves, infrared, acoustics, electromagnetic fields, and ultrasound. The power transmission signals may include any radio signal, having any frequency or wavelength. It should be appreciated by those skilled in the art that the wireless charging techniques are not limited to RF wave transmission techniques, but may include alternative or additional techniques for transmitting energy to the one or more receivers.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Exemplary Components of Wireless Charging Systems

FIG. 1 illustrates a wireless power transmission system 100, according to an exemplary embodiment. The exemplary system 100 may comprise a transmitter 102 comprising an antenna array 106 transmitting power waves 104 to generate pocket of energy 112 in a transmission field of the transmitter 102, and receivers coupled to electronic device 108, 110 and configured to convert energy captured from the pocket of energy 112 into power for the electronic devices 108, 110. Non-limiting examples of the electronic device 108, 110 may include: laptops, mobile phones, smartphones, tablets, music players, toys, batteries, flashlights, lamps, electronic watches, cameras, gaming consoles, appliances, and GPS devices among other types of electrical devices.

The transmitter 102 may be an electronic device comprising a chip or other form of integrated circuit that may generate the power waves 104, such as radio-frequency (RF) waves, whereby at least one RF wave is phase shifted and gain adjusted with respect to at least one other RF wave. The transmitter 102 transmits the power waves 104 from the antenna array 106 to the receivers coupled to or integrated within the one or more electronic devices 108, 110, which in the exemplary system 100 of FIG. 1 include a mobile phone 108 and a laptop 110.

The receiver be an electronic device comprising at least one antenna, at least one rectifying circuit, and at least one power converter, where these components may capture and convert energy from the pocket of energy 112 for powering or charging the electronic device 108, 110, coupled to or comprising the receiver. Moreover, it should be appreciated that receivers may be an integrated or external component of the electronic device 108, 110, or may otherwise be coupled to an electronic device 108, 110.

A microprocessor of the transmitter 102 may control formation and transmission of the power waves 104, such that the power waves 104 converge to form the pocket of energy 112 at a location determined by the microprocessor to be an effective location for providing energy to the receiver, and may also avoid obstacles or people. The pocket of energy 112 (or energy pocket) may be an area or region of space where energy or power may accumulate due to a convergence of the power waves 104, causing constructive interference at that area or region. A pocket of energy 112 may be formed at locations of constructive interference patterns caused by the converging power waves 104 transmitted by the transmitter 102. The pocket of energy 112 may manifest as a three-dimensional field where energy may be captured by the receivers located within or proximate to the pocket of energy 112. The pocket of energy 112 produced by the transmitter 102 during pocket forming processes may be harvested by the receiver, converted to the electrical charge, and then provided as power or voltage to the electronic device 108, 110 (e.g., laptop computer 110, smartphone 108, rechargeable battery) associated with the receiver. In the illustrative embodiment, the pocket of energy 112 is intended in the locations of the electronic devices, such as the mobile phone 108 and the laptop 110. The transmitter 102 is further configured to transmit the power waves 104 that may converge destructively in three-dimensional space to create the one or more nulls (not shown) in the one or more locations where the power waves 104 cancel each other out substantially. The microprocessor of the transmitter 102 may similarly control formation and transmission of the power waves 104 that converge destructively to form the one or more nulls.

In order to form the pocket of energy 112 at a targeted location and provide energy to the receivers coupled to or integrated within the one or more electronic devices (e.g., mobile phone 108, laptop 110), the microprocessor of the transmitter 102 may be further configured to receive one or more parameters indicating the locations of the electronic devices (e.g., mobile phone 108, laptop 110) using the exemplary system components with sensor operations, and based on these one or more parameters, the microprocessor of the transmitter 102 may select an output frequency, phase, or amplitude of the power waves 104, determine which antennas of the antenna array 106 should transmit (thereby defining a shape of actively transmitting antennas), and determine the spacing of between actively transmitting antennas in at least one antenna array of the antenna arrays 106. The microprocessor of the transmitter 102 is further configured to, based on the one or more parameters obtained using the exemplary system components with sensor operations recognizing the location of one or more objects such as humans and animals, select the output frequency, phase, or amplitude of the power waves 104, which antennas of the antenna arrays 106 should transmit, and spacing between antennas in at least one antenna array of the antenna arrays 106 to form the one or more null spaces at the one or more locations of the one or more objects within the transmission field of the transmitter 102. The pockets of energy 112 are formed where the power waves 104 accumulate to form a three-dimensional field of energy, around which one or more corresponding transmission null in a particular physical location may be generated by the transmitter 102.

A receiver may comprise a communications component that may communicate various types of data with the transmitter 102, such as data indicating the receiver's position or location with respect to the transmitter 102. The communications component may be include circuitry that enables the receiver to communicate with the transmitter 102 by transmitting communication signals over a wireless protocol. Non-limiting examples of such a wireless protocol used by the communications component may include Bluetooth®, BLE, Wi-Fi, NFC, and the like. Other examples of data that the communications component may include an identifier for the electronic devices 108, 110 (device ID), battery level information of the electronic devices 108, 110, geographic location data of the electronic devices 108, 110, or other information that may be of use for the transmitter 102 in determining when and where to send the power waves 104 for creating the pocket of energy 112.

The receiver may then utilize the power waves 104 emitted by the transmitter 102 to establish the pocket of energy 112, for charging or powering the electronic devices 108, 110. The receiver may include circuitry for converting the power waves 104 into the electrical energy that may be provided to the electronic devices 108, 110. In other embodiments of the present disclosure, there can be multiple transmitters and/or multiple antenna arrays for powering various electronic equipment for example, may include batteries, smartphones, tablets, music players, toys, and other items.

In some embodiments, the electronic devices 108, 110 may be distinct from the receiver associated with the electronic devices 108, 110. In such embodiments, the electronic devices 108, 110 may be connected to the receiver over a wire that conveys converted electrical energy from the receiver to the electronic devices 108, 110.

After receiving the communication from the receiver by the transmitter 102, the transmitter 102 identifies and locates the receiver. A path is established, through which the transmitter 102 may know the gain and phases of the communication signals coming from the receiver. In addition to the communication signals from the receiver, the transmitter 102 receives still image data and/or video image data, from one or more cameras that are integral components of the transmitter 102 or may be present within the transmission field of the transmitter 102, about the presence of the receiver and the presence of the one or more objects such as humans and animals. The camera may be any video camera that captures image data representative of a period of time in a scene. The video data may refer to a series of frames and associated timing information. The video is used to refer to both a video display, i.e. the display of streamed frames, and also to video data, i.e. the digital information which may be stored or used to produce a video display. The image data may refer to a single complete still image in a sequence of images that creates the illusion of motion within a scene when displayed in rapid succession (streamed). The image data is also used to refer to digital information representative of the single still image. The image data within the video may be associated with a brief period of time, often generating multiple frames per second. The image data is then converted by the transmitter 102 into a suitable format to accurately identify the location of the receiver and/or the one or more objects within the transmission field of the transmitter 102. In some embodiments, the transmitter 102 may also receive data from the one or more internal sensors or externally coupled sensors of the transmitter 102, data about the location of the receivers and/or the location of the one or more objects or obstacles, such as human beings, tables, and animals. The camera may capture image data, including still images or video images using ultrasound, infrared, thermal, magnetic resonance (MRI), visible light, or the like.

Based on any combination of the various types of data that may be received from the one or more cameras, internal sensors, external sensors, heating mapping data, and communication signals from the receiver, the microprocessor of the transmitter 102 may determine the one or more parameters for generating the power waves 104, which will be used as the data inputs when the microprocessor proceeds to determine how to effectively produce the pocket of energy 112 at the targeted locations. For instance, after the determination of the one or more parameters, the transmitter 102 may then select a type of waveform for the power waves 104 to be transmitted (e.g., chirp waves), and an output frequency of the power waves 104, which the transmitter 102 then transmits to generate the pocket of energy 112 at the targeted locations within the transmission field of the transmitter 102.

In some embodiments, in addition to selecting the type of the power waves 104, and determining the output frequency of the power waves 104, the transmitter 102 may also select a subset of antennas from a fixed physical shape of the antenna array 106 that corresponds to a desired spacing of antennas, which will be used to generate the pocket of energy 112 at the targeted locations within the transmission field of the transmitter 102. After the selection of the output frequency, phase, or amplitude of the power waves 104, which antennas of the antenna array 106 are transmitting, and spacing between antennas in each of the one or more antenna arrays 106, the antennas of the transmitter 102 may start to transmit the power waves 104 that may converge in the three-dimensional space. These power waves 104 may also be produced by using an external power source and a local oscillator chip using a piezoelectric material. The power waves 104 are constantly controlled by the microprocessor of the transmitter 102, which may also include a proprietary chip for adjusting phase and/or relative magnitudes of the power waves 104. The phase, gain, amplitude, frequency, and other waveform features of the power waves 104 are determined based on the one or more parameters, and may serve as one of the inputs for the antennas to form the pocket of energy 112.

Exemplary Transmitter Device

Figure 2:
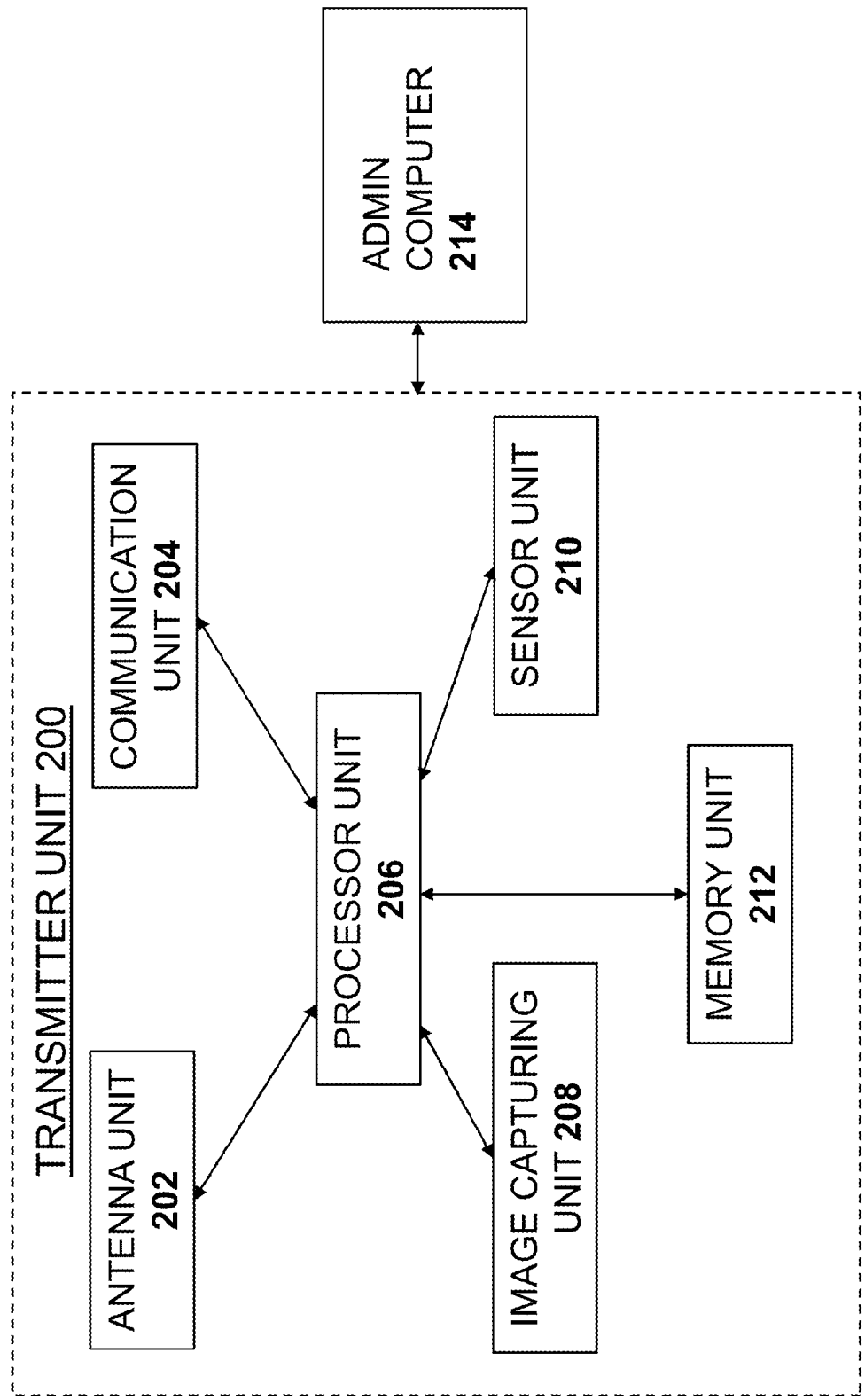
FIG. 2 shows an exemplary transmitter of a power transmission system, according to an exemplary embodiment.

FIG. 2 illustrates a transmitter 200 of a wireless power transmission system, according to an exemplary embodiment. The wireless power transmission system includes the transmitter 200 and an admin computer 214 (also referred to as administrator computer). The transmitter 200 includes antennas 202, a communication component 204, a processor 206, cameras 208, sensors 210, and a memory 212. The transmitter 200 may send various types of waves such as power waves into a transmission field of the transmitter 200. The transmission field of a transmitter 200 may be a two or three-dimensional space into which the transmitter 200 may transmit the power waves.

The transmitter 200 may be designed to function as a single transmitter. In another embodiment, there may be a plurality of transmitters where each of the plurality of transmitters are designed to work independently. The transmitter 200 may include or be associated with the processor 206 (or a microprocessor). The processor may control, manage, and otherwise govern the various processes, functions, and components of the transmitter 200. The processor 206 implements a system to control the operations of the transmitter 200. The processor may be an integrated circuit that includes logic gates, circuitry, and interfaces that are operable to execute various processes and tasks for controlling the behavior of the transmitter 200 as described herein. The processor may comprise or implement a number of processor technologies known in the art; non-limiting examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor, among others. The processor may also include a Graphics Processor (GPU) that executes the set of instructions to perform one or more processing operations associated with handling various forms of graphical data, such as data received from a visual or thermal camera, or to produce a graphical user interface (GUI) allowing a user to configure and manage operation of the transmitter 200.

The processor 206 may be configured to process and communicate various types of data (e.g., image data and/or video data obtained from video cameras of the cameras 208, and/or sensor data obtained from the sensors 210). Additionally or alternatively, the processor 206 may manage execution of various processes and functions of the transmitter 200, and may manage the components of the transmitter 200. In one example, the processor 208 may process the image data and/or video data of one or more objects captured by the cameras 208, to identify human objects and/or receivers that may inhabit the transmission field of the transmitter 200. In another example, the processor may process the sensor data of one or more objects captured by the sensors 210, to identify human objects and/or receivers that may inhabit the transmission field of the transmitter 200. In yet another example, the processor 208 may generate heat-mapping data from communications signals received by the communications component 204, and then, based upon the sensor data received from the sensor 210, the processor 208 may determine the safest and most effective characteristics for the power waves. Additional discussion and examples of functions related to determining how to formulate and transmit power waves, in order to effectively and safely provide energy to receivers, may be found in U.S. patent application Ser. No. 14/856,337, entitled "Systems and Methods for Wireless Power Charging," filed Sep. 16, 2015.

In an embodiment, the transmitter 200 corresponds to a single transmitter that may include a single transmitter processor. However, it should be appreciated that, in some cases, a single transmitter processor may control and govern multiple transmitters. For example, the transmitters may be coupled to the admin computer 214 comprising a processor that executes software modules instructing the processor of the admin computer 214 to function as the transmitter processor capable of controlling the behavior of the various transmitters. Additionally or alternatively, the single transmitter 200 may include multiple processors configured to execute or control specified aspects of the transmitter's behavior and components. For example, the transmitter 200 may include an image processing processor and a sensor processor, where the sensor processor is configured to manage the sensors 210 and process sensor data, and where the image processing processor is configured to process the image data produced by the cameras 208 as well as manage the remaining functions of the transmitter 200.

It should be appreciated that the wireless power transmission system may include any number of transmitters, such as a first transmitter and a second transmitter, which may transmit the power waves into one or more transmission fields of the transmitters. As such, the wireless power transmission system may include multiple discrete transmission fields associated with the transmitters, where the transmission field may or may not overlap, but may be managed discretely by the processors of the transmitters. Additionally or alternatively, the wireless power transmission system may include transmission fields that may or may not overlap, but may be managed by the processors of the transmitters as a unitary transmission field.

The antennas 202 may be attached to antenna arrays. In an embodiment, each antenna array may include a set of one or more antennas configured to transmit one or more types of the power waves. In some embodiments, the antenna array may include antennas 202 (antenna elements), and one or more integrated circuits controlling the behavior of the antennas, such as generating the power waves having predetermined characteristics (e.g., amplitude, frequency, trajectory, phase). An antenna of the antenna array may transmit the power waves having the predetermined characteristics, such that the power waves arrive at a given location within the transmission field, and exhibit those characteristics. The antennas of the antenna array may transmit the power waves that intersect at the given location (generally, where a receiver is recognized based on the image data obtained from the cameras 208 and/or the sensor data obtained from the sensors 210), and due to their respective characteristics, form a pocket of energy, from which the receiver may collect energy and generate electricity. It should be appreciated that, although the exemplary wireless power transmission system describes radio-frequency based power waves, additional or alternative transmitter antennas, antenna arrays, and/or wave-based technologies may be used (e.g., ultrasonic, infrared, magnetic resonance) to wirelessly transmit the power waves from the transmitter 200 to the receiver. In an alternative embodiment using ultrasound for transmitting power waves, the antennas 202 are configured as transducers, and other components may be modified to accommodate the differences between RF and ultrasound transmission and reception.

The transmitter 200 may use the image data and/or the video data to determine where and how the antennas 202 should transmit the power waves. In another embodiment, the transmitter 200 may use the sensor data to determine where and how the antennas 202 should transmit the power waves. In yet another embodiment, the transmitter 200 may use the image data, the video data, and the sensor data to determine where and how the antennas 202 should transmit the power waves. The image data, the video data, and/or the sensor data may indicate for the transmitter 200 where the power waves should be transmitted and the pocket of energy should be formed, and, in some cases, where the power waves should not be transmitted. In an embodiment, the image data and/or the video data may be captured by the cameras 208, and interpreted by the processor 206 associated with the transmitter 200, from which the transmitter 200 may determine how the antennas 202 should form and transmit the power waves. The sensor data may be captured by the sensors 210, and interpreted by the processor 206 associated with the transmitter 200, from which the transmitter 200 may determine how the antennas 202 should form and transmit the power waves. When determining how the power waves should be formed, the transmitter 200 determines the characteristics for each of the power waves to be transmitted from each of the respective antennas of the antennas 202. The non-limiting examples of characteristics for the power waves may include: amplitude, phase, gain, frequency, and direction, among others. As an example, to generate the pocket of energy at a particular location, the transmitter 200 identifies a subset of antennas from the antennas 202, transmits the power waves to the predetermined location, and then the transmitter 200 generates the power waves. The power waves transmitted from each antenna of the subset may have a comparatively different, e.g., phase and amplitude.

The antennas 202 may include one or more integrated circuits that are associated with the antennas 202 to generate the power waves. In some embodiments, integrated circuits are found on antennas 202 that house an integrated circuit and the antennas 202 associated with the integrated circuit. An integrated circuit may function as a waveform generator for an antenna associated with the integrated circuit, providing the appropriate circuitry and instructions to the associated antenna so that the antenna may formulate and transmit the power waves in accordance with the predetermined characteristics identified for the power waves based on the image data or some other data. The integrated circuits may receive instructions from the processor 206 (e.g., transmitter processor) that determines how the power waves should be emitted into the transmitter's transmission field. The processor 206, for example, may determine where to form a pocket of energy based on the image data and then may instruct the integrated circuits of the antennas 202 to generate the power waves. The integrated circuits may then formulate the power waves and instruct their respectively associated antennas to transmit the power waves into the transmission field accordingly.

The communication component 204 may effectuate wired and/or wireless communications to and from receivers of the wireless power transmission system. In one embodiment, the communications component 204 may be an embedded component of the transmitter 200; and in another embodiment, the communication component 204 may be attached to the transmitter 200 through any wired or wireless communications medium. In some embodiments, the communications component 204 may be shared among a plurality of transmitters, such that each of the transmitters 200 coupled to the communication component 204 may use the data received within a communications signal, by the communication component 204.

In some embodiments, the communication component 204 may include electromechanical components (e.g., processor) that allow the communication component 204 to communicate various types of data with one or more receivers, other transmitters of the wireless power transmission system, and/or other components of the transmitter 200. In some implementations, these communications signals may represent a distinct channel for hosting communications, independent from the power waves. The data may be communicated using communications signals, based on predetermined wired or wireless protocols and associated hardware and software technology. The communication component 204 may operate based on any number of communication protocols, such as Bluetooth®, Wireless Fidelity (Wi-Fi), Near-Field Communications (NFC), Zig-Bee, and others. However, it should be appreciated that the communication component 204 is not limited to radio-frequency based technologies, but may include radar, infrared waves.

The data contained within the communications signals may be used by the wireless-charging devices to determine how the transmitter 200 may transmit safe and effective power waves that generate a pocket of energy, from which the receiver may capture energy and convert it to useable alternating current or direct current electricity. In one embodiment, using the communications signal, the transmitter 200 may communicate data that may be used, e.g., to identify receivers within the transmission field, determine whether electronic devices or users are authorized to receive wireless charging services from the wireless power transmission system, determine safe and effective waveform characteristics for the power waves, and hone the placement of pocket of energy, among other possible functions.

The cameras 208 may include one or more video cameras. The cameras 208 may be configured to capture image data in the transmission field of the transmitter 200, and then transmit the image data to the processor 206 of the transmitter 200. The cameras 208 may further be configured to capture image data in their field of view that overlapping the transmission field of the transmitter 200, and then transmit the image data to the processor 206 of the transmitter 200. In one exemplary embodiment, the image data may be raw image data. It is intended that the image data is not limited to the raw image data, and the image data can include data that is processed by a processor associated within the cameras 208 or an external processor such as the processor 206 of the transmitter 200, or any other suitable processor. The raw image data may include frames derived from the cameras 208, and the processed image data may include for example symbolic data based upon the image data (or the raw image data). In one example, the one or more video cameras may provide the raw image data such as image/frame captures of the transmission field of the transmitter 200 that may include receivers, humans, animals, and furniture present within the transmission field; and the processed image data from the one or more video cameras may include an orientation in X-plane, Y-plane, and Z-plane, and as well as a determination of the location of the receivers or a location of one or more receiver antennas, which may be based upon any number of features, characteristics, or current states of the receiver, such as data indicating an orientation of the receiver. In another example, the raw image data from the video camera of the cameras 208 may provide thermal imaging information, and the processed image data may include an identification of the person or animal based upon the thermal imaging information obtained from the captured temperature data. As used herein, any reference to image data or raw image data can include data processed at the processor 206 or other processing device.

The one or more video cameras may include infrared cameras, thermal cameras, ultrasound cameras, and visible light cameras. The infrared camera of the one or more video cameras are configured to produce the image data comprising an infrared image of a scene within the transmission field using only energy in an infrared portion of an electromagnetic spectrum. The images obtained using the infrared camera may assign colors or gray-levels to pixels composing the scene based on the intensity of an infrared radiation reaching the infrared camera or infrared camera's sensor elements. The resulting infrared image may be based on target's temperature; and the colors or levels displayed by the infrared camera typically correspond to the visible-light colors of the scene, to accurately relate features of interest (e.g. humans, animals, receivers) in the infrared scene with their corresponding locations in the visible-light scene.

The thermal camera of the one or more video cameras corresponds to thermal imaging cameras. The thermal imaging cameras uses an infrared spectrum to detect radiation coming from a determined area under control such as the transmission field of the transmitter 200 and, based on the intensity of this radiation, there is a forming up of a map of temperatures in the zones placed under control. The detection activity, using the thermal imaging cameras, may be done continuously or dynamically in such a way that a passage of a flow of the one or more objects can be examined in real time. In other words, the one or more thermal imaging cameras control access zones transiting objects have to pass through; and these cameras use the infrared spectrum of the radiation received to assess the temperature gradients in the transmission field of the transmitter 200 under control.

The operation of the thermal imaging camera may be similar to a standard camera that forms an image using visible light. In comparison with a visible light camera, which forms images with the 400-700 nanometer range of visible light, the thermal camera operate in wavelengths as long as 14,000 nm (14 μm). The thermal camera may include a near-infrared camera that use the near-infrared part of the electromagnetic spectrum closest to visible light, and a thermal infrared camera that generally operate in the far infrared region. Thermal imaging, or thermography may rely on the principle that all objects emit a certain amount of black body radiation as a function of their temperatures. The higher an object's temperature, the more infrared radiation is emitted as black-body radiation, and the thermal cameras may be configured to detect the radiation in a way similar to the way an ordinary camera detects visible light. In an embodiment, there is a constant heat exchange between human body and environment due to differences in their temperatures. The radiation characteristics of any object can be analyzed using the black-body radiation curve governed by Planck's Law. Essentially all of the radiation of the human body is in the infrared region, with the peak radiation occurring at 9.55 μm. These parameters are well suited to detection by the thermal cameras.

In one embodiment, the transmitter 200 may include a single video camera 208. In another embodiment, the transmitter 200 may include an array of video cameras 208. The video cameras may include infrared cameras, thermal cameras, ultrasound cameras, and visible light cameras. The array of video cameras may be positioned for viewing a region of the transmission field of the transmitter 200. The region of interest may correspond to camera field view in the transmission field of the transmitter 200. The array of video cameras may be arranged in a linear array in the transmitter 200. In an alternate embodiment, the various other spatial arrangements including two-dimensional arrays of video cameras may be used.

When multiple cameras are used, each camera may be placed offset from the other cameras such that each camera has a different, possibly partially overlapping, viewpoints. Having cameras placed with offset spacing between them allows for computer vision algorithms to perform calculations and infer relative distances of objects in the two dimensional images captured by each camera.

The transmitter 200 may have a trigger unit that may include a triggering mechanism to initiate capture of a set of frames by the one or more video cameras of the cameras 208. In one embodiment, the triggering mechanism may include a central clock signal and an optional signal delivery unit. The central clock signal is delivered via the signal delivery unit to the one or more video cameras of the cameras 208. In another embodiment, it is also possible to deliver the central clock signal directly to the one or more video cameras of the cameras 208 either by a physical connection or by a wireless connection. In other embodiments, the one or more video cameras of the cameras 208 may have their own internal synchronized clocks. A person of skill in the art will recognize that there are many ways to provide clock signal for the one or more video cameras of the cameras 208 of the transmitter 200 and will appreciate how to adjust the configuration of the transmitter 200 depending on the actual way in which clock signal is generated and distributed to the one or more video cameras of the cameras 208.

In some embodiments, the processor 206 may be configured to combine and process data captured by the one or more cameras to generate an output of symbolic data. For examples, symbols may be a numerical value such as X, Y, Z coordinates of objects captured in the data, or temperature value that may be represented in numbers. The symbolic data may be obtained by processing the data (image data and/or video data). The processed image data will produce symbolic data that may include number of one or more objects captured in the image data, two-dimensional coordinates of the one or more objects captured in the image data, three-dimensional (XYZ) coordinates of the one or more objects (such as receivers and humans) captured in the image data, motion status of the one or more objects, and size of the one or more objects. The one or more objects may include receivers and humans. In another embodiment, the symbolic data may include three-dimensional (XYZ) coordinates of only one or more receivers, size of the one or more receivers, and angular orientation of the one or more receivers with respect to the transmitter captured in the image data.

In some embodiments, the image data obtained by the thermal imaging camera may include a map of temperatures (temperature data) of the transmission field of the transmitter 200. During the step of identifying subjects from the image data, the processor 206 analyzes the map of temperatures to identify a zone of interest that includes temperature values that correspond to body temperature values of the subjects being identified. For example, if the subject being identified is a human, then the processor 206 may look for the zone of interest in the map that includes the temperature centered in the range of the temperature of the human body, i.e., between 35 and 40 degrees Celsius, 36-37 degrees Celsius being the nominal temperature, but the range can be expanded to include other living beings. After identifying the subjects, the processor 206 then generates the symbolic data that may include the number of the identified subjects, three-dimensional (XYZ) coordinates of the identified subjects (such as receivers and humans), motion status of the identified subjects, size of the identified subjects, and shape of the identified subjects. In other words, the body temperature of a humans is measured by the thermal imaging camera. The analysis of thermal images captured by the thermal imaging camera by the processor 206 can then distinguish human beings or other living beings from other parts of the thermal images based on detection of predetermined ranges of typical body temperatures. When viewed through the thermal imaging camera, warm objects stand out well against cooler backgrounds; humans and other warm-blooded animals become easily visible against the environment, during day or night.

The processor 206 analyzes the map of temperatures to identify a zone of interest that includes temperature values that correspond to the body temperature values of the subjects (human body) being identified. The identification of the zone of interest by the processor 206 may also depend upon the place in the body at which the measurement is made, the time of day, as well as the activity level of the person. For example, the typical cited values mentioned of temperatures of a human are: oral (under the tongue): 36.8±0.4° C. (98.2±0.72° F.); internal (rectal, vaginal): 37.0° C. (98.6° F.). The body temperature of a healthy person may vary during the day by about 0.5° C. (0.9° F.) with lower temperatures in the morning and higher temperatures in the late afternoon and evening; and body temperature also changes when a person is hungry, sleepy, sick, or cold. Other warm blooded animals may have different body temperatures than human body temperatures. For example, typical cited values of body temperatures include: dogs: 37.9-39.9° C. (100.2-103.8° F.); cats: 38.1-39.2° C. (100.5-102.5° F.); dairy cows: 38.0-39.3° C. (100.4-102.8° F.).

The sensors 210 may include sensors that may be physically associated with the transmitter 200 (i.e., connected to, or a component of), or devices may be configured to detect and identify various conditions of the wireless power transmission system and/or transmission field, and the sensor data may then be generated for the transmitter 200, which may contribute to the generation and transmission of power waves by the transmitter 200. The sensor data may help the transmitter 200 determine various modes of operation and/or how to appropriately generate and transmit the power waves, so that the transmitter 200 may provide safe, reliable, and efficient wireless power to receivers. As detailed herein, the sensors 210 may transmit sensor data collected during sensor operations for subsequent processing by the processor 206 of the transmitter 200. Additionally or alternatively, one or more sensor processors may be connected to or housed within the sensors 210. The sensor processors may include a microprocessor that executes various primary data processing routines, whereby the sensor data received at the transmitter processor has been partially or completely pre-processed as useable mapping data for generating power waves.

The sensors 210 may transmit sensor data to the transmitter 200. Although described in the exemplary embodiment as raw sensor data, it is intended that the sensor data is not limited to raw sensor data and can include data that is processed by a processor associated with the sensor, processed by the receiver, processed by the transmitter, or any other processor. The sensor data can include information derived from the sensor, and processed sensor data can include determinations based upon the sensor data. The processor 206 can process sensor data received from a sensor of the transmitter or a sensor of a receiver (e.g., a gyroscope, accelerometer). For example, a gyroscope of a receiver may provide raw data such as an orientation in X-plane, Y-plane, and Z planes. In this example, the processor 206 may generate processed sensor data from the gyroscope, which the processor 206 may use to determine a location of a receiver antenna based upon the orientation of the receiver. In another example, raw sensor data from an infrared sensor of a receiver, and processed sensor data may determine presence of a person based upon the thermal sensor data. As used herein, any reference to sensor data or raw sensor data can include data processed at the sensor or other device. In some implementations, a gyroscope and/or an accelerometer of the receiver or electronic device associated with the receiver may provide sensor data indicating the orientation of the receiver or electronic device, which the transmitter 200 may use to determine whether to transmit power waves to the receiver. The receiver may then transmit this sensor data to the transmitter 200, via communications waves. In such implementations, the transmitter 200 may transmit the power waves to the location of the receiver until the transmitter 200 receives, via communications waves, the sensor data produced by the gyroscope and/or accelerometer, indicating that the receiver or electronic device is in motion or has an orientation suggesting that the electronic device is in use or nearby a person.

In some embodiments, the sensors 210 may be devices configured to emit, receive, or both emit and receive sensor waves, which may be any type of wave that may be used to identify sensitive objects in a transmission field (e.g., a person, a piece of furniture). Non-limiting examples of sensor technologies for the sensors may include: infrared/pyro-electric, ultrasound, ultrasonic, laser, optical, Doppler, accelerometer, microwave, millimeter, and RF standing-wave sensors. Other sensor technologies that may be well-suited to secondary and/or proximity-detection sensors may include resonant LC sensors, capacitive sensors, and inductive sensors. Based upon the particular type of sensor waves used and the particular protocols associated with the sensor waves, the sensor may generate sensor data. In some cases, the sensor may comprise a sensor processor that may receive, interpret, and process sensor data, which the sensor may then provide to a transmitter processor.

In some embodiments, the sensors may be passive sensors, active sensors, and/or smart sensors. The passive sensors, such as tuned LC sensors (resonant, capacitive, or inductive) are a simple type of sensor and may provide minimal but efficient object discrimination. Such passive sensors may be used as secondary (remote) sensors that may be dispersed into the transmission field and may be part of the receiver or otherwise independently capture raw sensor data that may be wirelessly communicated a sensor processor. The active sensors, such as infrared (IR) or pyro-electric sensors, may provide efficient and effective target discrimination and may have minimal processing associated with the sensor data produced by such active sensors. Smart sensors may be the sensors having on-board digital signal processing (DSP) for primary sensor data (i.e., prior to processing by the transmitter processor). Such processors are capable of fine, granular object discrimination and provide transmitter processors with pre-processed sensor data that is more efficiently handled by the transmitter processor when determining how to generate and transmit the power waves.

In some implementations, the sensors may be configured for human recognition, and thus may discriminate a person from other objects, such as furniture. Non-limiting examples of the sensor data processed by human recognition-enabled sensors may include: body temperature data, infrared range-finder data, motion data, activity recognition data, silhouette detection and recognition data, gesture data, heart rate data, portable devices data, and wearable device data (e.g., biometric readings and output, accelerometer data).

The memory 212 is a non-volatile storage device for storing data and instructions, to be used by the processor 206. The memory 212 is implemented with a magnetic disk drive, an optical disk drive, a solid state device, or an attachment to a network storage. The memory 212 may comprise one or more memory devices to facilitate storage and manipulation of program code, set of instructions, tasks, pre-stored data including configuration files of receivers and electronic devices, and the like. Non-limiting examples of the memory 212 implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the memory 212 includes one or more instructions that are executable by the processor of the processor 206 to perform specific operations. The support circuits for the processor include conventional cache, power supplies, clock circuits, data registers, I/O interfaces, and the like. The I/O interface may be directly coupled to the memory unit 212 or coupled through the processor of the processor 206.

In some embodiments, the transmitter 200 may be associated with the memory 212 that may further include one or more mapping-memories, which may be non-transitory machine-readable storage media configured to store the image data which may be data describing aspects of position of the receivers and the one or more objects within the transmission field associated with the transmitter 200. The memory 212 may also store mapping data that may comprise heat-map data and sensor data. The heat-map data may be generated by transmitter 200 processors configured to identify receivers located in the transmission field; and the sensor data may be generated by transmitter 200 processors and/or sensor processors to identify sensitive objects such as human beings and animals located in the transmission field. Thus, the image data and the mapping data stored in the memory unit 212 of the wireless power transmission system may include information indicating the location of the receivers, the location of sensitive objects such as humans and animals, and other types of data, which may be used by the transmitter 200 to generate and transmit safe and effective power waves. The transmitter 200 may query the image data with the pre-stored data stored in the records of the memory unit 212, so that the transmitter 200 may use the image data as input parameters for determining the characteristics for transmitting the power waves and where to generate pocket of energy within the transmission field.

In some embodiments, the wireless power transmission system may include an external memory, which may be a database or a collection of machine-readable computer files, hosted by non-transitory machine-readable storage media of the admin computer 214. In such embodiments, the external memory may be communicatively coupled to the transmitter 200 by any wired or wireless communications protocols and hardware. The external memory may contain the pre-stored data comprising sample images and configuration files of the receivers and the one or more objects such as the humans and animals. The records of the external memory may be accessed by the transmitter 200, which may update the pre-stored data when scanning the transmission field for the receivers or sensitive objects when determining safe and effective characteristics for the power waves that the transmitter 200 is going to generate.

In some embodiments, the transmitter 200 may comprise non-transitory machine-readable storage media configured to host an internal memory along with the memory unit 212, which may store the mapping data within the transmitter 200. The processor 206 of the transmitter 200, such as a transmitter processor, may update the records of the internal memory as new mapping data is identified and stored. In some embodiments, the mapping data stored in the internal memory may be transmitted to additional transmitters of the wireless power transmission system, and/or the mapping data in the internal memory may be transmitted and stored into an external memory at a regular interval or in real-time.

The administrative computer 214 of the wireless power transmission system may be any computing device, which may comprise or may otherwise be coupled to a user interface allowing a user to control operations of the administrative computer 214. The computing device refers to a computer with a processor/microcontroller and/or any other electronic component that performs one or more operations according to one or more programming instructions. The examples of the computing device include, but are not limited to, a desktop computer, a laptop, a personal digital assistant (PDA), a tablet computer, or the like. The computing device is capable of communicating with the transmitter 200 and an external server through a network using wired or wireless communication capabilities. The network refers to a medium that also connects various computing devices and database of the wireless power transmission system. The examples of the network include, but are not limited to, LAN, WLAN, MAN, WAN, and the Internet. The network itself may include wired as well as wireless connections. The communication over the network may be performed in accordance with various communication protocols such as Transmission Control Protocol and Internet Protocol (TCP/IP), User Datagram Protocol (UDP), and IEEE communication protocols.

An input device may be a keyboard, mouse, pointer, touchscreen, or other input generating device to facilitate input of control instructions by a user to the processor 206 and/or administrative computer 214. In one embodiment, the input unit provides a portion of the user interface for the wireless power transmission system, and may include an alphanumeric keypad for inputting alphanumeric and other key information along with a cursor control device such as a mouse, a trackpad or stylus. A display unit of the wireless power transmission system may include a cathode ray tube (CRT) display, liquid crystal display (LCD), plasma, or light emitting diode (LED) display. A graphics subsystem may receive textual and graphical information, and processes the information for output to the display unit.

In an embodiment, the systems of the wireless power transmission system adhere to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$).

The present methods for the wireless power transmission incorporate various safety techniques to ensure that human occupants in or near a transmission field are not exposed to EMF energy near or above regulatory limits or other nominal limits. One safety method is to include a margin of error (e.g., about 10% to 20%) beyond the nominal limits, so that human subjects are not exposed to power levels at or near the EMF exposure limits. A second safety method can provide staged protection measures, such as reduction or termination of wireless power transmission if humans (and in some embodiments, other living beings or sensitive objects) move toward a pocket of energy with power density levels exceeding EMF exposure limits. A further safety method is redundant safety systems, such as use of power reduction methods together with alarms. Such safety methods employ the image processor 208 including the one or more video cameras to capture images of objects within the transmission field and the sensors 210, and subsequently processing the captured images and/or the sensor data to identify the position of the humans and the receivers. Based on the determined positions of the humans and the receivers, the transmitter 200 then transmit the power waves to the receivers and generate a null space in the positions of the humans.

Sensors Operation

The sensor 210 may detect whether objects, such as person or furniture, enter a predetermined proximity of the transmitter 200, power waves, and/or a pocket of energy. The sensor 210 may detect whether objects, such as person or furniture, enter a transmission field of the transmitter 200. In one configuration, the sensor 210 may then instruct the transmitter 200 or other components of the wireless power transmission system to execute various actions based upon the detected objects. In another configuration, the sensor 210 may transmit sensor data generated upon detection of the objects to the processor 206 of the transmitter 200, and the processor 206 of the transmitter 200 may determine which actions to execute (e.g., adjust a pocket of energy, cease power wave transmission, reduce power wave transmission). For example, after one sensor identifies that a person has entered the transmission field, and then determines that the person is within the predetermined proximity of the transmitter 200, the sensor 210 could provide the relevant sensor data to the processor 206 of the transmitter 200, causing the transmitter 200 to reduce or terminate transmission of the power waves. As another example, after identifying the person entering the transmission field and then determining that the person has come within the predetermined proximity of a pocket of energy, the sensor 210 may provide sensor data to the processor 206 of the transmitter 200 that causes the transmitter 200 to adjust the characteristics of the power waves, to diminish the amount of energy concentrated at the pocket of energy, generate a null, and/or reposition the location of the pocket of energy. In another example, the wireless power transmission system may comprise an alarm device, which may produce a warning, and/or may generate and transmit a digital message to a system log or administrative computing device configured to administer the system. In this example, after the sensor 210 detects the person entering the predetermined proximity of the transmitter, power wave, and/or pocket of energy, or otherwise detects other unsafe or prohibited conditions of system, the sensor data may be generated and transmitted to the alarm device, which may activate the warning, and/or generate and transmit a notification to the administrator device. A warning produced by the alarm may comprise any type of sensory feedback, such as audio feedback, visual feedback, haptic feedback, or some combination.

The wireless power transmission system may include multiple transmitters 200. For example, a first transmitter may include a first sensor that emits and/or receives sensor waves and generates sensor data, which may be stored on the first transmitter and/or a mapping memory; the wireless power transmission system may also have a second transmitter comprising a second sensor that emits and/or receives sensor waves and generates sensor data, which may be stored on the second transmitter and/or the mapping memory. In this example, both of the first and second transmitters may comprise processors that may receive sensor data from the first and second sensors, and/or fetch stored sensor data from the particular storage locations; thus, the sensor data produced by the respective first and second sensors may be shared among the respective first and second transmitters. The processors of each of the first and second transmitters may then use the shared sensor data, to then determine the characteristics for generating and transmitting the power waves, which may include determining whether to transmit the power waves when a sensitive object is detected. Multiple transmitters may interface with and may be controlled by the same processor.

As mentioned, the transmitter 200 may comprise, or otherwise be associated with, multiple sensors or sensors from which the transmitter 200 receives the sensor data. As an example, a single transmitter may comprise a first sensor located at a first position of the transmitter and a second sensor located at a second position on the transmitter. In this example, the sensors may be binary sensors that may acquire stereoscopic sensor data, such as the location of a sensitive object to the sensors. In some embodiments, such binary or stereoscopic sensors may be configured to provide three-dimensional imaging capabilities, which may be transmitted to an administrator's workstation and/or other computing device. In addition, binary and stereoscopic sensors may improve the accuracy of the receiver or the object location detection and displacement, which is useful, for example, in motion recognition and tracking.

In some implementations, the user may communicate to the transmitter 200 tagging information that enables the transmitter 200 to detect and confirm certain objects that the user wishes to exclude from receipt of wireless energy (i.e., power waves, pocket of energy). For example, the user may provide tagging information via a user device in communication with the controller of the transmitter 200 via a graphical user interface (GUI) of the user device. Exemplary tagging information includes location data for an electrical device, which may include one-dimensional coordinates of a region in space containing the object, two-dimensional (2D) coordinates of a region in space containing the object, or three-dimensional (3D) coordinates of a region in space containing the object. One way to perform tagging may be to place the user device in close proximity to the object or location being tagged and use the location of the user device as a proxy for the location of the tagged object when recording the location to be tagged with the transmitter.

Additional details, discussion, and examples of the sensor operations in a wireless charging system may be found in U.S. patent application Ser. No. 14/861,285, entitled "Systems and Methods of Identifying Sensitive Objects in a Wireless Power Transmission Field," filed Sep. 22, 2015.

Cameras and Computer Vision Operation

The transmitter 200 may include the cameras 208. The cameras 208 will capture the images of the objects within the transmission field of the transmitter 200 and the images will be transmitted to the processor 206. The processor 206 may execute a computer vision software or any suitable software that is programmed to process the image data captured by the cameras 208 to locate and recognize the receiver, living beings, and/or other sensitive objects from the captured images. In one example, the receiver, living being, and/or other sensitive object physical shape may be recognized first, and once the physical shape is recognized, it is matched with the pre-stored data. Once the matching is confirmed, then X, Y, Z coordinate of the receiver, living being, and/or other sensitive object will be determined.

In one embodiment, the transmitter 200 uses two video cameras in stereo configuration that operate as stereoscopic vision, in side by side configuration. The images in the data captured by the two video cameras is processed in the computer vision software executed by the processor 206 to search for visual patterns that it can recognize. The visual patterns are pre-programmed or preconfigured and saved in the pre-stored data in the memory 212. In case of detecting presence of humans using visual light cameras, the pre-stored data may include all possible skin tones, hair color, and facial features, for instance, for purposes of matching. The computer vision software may also be trained to recognize different shapes of the receivers. There are several methods to train the computer vision software. One method to train the computer vision software is to hold up an object, for example, a cellphone, to the visual cameras and take snapshots of the object at different orientations and distances. The snapshots are saved in the memory 212 and the computer vision software fills a configuration file for identifying the object by comparing the image data with the snapshots stored in the memory 212. When the wireless power transmission system is running, and the computer vision software is receiving the image data from the cameras 208, the computer vision software is executed by the processor 206 to search for any portion within the image data that matches the pattern that was preprogrammed in a plurality of configuration files stored in the memory 212.

In some implementations, the computer vision software may execute various algorithms enabling the software to intelligently learn the identity of various physical objects, based on certain characteristics of those objects, such as shape, orientation, movement, dimensions, emissions of RF radiation, emissions of light, heat, and the like. In operation, the computer vision software may identify an object when the characteristics of that object are within a threshold variance of the corresponding characteristics for baseline objects in the memory 212. Allowing for some threshold variance when comparing characteristics may account for subtle changes in objects "seen" routinely by the cameras 208, such as aging, erosion, or some forms of wear-and-tear on an object. Accordingly, when the computer vision software identifies, or "sees," an object in a still image or video, the computer vision may also update the parameters or characteristics of the corresponding baseline object in the memory 212.

When the computer vision software recognizes an object in the image data from the configuration file stored in the memory 212, then the computer vision software uses the image data to determine the X, Y, Z location of the object. Each video camera transmits X, Y coordinates of the object (which are called as pixels) to the processor 206. The computer vision software after receiving the X, Y coordinates of the object from the two video cameras, compares the two copies of the X, Y coordinates of the object, and creates another dimension of the object which indicates the distance of each pixel of the object image from the two video cameras. In other words, the computer vision software compares the image data related to the object from each of the cameras 208, to determine the comparable distance of each picture element (or pixel), and thereby determines an X, Y, Z coordinate of each picture element of the object. Determining the distance to such objects may include use of the sensor data in addition to the video data for triangularization purposes.

In an embodiment, the recognized object may be composed of many different pixels that may, in some cases, containing visual and/or thermal patterns, sometimes referred to as a "Binary Large Object" (BLOB) of visual data. A BLOB may be a region of an image where one or more characteristics of the image are substantially similar or substantially constant. The data underlying the pixels at these regions are therefore recognizable and understood to be one or more objects by the processor 206, based on the underlying binary data generated for the pixels of that particular region of the image. It should be appreciated that this is merely a term of art referring to a contiguous set of image pixels, and should be not be considered limiting upon the operation of the transmitter 200 or the nature of the items that can be identified or otherwise detected by the transmitter 200. The computer vision software of the processor 206 then determines a center coordinate of the BLOB of visual data, sometimes called a "centroid," and then the computer vision software executed by the processor 206 determines the centroid X, Y, Z coordinate and uses the centroid X, Y, Z coordinate to activate the antennas 202 for an optimal configuration or phase that will create the pocket of energy as close as possible to the identified object which is a receiver unit. Similarly, if a BLOB is determined to be a human, for instance, this information is used to control the phase and amplitude of power waves so as to avoid creating a pocket of energy in close proximity.

In an embodiment, the X, Y, Z coordinates determined may be relative to a frame of reference of the transmitter 200. For example, if the transmitter 200 has an X, Y, Z coordinate, then the receiver coordinate is relative to the transmitter 200 with the frame of reference being the X, Y, Z coordinate. The computer vision software in conjunction with the cameras 208 is continuously and/or periodically tracking the receivers and continuously and/or periodically determine the X, Y, Z coordinates for objects "seen" by the cameras 208. The X, Y, Z coordinate data is immediately used by the transmitter 200 to update the wireless power transmission antennas of the antennas 202. For example, the phases of the wireless power transmission antennas may be a function of the X, Y, Z coordinates of the receiver, as detected by the computer vision software, and as determined and continuously updated by the processor 206, based on the data received from the cameras 208.

One having skill in the art would recognize that there are number of techniques for implementing the computer vision, and that there may be any number of software products that may be executed by the processor 206 of the transmitter 200 to configure the components of the transmitter 200 to perform the various tasks associated with computer vision, as described herein. Non-limiting examples of such software that may be employed to instruct the processor 206 and other components to execute processes associated with computer vision may include OpenCV, Fiji, Pfinder, Trax Image Recognition, Robot Operating System (ROS), and the like. It would also be appreciated that such underlying software modules may be configured or otherwise re-configured using libraries developed using C++, Python, MATLAB, LISP, and any other programming language capable of manipulating the behaviors of cameras, image processor, and/or processor 206 when executing digital image processing and automated computer vision routines.

In operation, the cameras 208 may be configured to report the X, Y, Z coordinate of every pixel of the image data sent from the cameras (e.g., visual video cameras, thermal cameras) transmitting images (e.g., continuous video, successive still frame images) to the cameras 208. The programmatic modules may also have functions that can search for and detect visual BLOBs of pixels where a visual BLOB in the image data may be an object of interest. Thus, when the cameras 208 see objects, for example, a human, a cell phone, a book, or a chair, such objects appear to the computer vision software executed by the processor 206 as contiguous collections of pixels, usually of kind of a uniform color compared to the background, and the computer vision software can then determine the X, Y, Z coordinate of the centroid of these objects relative to the transmitter 200. The computer vision software is further configured to operate for a stationary object or an object that's moving. The computer vision software is able to determine that an object is moving because the moving object may correspond to the contiguous pixels that are moving relative to a complete field of vision, whereas all the other pixels that are stationary are part of the background. Thus, the pixels that are in motion are easier to differentiate from the background pixels as the pixels that are in motion are the only pixels that are all moving in the same direction.

The computer vision software may use an open source software to determine the X, Y, Z coordinates of the object that's recognized as the receiver, for example the mobile device. The computer vision software of the transmitter 200 may be trained by one or more techniques to identify the receivers. For example, the receivers for mobile devices where the receiver is embedded within the mobile devices such as a cell phone, the configuration files corresponding to shape, dimensions, and configuration of the mobile and/or the receiver may be stored in the memory 212 of the transmitter 200. The configuration files are stored so that when the transmitter 200 is in operation, the configuration files are available for the computer vision software of to use, and then facilitate the communication between the computer vision software and may be an antenna management software of the antennas 202. The communication by the computer vision software may include the X, Y, Z coordinates of the receivers over to the antenna management software of the antennas 202. In another embodiment, when the antenna management software of the antennas 202 is in direct communication with the receiver, and the transmitter 200 is powering the receiver, then the antenna management software of the antennas 202 will be able to determine the X, Y, Z coordinates of the receiver based on the settings of the phases of the antennas in 202. In addition, the processor 206 may use the determined location of the receivers based on the direct communication between the antenna management software of the antennas 202 with the receiver, and compare the determined location with the location reported of the receiver by the computer vision software to verify that the computer vision software is recognizing the correct object as being the receiver.

In another example, if the antenna management software of the antennas 202 detects an electronic device comprising a receiver where the computer vision software has not been programmed to recognize the electronic device. The computer vision software, or some other hardware and/or software component of the transmitter 200, may determine the initial X, Y, X coordinates of the mobile device using sensor data received from sensors coupled to the transmitter 200, or using a set of coordinates expressly inputted by a user through a user interface, enabling the computer vision software of the transmitter 200 to continuously or periodically track the relative location of the mobile device, even though the computer vision software cannot initially recognize the electronic device using the pre-programmed database of objects. Where the computer vision software of the processor 206 has not been programmed to recognize the pattern of the electronic device or a stand alone receiver, the computer vision software executed by the processor 206 of the transmitter 200 will be unable initially to determine and report the X, Y, Z coordinates of the receiver coupled to the electronic device. In some cases, the unrecognized receiver may communicate various types of location data with the transmitter 200 via a communications signal (e.g., Bluetooth®, ZigBee®, Wi-Fi, NFC), allowing the transmitter 200 to detect the presence of the unrecognized receiver and determine the location of the receiver in the transmission field of the transmitter 200. The processor 206 of the transmitter 200 may subsequently initiate antenna management software of the antennas 202 to configure the power transmission antennas to transmit power waves to or proximate to the location of the receiver. Based on data received back from the receiver via the communications signal, the antenna management software of the transmitter 200 may determine more specific X, Y, Z coordinates of the receiver being powered. The X, Y, Z coordinates of the receiver are then stored into non-transitory machine-readable storage of a memory unit 212. The computer vision software, and the processor 206 of the transmitter 200 more generally, may then begin monitoring the location and movements (e.g., updated coordinates, updated location data) of the receiver and electronic device, using the coordinates stored in the memory unit 212. Although the computer vision software of the processor 206 may not initially recognize the pattern of an electronic device or a standalone receiver device, the electronic device or standalone receiver device may be recognized and serviced by the processor 206 of the transmitter 200 using location data received via a communications signal, location data received in user inputs from a user interface, and/or sensor data generated and received from sensors coupled to the transmitter 200. After determining the initial location of the receiver, the transmitter 200 may begin transmitting the power waves, provided no sensitive objects are detected in the path of the power waves to provide power to the electronic device comprising the receiver. The transmitter 200 may then adjust the antenna configuration of the antennas 202 to update the power waves based on receiver movement. Under these circumstances, the processor 206 can determine the X, Y, Z coordinates of the receiver based on the antenna phases used to transmit power waves. The processor 206 then uses the X, Y, Z coordinates of the receiver from the antenna management software of the antennas 202 to calibrate the computer vision software to look for the receiver at that location of the X, Y, Z coordinates. If the receiver is subsequently moved, the computer vision software may then track the image of the receiver and report the image data to the processor 206. The image will be depicted as a BLOB of pixels, and when the BLOB of pixels begins to move, the computer vision software in real time determines the X, Y, Z coordinates of the moving receiver, and continuously and/or periodically uses the determined X, Y, Z coordinates to update the phases of the antennas of the antennas 202 to maintain the pocket of energy at the receiver.

The training functions of the computer vision software may have one or more parameters. The one or more parameters may be adjusted to optimize for the category of objects being recognized by the computer vision software. For example, different kinds of cell phones in general have a more unique kind of shape than an animal such as a dog or a cat. The cell phone may have more angular features and usually rectangular and flat shape. The computer vision software of may be trained to more readily, efficiently, and in a faster way recognize the objects such as cell phones due to the unique shape patterns of the cell phones. In one example, the objects may be recognized by the computer vision software by identifying visual patterns such as points, colors, and letters on the objects. In another example, the objects may be recognize by the computer vision software by identifying any kind of specific labeling on the body of the object. In yet another example, the objects may be recognized by the computer vision software by identifying configuration of distinctive visual patterns of the object, for example, location of a keyboard may be detected by locating keys on it. In another example, a TV remote control may be located by identifying the colors of the different buttons on the TV remote control, or a cell phone may be located by identifying the location of the camera which is usually present as a small round object on the backside of the phone. In the example of recognizing the cell phone by the computer vision software, the computer vision software may initially process an overall three-dimensional rectangular shape of the cell phone, and then recognize the smaller hole which will be the lens of the camera in the cell phone. In other words, the computer vision software may be trained to determine the relationship between the rectangular box that forms the cell phone itself and for all the features that are on the cell phone like the buttons to correctly identity or recognize the cell phone as an object of interest.

In an embodiment, the computer vision software is also trained to recognize the receiver when the receiver is placed external to the electronic device such as the cell phone in the image data captured by the cameras 208. In such a case, the computer vision software of the processor 206 is trained to recognize the lines that form the basic shape of the receiver. For example, if the receiver is in rectangular in shape, the computer vision software may be trained to identify the overall three-dimensional rectangular shape. In another example, the computer vision software may be trained to recognize the color of the receiver or any patterns, sub-color patterns if the receiver has multiple colors or lettering. The color is unique way to recognize the receiver by the computer vision software as the receiver may be marked with a trademark having colors, and the computer vision software may be pre-programmed to identify the trademark to the RGB color.

Using Multiple Transmitters to Model Objects in a Shared Transmission Field

In an embodiment, the wireless power transmission system may include multiple transmitters where each transmitter 200 may include the cameras 208. Each of the multiple transmitters may have their own transmission field or the energy zone, where the antennas of each transmitter 200 may transmit power waves to charge the electronic devices. In another example, each of the multiple transmitters 200 may have a same transmission field or the energy zone, where the antennas of each of the transmitter 200 may transmit power waves to charge the electronic devices. In such a case, the video cameras of the multiple transmitters monitor and capture the image data of the same transmission field (transmission area). The multiple transmitters may be configured to communicate with each other directly through a wired means, or communicate to each other through a backend wireless server, to share the image data captured by each of the transmitters. The backend wireless server may by a server computer comprising a processor capable of performing communication between the multiple transmitters. Each of the transmitters may transmit the image data captured by their cameras to their own processors or a central processor. The processors of the transmitters may generate symbolic data from the image data captured by the video cameras of each of the multiple transmitters. The symbolic data obtained from the multiple different perspectives at each transmitter may then be combined to generate a visual model of all the objects and the receivers within the transmission field.

The multiple transmitters may be used in order to improve the accuracy of monitoring and detecting the receivers and the sensitive objects, such as humans. In a room having multiple transmitters where each of the multiple transmitters has video cameras, the multiple transmitters may be located in the room such that the images captured by the video cameras of each of the multiple transmitters is captured from different angles and perspectives. For example, in a room having a child that is hidden behind a chair, the video camera of a given transmitter may not be able to see the child because of the chair in the way, but the video camera of the transmitter located over in another part of the room may be able to recognize the child, and then all the image data captured from all the video cameras of all the transmitters may be analyzed to obtain the X, Y, Z coordinates of the child even though the video cameras of the given transmitter wasn't able to capture the image of the child.

In the above discussed example, the X, Y, Z coordinates of the child may be communicated between the wireless power transmitters, such that even the transmitters with video cameras that cannot view the child receive the X, Y, Z coordinates of the child from other transmitters, and then the transmitters with video cameras that cannot view the child can use the child's X, Y, Z coordinates to compare with the X, Y, Z coordinates of the receivers they are powering so that if the receiver being powered gets too close to the child, the transmission of power waves to the receiver may be reduced or ceased. Thus, in this case, the given transmitter may be receiving in real time the X, Y, Z coordinates of the given human or sensitive object and the given transmitter may adjust its antenna configuration phases to continuously and/or periodically keep the energy pocket away from the given human or sensitive object based on the X, Y, Z coordinates of the given human or sensitive object being received in real time from other transmitters. In some implemenations, the transmitter may also adjust antenna configuration phases to transmit power waves that converge to from destructive interference patterns, resulting in nulls at or proximate to the location proximate of the human or other sensitive object.

In an embodiment, each video camera of the multiple transmitters may be producing the image data. The image data produced by video cameras of each transmitter is shared with the other transmitters operating in the same transmission field. The image data may be processed by the computer vision software executed by the processor of each transmitter such that the computer vision software compares all the image data produced by each camera of each transmitter to create a three dimensional cloud model of the transmission field area where all the transmitters are operating.

In another embodiment, in order to build the three dimensional cloud model, all the video cameras may send the image data to a central processor of the wireless power transmission system that is configured to create the three dimensional cloud model by using the X, Y, Z coordinates of each pixel in the image data captured by each video camera. In this case, each individual transmitter would be a client to the central processor that is generating the three dimensional cloud model. Each of the client transmitters will receive updated copies in real time of the three dimensional cloud model from the central processor, and at the same time continuously and/or periodically sending the image data from its own video cameras back to the central processor for updating the three dimensional cloud model. In other words, each transmitter is continuously and/or periodically transmitting its raw or processed image data to the central processor that is configured to generate the three-dimensional cloud model, and at the same time each individual transmitter is continuously and/or periodically downloading updates to the three-dimensional cloud model so that each individual transmitter can continuously and/or periodically have an accurate three-dimensional cloud model of the transmission field area to control the antenna configuration phases to maintain energy pocket at the receivers within the same transmission field area.

In yet another embodiment, the individual transmitters of the wireless power transmission system may be configured to use the antenna management software of their own antennas to communicate with the receivers to form an energy pocket for the receivers. The individual transmitters then subsequently determine the X, Y, Z coordinates of the receivers according to one or more methods of configuring the power transmission antennas to transmit power waves to or near the receivers. The individual transmitters may communicate the determined X, Y, Z coordinates of the receivers to a central processor of a device coupled to the transmitters, such as a master transmitter or a master server, where the X, Y, Z coordinates generated by each transmitter may be determined based on antennas phases and/or data received from the receiver through a communications signal (e.g., heat-mapping data). The central processor may be configured to generate a model of a common transmission field that is monitored by the various sensors and/or cameras of the transmitters.

A central processor may generate two or three-dimensional models of a common transmission field, based on inputs of various sensors and/or cameras. For example, the central processor may generate one model based on the image data obtained from the video cameras of multiple transmitters, and another model generated based on the phases of the antennas determined by the antenna management software of the respective transmitters. The central processor may be configured to compare the two models, and send signals to one or more transmitters containing data indicating or otherwise instructing a transmitter to adjust the power waves being produced, based on the optimal position of the receivers from a given transmitter determined by the comparison of the two models. In this case, the individual transmitters may not have to control the transmission of the power waves on their own, but instead the central processor may provide instructions/directions to form the energy pocket at locations of the receivers.

The individual transmitters of the wireless power transmission system may also be configured to transmit one or more parameters to the central processor in a decentralized model of operation of the wireless power transmission system. In one embodiment, the central processor may receive the raw image data captured by the video cameras of the individual transmitters. The raw image data from the video cameras is a steady stream of images generated by the video cameras, where a given video camera, inside its circuit, is creating multiple snapshots of a given scene, for example, at 10 frames per second. This implies that at 10 times per second, the camera will read the X, Y, Z coordinates of all the pixel colors, or in some cases temperatures, in the field of view of the camera. The X, Y, Z coordinates may be converted into numeric value (symbolic data) by a processor of the transmitter, and then the numeric value may be communicated back to the central processor. In another instance, the transmitters may directly send the raw image data captured by their own video cameras to the central processor.

The central processor may then receive the symbolic data that may be generated by each transmitter computer vision software from the raw image data. The symbolic data may include the X, Y, Z coordinates of the receivers, the sizes of the receivers, and the velocity of the receivers if the receivers are moving. In this case, the computer vision software of each transmitter may be programmed to analyze the raw image data and search for object patterns. The stationary objects may be recognized as contiguous BLOBs of pixels near the same background color, or the moving BLOBs of pixels which are contiguous pixels near the same background color that are moving relative to the field of view of the transmitter as well as relative to the background pixels of the field of view. The computer vision software then recognizes the BLOBs and generate the symbolic data that comprises the X, Y, Z coordinates of the center or the centroid of the BLOB, the size of the BLOB in terms of the number of pixels or a percentage of the pixels compared to the field of view, or the velocity of the BLOB, and the duration of the visibility of the BLOB in seconds. All the symbolic data may then be sent to the central processor. The central processor may use all the symbolic data and/or the raw image data being continuously and/or periodically received to generate the three-dimensional cloud model which is a data structure that may be useful for all the transmitters to use for wireless power transmission by controlling the antenna phases of their antennas to form the optimal energy pocket at each receiver location within the same transmission field area. The three-dimensional cloud model may be data structure that includes a list of X, Y, Z coordinates of all visually recognized objects (such as humans and furniture) and the X, Y, Z coordinates of all the receivers as determined by either the computer vision software of each transmitter and/or the antenna management software at each transmitter. Along with the X, Y, Z coordinates of each object, the model may contain other details associated with the objects such as the BLOB size or average pixel color.

One advantage of the wireless power transmission system of the present disclosure is that the cameras 208 along with the computer vision software of each transmitter sees the object, recognizes the location of the object, determines the X, Y, Z coordinates in less than a second, and then an antenna management software of the antennas 202 may rapidly configure the phases of all the transmission antennas to aim the transmission of the power waves and form the pocket of energy at the location of the object if the object is the receiver. Another advantage is that when a receiver is in motion, the antennas 202 may rapidly configure the phases of all the transmission antennas in real time to follow the moving receiver. If the receiver is a cellphone carried by a human, the transmitter may transmit to the receiver location once the human is no longer carrying the cellphone. Using the cameras 208 along with the computer vision software of the transmitter, the system is able to re-aim the transmission antennas in real time so that the energy pocket can efficiently move along with the receiver, and thus the receiver keeps receiving power.

In an embodiment, if the user has a device without a battery and the device needs to have continuous power, for example, a LED light mounted on a wall in a room, then the LED light or similar device lacking a battery would only operate as long as there is a pocket of energy formed at the device or a receiver coupled to the device. In one scenario, if a user walks into the room, and stands between the transmitter 200 and the LED light, the LED light may go off until the transmitter 200 can readjust the phase of the transmission antenna of the antennas 202 to bounce the wireless power from a different route around the room to the LED light. In other words, the wireless power transmission system can power a device by being directly at the device and if there's something intervening then the wireless power of the wireless power transmission system can bounce off other objects in the room. Using the cameras 208 along with the computer vision software, the wireless power transmission system respond a lot faster in case there's a person or something intervening between the transmitter 200 and the receiver as the computer vision software of the transmitter 200 always monitors exactly where the receiver is located, especially if the receiver has been moved or if the receiver unit is moving. The cameras 208 always visually view the receiver, and then the computer vision software of the processor 206 in real time keeps calculating the X, Y, Z coordinates of that receiver and send a signal to the antennas based on the location of the receiver to change its phases to continuously and/or periodically power the receiver.

Exemplary System Components with Thermal Camera Operations

Figure 3:
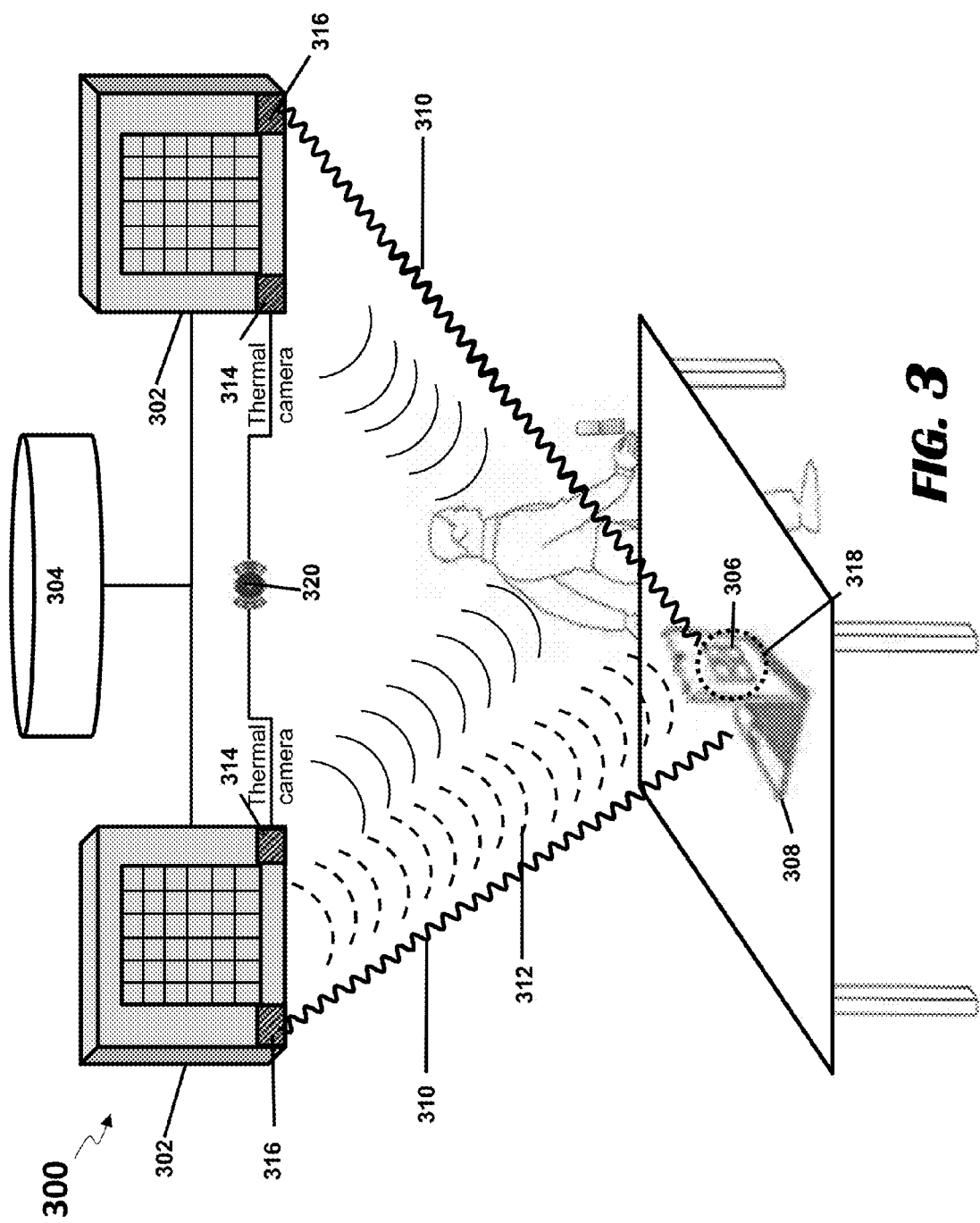
FIG. 3 shows components of an exemplary wireless power transmission system for identifying objects within a transmission field of a transmitter using thermal imaging cameras, according to an exemplary embodiment.

FIG. 3 shows components of an exemplary wireless power transmission system 300 for identifying objects within a transmission field of a transmitter using thermal imaging cameras, according to an exemplary embodiment. FIG. 3 will be explained in conjunction to FIG. 1 and FIG. 2. The wireless power transmission system 300, using the thermal imaging cameras 314 associated with the transmitters 302, may determine the safest and most effective characteristics for wireless power transmission, taking into account the presence of humans and other living beings, such as domestic animals within the transmission field of the transmitter. In addition, the wireless power transmission system 300 using the thermal imaging cameras 314 may determine the characteristics for wireless power transmission, taking into account the presence of other sensitive objects, which may include certain equipment and other valuable objects that are sensitive to electromagnetic energy in power waves.

The wireless power transmission system 300 includes transmitters 302, an external mapping memory 304, a receiver 306 integrated in an electronic device 308 to be charged. The transmitters 302 may send various types of waves, such as communication signals 310, and power waves 312, into a transmission field, which may be the two or three-dimensional space into which the transmitters 302 may transmit power waves 312.

In addition, the wireless power transmission system 300 includes thermal cameras 314 that may receive thermal radiation from fields of view overlapping the transmission field of the transmitters 302 and generate a thermal image. The thermal image may include temperature data (thermal imaging data) obtained from the thermal radiation. The overlap between the fields of view and the transmission field means that at least some portions of the fields of view are also within the transmission field of the transmitters 302, although in some embodiments the fields of view may extend beyond the transmission field. Additionally, the transmission field of the transmitters 302 may extend beyond the fields of view. The thermal cameras 314 form thermal images of their respective fields of view.

The transmitters 302 may include one or more transmitter processors that may be configured to process and communicate various types of data (e.g., heat-mapping data, thermal imaging data). For example, the transmitter processor may generate heat-mapping data from the communications signals 310 received by communications components 316, and then, based upon thermal imaging data received from the thermal cameras 314 (or thermal camera processor), the transmitter processors may determine the safest and most effective characteristics for the power waves 312.

In one embodiment, the thermal imaging cameras 314 may be physically associated with the transmitters 302 (i.e., connected to, or a component of), or devices may be configured to detect and identify various conditions of the system 300 and/or transmission field. Thermal imaging data may then be generated for the transmitters 302, which may contribute to the generation and transmission of the power waves 312 by the transmitters 302. The thermal imaging data may help the transmitters 302 determine various modes of operation and/or how to appropriately generate and transmit the power waves 312, so that the transmitters 302 may provide safe, reliable, and efficient wireless power to the receiver 306 and avoid transmitting power waves to locations where humans or other sensitive objects are present. As detailed herein, the thermal imaging cameras 302 may transmit the thermal imaging data derived from thermal images formed during thermal imaging camera operations for subsequent processing by transmitter processors of the one or more transmitters 302. Additionally or alternatively, one or more thermal imaging camera processors may be connected to or housed within the thermal imaging cameras 314. The thermal imaging camera processors may comprise a microprocessor that executes various primary data processing routines, whereby the thermal imaging data received at the transmitter processor has been partially or completely pre-processed as useable mapping data for generating the power waves 312.

The thermal images in the field of view of the thermal cameras 314 typically are recorded by two-dimensional (X by Y) pixel arrays. Specialized thermal imaging cameras 314 use focal plane arrays (FPAs) that respond to longer wavelengths (mid- and long-wavelength infrared). The most common types are InSb, InGaAs, HgCdTe and QWIP FPA. FPAs resolution typically is considerably lower than that of optical cameras, mostly 160×120 or 320×240 pixels. The thermal imaging cameras 314 tend to have a single color channel because the cameras generally use an image sensor that does not distinguish different wavelengths of infrared radiation. Sometimes the resulting monochromatic images are displayed in pseudo-color, in which changes in color are used rather than changes in intensity to display changes in the signal.

Specifications of the thermal imaging camera 314 may be selected for detection of objects within fields of view overlapping the transmission field of the transmitter 302. Specification parameters may include for example: number of pixels; ranging limit, or distances from the thermal imaging camera 314 for effective detection of objects; frame rate of the thermal imaging camera 314 operated to provide video output; angular field of view (measured horizontally and vertically); minimum resolvable temperature difference (MRTD); spectral band; and dynamic range. With reference to FIG. 3, it should be understood that the field of view of the thermal imaging cameras 314 is the extent of the observable environment of the transmitters 302 that is seen at any given moment, which overlaps the transmission field of the transmitters 302. In an embodiment, the field of view may be a solid angle within which a thermal imaging camera is sensitive to thermal radiation.

Thermal imaging data may be obtained from the thermal imaging cameras 314 which is in the form of a two dimensional X by Y array of pixels includes at a basic level, analog and/or digital visual image data for each pixel in the array. In an embodiment, data captured by the thermal imaging camera 314 includes infrared energy intensities detected by each pixel in the array, and individual temperature values for each pixel based on transformation of the infrared energy to form the temperature data. The thermal imaging data also can include data derived from this basic pixel data, e.g., to analyze objects in the field of view of the imaging sensor. This derivative thermal imaging data is generally symbolic in nature, such as a number representing area of an object, or an array containing location components for an object. Because there are multiple sources of the infrared energy, it can be difficult to get an accurate temperature of an object using thermal imaging. The thermal imaging cameras 314, and computer vision processors (processors executing computer vision software's) incorporated in or communicating with the thermal imaging cameras 314, are capable of performing algorithms to interpret the thermal imaging data and build an image. Often, the computer vision techniques that have been developed for visible light imaging, also can be applied to infrared imaging.

A plurality of the thermal imaging cameras 314 may be deployed for detection of humans and other living beings within the transmission field of one or more transmitters 302. As shown in FIG. 3, the thermal imaging cameras 314 are respectively physically associated with the transmitters 302, which effect thermal imaging of objects within the transmission field of the transmitters 302 from different directions, i.e., stereoscopic imaging. The thermal imaging cameras 314 form thermal images with different fields of view, overlapping the transmission fields of the transmitters 302. Disparity analysis techniques can be employed to determine three dimensional (3D) coordinates of objects detected by the two or more thermal imaging cameras 314. In an embodiment, a first thermal imaging cameras of the two or more thermal imaging cameras 314 may have a field of view in which an object in motion appears in changes across the field of view (lateral motion), wherein a second thermal imaging cameras of the two or more thermal imaging cameras 314 may have a field of view in which motion of the object appears in near-far image changes, providing less accurate measurements of movement. Image processing associated with one or both of the thermal imaging cameras 314, and imaging processing of one or both of the transmitters 302, may calculate 3D locations of objects such as a living being detected by the thermal imaging cameras 314 within a global coordinate system of the transmitters 302. Transmitter(s) 302 may compare the calculated 3D locations of objects detected by the thermal imaging cameras 314 with 3D locations of other entities of the wireless transmission system 300, such as the transmitters 302, receiver 306, and pocket of energy 318. Transmitters 302 may use a 3D location comparison in determining whether to adjust a power level of the power waves 312, e.g., if the comparison indicates that a detected living being is within predetermined proximity to the transmitters 302, or is in predetermined proximity to the pocket of energy 318. Upon detecting that a living being or another sensitive object is within a predetermined proximity of the transmitter, the transmitter reduces or ceases transmission of power waves. Also, upon detecting that a living being or another sensitive object is between the transmit array and the receiver, or detecting that a living being or other sensitive object is within a predetermined proximity of a receiver, the transmitter reduces or ceases transmission of power waves to that receiver. Thermal imaging data and video imaging data are superimposed on the same 2D or 3D coordinates to identify the locations of living beings. One feature of the system described is that it prevents exposing of living beings to EM radiation from power wave transmissions.

In alternative embodiments, the plurality of thermal imaging cameras 314 may be physically associated with the single transmitter 302; or at least one of the plurality of thermal imaging cameras 314 may be located remote from the transmitter 302 but communicatively coupled to the transmitter 302. The plurality of thermal imaging cameras 314 may be located at the same height (e.g., both physically associated with floor mounted transmitters), or at different heights (e.g., associated respectively with floor and ceiling mounted transmitters). Stereoscopic imaging using the plurality of thermal imaging cameras 314 may improve the accuracy of object location detection and detection of object displacements, which is useful, for example, in motion recognition and tracking. For example, two thermal imaging cameras 314 can provide improved sensitivity in detecting distances of living beings from the transmitter 302, in comparison to a single thermal imaging camera 314 physically associated with that transmitter 302.

Another advantage of stereoscopic imaging of the transmission field of the one or more transmitter 302 is that obstacles (such as table) may partially or completely obstruct the view of the living being or other object in the transmission field of the transmitter 302 by a first thermal imaging camera of the thermal imaging cameras 314, but the object may be clearly visible to a second thermal imaging camera of the thermal imaging cameras 314 that views the scene from a different direction. For example, a child may be blocked from the field of view of the first thermal imaging camera of the thermal imaging cameras 314 by an obstacle such as furniture, but may be visible to the second thermal imaging camera of the thermal imaging cameras 314. The system can share coordinates of the child obtained by the second thermal imaging camera of the thermal imaging cameras 314 with the first thermal imaging camera of the thermal imaging cameras 314.

One technique used in the present disclosure identifies a spatially contiguous area of pixels having temperature values meeting predetermined criteria, such as pixels with temperature values falling within a predetermined temperature range, or pixels with temperature values falling within local temperature maxima. In the present disclosure, the term "visually contiguous pixels" is sometimes used for a spatially contiguous area of pixels in a thermal image having temperature values meeting predetermined criteria. The local coordinates of the visually contiguous pixels represent the position of an associated object in the field of view. As previously mentioned, the image information contained in the selected image detail corresponding to the visually contiguous pixels can be treated in the image processing software as a "Binary Large Object" (BLOB). A BLOB or predetermined characteristics of a BLOB can be stored in databases (e.g., a database within or coupled to the transmitter 302) as a single object; and can be treated as a pattern in thermal imaging software. For example, the BLOB can represent a pattern of thermal imaging data that can be relocated in thermal images recorded later.

Thermal imaging data associated with visually contiguous pixels can include various geometric characteristics of the set of visually contiguous pixels. One geometric characteristic is the centroid, the center of mass of a two-dimensional planar lamina or a three-dimensional solid. Another characteristic is size, which may be estimated by an area measured by the number of pixels in the set of visually contiguous pixels; by length and width of the visually contiguous pixels; or by radius of a round pattern of visually contiguous pixels. In some embodiments, upon identification of a human or other sensitive object covering a certain percent of the field of view of a camera co-located with the transmitter, the transmitter ceases transmission of power waves. This is done in anticipation of scenarios where a human may walk in front of a transmitter at close range, and hence represent a certain percent of the pixels of the field of view, and it would be necessary to avoid transmitting any power waves in order to assure complete safety of the human.

A further characteristic is shape, which may for example be a configuration file selected from an appearance pattern library. The appearance pattern library may include multiple configuration files for the same object taken from different orientations and different distances, which provides greater flexibility in recognizing that object. Further, when using stereoscopic imaging, the system may compare patterns of visually contiguous pixels, such as visually contiguous body temperature pixels, acquired by multiple thermal imaging cameras from different perspectives. The system can compare these pixel patterns with different configuration files in the appearance pattern library, to confirm identification of a given object or a given object category. Configuration files of an appearance pattern library may be stored in databases within the transmitters 302, and/or within the external mapping memory 304, for ready access to these files following boot up of the transmitters 302. Configuration files may include patterns of temperature, color such as skin tone and hair color, or facial features such as eyes and mouth, representing visual patterns of a person.

A pattern of visually contiguous pixels can indicate the presence of a living being in the field of view of a thermal imaging camera. As used in the present disclosure, "visually contiguous body temperature pixels" refers to a spatially contiguous area of pixels in a thermal image having temperature values that correspond to a temperature or range of temperatures indicating presence of humans and/or other living beings. As a non-limiting example, visually contiguous body temperature pixels for detection of humans may be defined as pixels with temperature values in and around the range of about 36.5 C (97.7° F.) to about 37.5° C. (99.5 F). In addition or as an alternative to temperatures based on body temperature, in some embodiments "visually contiguous body temperature pixels" may include temperatures of humans that are lower than normal body temperatures, such as detected temperatures of clothing worn by a human.

Techniques for detecting living beings based upon visually contiguous body temperature pixels may be based not only on temperature contrasts between visually contiguous body temperature pixels as warm objects, versus cooler backgrounds, but also other computer vision techniques such as shapes of visually contiguous body temperature pixel patterns (e.g., human upper body shape detection); movement of a pattern of visually contiguous body temperature pixels tracked over time (e.g. walking human detection and detection of other human motions); and biometrics techniques (e.g., filtering visually contiguous body temperature pixel patterns based upon human height). In general, a BLOB representing temperatures near human body temperatures are considered to represent a human with high likelihood if they are not stationary, and the transmission of power waves is reduced or ceased in response.

Various computer vision techniques for detection and recognition of humans and other living beings may be applied to thermal imaging in the wireless power transmission system 300. For example, the transmitter 302 may implement tracking algorithms to determine whether an object associated with visually contiguous body temperature pixels is in motion (e.g., determine displacement). In some embodiments, multiple frames of thermal images may display a changing pattern of visually contiguous body temperature pixels against a static background image. An object near body temperatures that moves is considered to be a sensitive object, such as a human, and power wave transmission is reduced or ceased.

System 300 may employ a variety of computer vision techniques for detecting the presence and/or location of living being based upon thermal images formed by the thermal imaging cameras 314, wherein resulting thermal imaging data embodies visually contiguous body temperature pixels. Suitable human detection and recognition techniques include for example human appearance patterns, sometimes called human shape detection (e.g., head detection, face detection, hand detection, human upper body detection); human biometric attributes (e.g., human height); human motion detection; human activity detection (e.g., static posture, motion, and offset); and body temperature detection (e.g., skin detection).

The system 300 may employ object tracking and recognition methods based upon 2D thermal imaging data, or based upon 3D imaging data incorporating depth information. The system 300 may utilize object detection methods that provide location information about living beings, or may utilize object recognition methods that do not provide the location information. In an embodiment, techniques for detecting living beings in the system 300 do not identify particular humans and do not classify humans. Alternatively the system 300 provides human identification data and/or human classification data for controlling wireless power transmission. Examples include distinguishing infants or children from adults, or distinguishing mobile humans from immobile humans, in determinations whether to adjust wireless power levels.

System 300 may employ indoor 3D mapping to reconstruct a digital presentation of the environment overlapping the transmission field of the transmitters 302. For example, thermal images formed by the multiple thermal imaging cameras may be processed to generate a 3D mapping field, in which point depth (i.e., a location of a point in a 3D mapping field) is computed using stereo matching techniques. Each transmitter 302 may maintain in its database a 3D image map, such as a point cloud model, based on thermal imaging data of the transmitter's service area (transmission field). In addition, each transmitter 302 may generate heat-mapping data from the communications signals 310 to create a second type of 3D map of the transmission field. Multiple transmitters 302 may upload their visual imaging data and/or heat map data to the external mapping memory 304, which may act as a 3D model server that maintains a three dimensional point cloud model incorporating thermal imaging data received from all the transmitters 302 at a location. Individual transmitters 302 may download the 3D models from the 3D model server to provide more accurate 3D coordinates of objects detected by all thermal imaging cameras and other sensors. These image models may be used in feature matching of objects within the transmission field, including living beings and other objects such as table and receiver 302. In an exemplary embodiment, the system 300 effects indoor 3D mapping using sparse feature matching, in which a number of distinct points are extracted from successive frames and the geometric relationship between them is found.

System 300 may embody a library of programming functions used in computer vision. For example, the system 300 may incorporate programming functions from the OpenCV (Open Source Computer Vision) open source computer vision library; or may incorporate programming functions customized for wireless power transmission installations. For example, different computer vision functions may be used in floor-level thermal imaging systems (e.g., height recognition functions), as compared with thermal imaging systems physically associated with ceiling-mounted transmitters (e.g., head detection functions); or different computer vision functions may be used at different ranges of distance of detected objects from the transmitter.

In operation, the thermal imaging cameras 314 may detect whether living beings, such as person, enter a predetermined proximity of the transmitter 302, power waves 312, and/or the pocket of energy 318. In one configuration, the thermal imaging camera 314 may then instruct the transmitter 302 or other components of the system 300 to execute various actions based upon the detected objects. In another configuration, the thermal imaging camera 314 may transmit thermal imaging data to the transmitter 302, and the transmitter 302 may determine which actions to execute (e.g., adjust a pocket of energy, cease power wave transmission, reduce power wave transmission). For example, after the thermal imaging camera 314 identifies that the person has entered the transmission field, and then determines that the person is within the predetermined proximity (pre-defined distance) of power waves 312 and/or the transmitter 302, the thermal imaging camera 314 could provide the relevant thermal imaging data to the transmitter 302, causing the transmitter 302 to reduce or terminate transmission of the power waves 312. As another example, after identifying the person entering the transmission field and then determining that the person has come within the predetermined proximity of the pocket of energy 318, the thermal imaging camera 314 may provide thermal imaging data to the transmitter 302 that causes the transmitter 302 to adjust the characteristics of the power waves 312, to diminish the amount of energy concentrated at the pocket of energy 318, generate a null, and/or reposition the location of the pocket energy 318. In another example, the system 300 may comprise an alarm device 320, which may produce a warning, and/or may generate and transmit a digital message to a system log or administrative computing device configured to administer the system 300. In this example, after the thermal imaging camera 314 detects the person entering the predetermined proximity (pre-defined distance) of the transmitter 302, the power waves 312, and/or the pocket of energy 318, or otherwise detects other unsafe or prohibited conditions of the system 300, the sensor data may be generated and transmitted to the alarm device 320, which may activate the warning, and/or generate and transmit a notification to the administrator device. A warning produced by the alarm device 320 may comprise any type of sensory feedback, such as audio feedback, visual feedback, haptic feedback, or some combination.

In an example, a single thermal imaging camera 314 forms a plurality of thermal images over time, and these images are analyzed to detect a pattern of visually contiguous body temperature pixels and to determine the area of this pattern. If the area of the pattern of visually contiguous body temperature pixels exceeds a prescribed threshold value, the system 300 terminates wireless power transmission by the transmitter 302 as representing prohibited proximity to the transmitter 302 of the living being associated with pattern of visually contiguous body temperature pixels. In a variation of this embodiment, the transmitter 302 determines the total number of pixels within the field of view of the thermal imaging camera 314 that fall within the predetermined body temperature range regardless of whether these pixels are spatially contiguous, and terminates wireless power transmission if this pixel count exceeds a predetermined threshold. In another variation of this embodiment, based upon a series of image frames over time the transmitter 302 determines the trend over time of the total number of pixels within the field of view of the thermal imaging camera 314 that fall within the predetermined body temperature range, and terminates wireless power transmission if the increase of this total number of pixels exceeds a predetermined threshold.

In another example, the plurality of thermal imaging cameras 314 form thermal images including visually contiguous body temperature pixels. A processor of the transmitter 302 receives thermal imaging data from the thermal imaging cameras 314 and applies stereoscopic vision analysis to determine three dimensional coordinates of the pattern of visually contiguous body temperature pixels. The processor determines a centroid of the pattern of visually contiguous body temperature pixels, and calculates the distance between that centroid and a predetermined 3D location of the pocket of energy 318. If the distance is less than a first predetermined threshold value, the system reduces the power level of the power waves 312. If the distance is less than a second predetermined threshold value lower than the first predetermined threshold value, the system terminates transmission of the power waves 312.

In a further example, each of the plurality of thermal imaging cameras 314 forms a series over time of thermal images including visually contiguous body temperature pixels. A processor of the transmitter 302 receives thermal imaging data from the thermal imaging cameras 314 and applies motion tracking analysis contrasting the visually contiguous body temperature pixels from background image elements in the thermal image frame, to detect motion of the object associated with visually contiguous body temperature pixels. Additionally, the processor applies stereoscopic vision analysis to determine three dimensional coordinates of the pattern of visually contiguous body temperature pixels, calculating a centroid of the pattern of visually contiguous body temperature pixels. If the motion tracking analysis concludes that a living being associated with the visually contiguous body temperature pixels is moving toward the pocket of energy 318, the system reduces the power level of the power waves 312. If the stereoscopic vision analysis determines that the distance between the living being and a predetermined 3D location of the pocket of energy 318 is less than a predetermined threshold distance, the system terminates transmission of the power waves 312.

Figure 4:
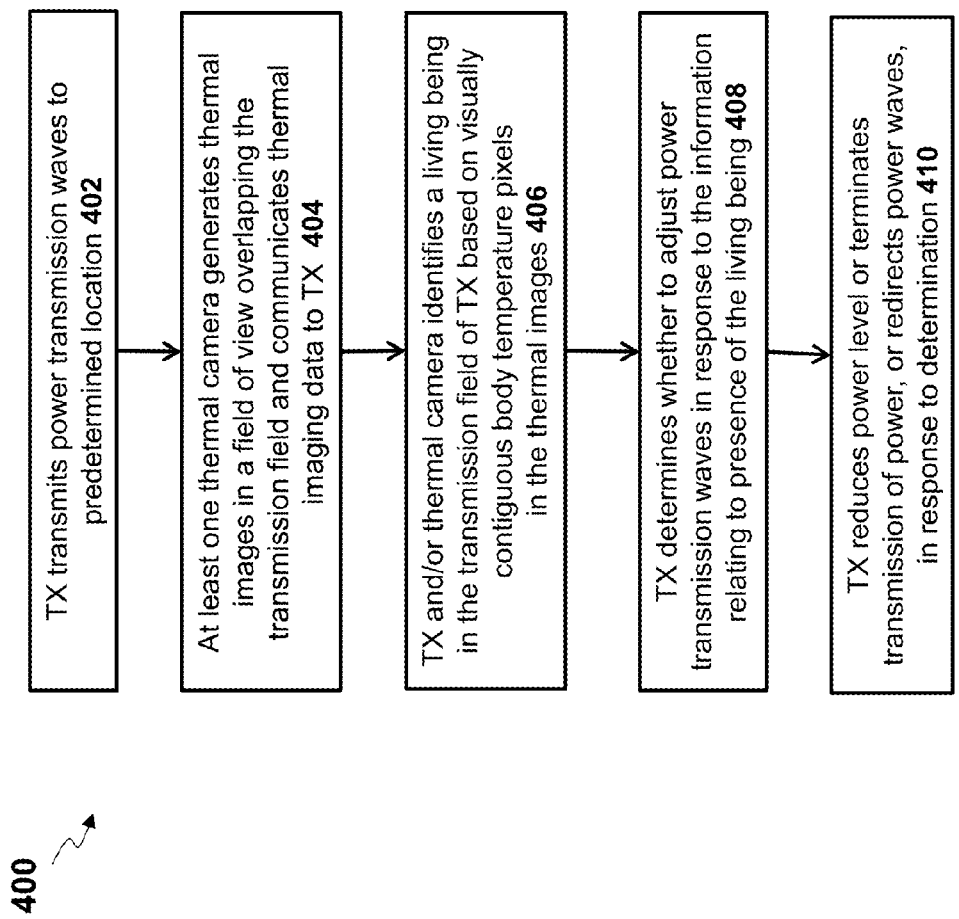
FIG. 4 is a flow diagram illustrating a method of identifying objects within a transmission field of a transmitter of a wireless power transmission system using thermal imaging cameras, according to an exemplary embodiment.

FIG. 4 is a flow diagram illustrating a method 400 of identifying objects within a transmission field of a transmitter of a wireless power transmission system using thermal imaging cameras, according to an exemplary embodiment.

At a first step 402, a transmitter transmits power waves to a predetermined location. The power waves transmitted at this step 402 may converge into a three-dimensional constructive interference pattern, eventually forming one or more pocket of energy at the predetermined location. In one example, the pre-determined location is the location associated to a receiver. The predetermined location may be included in mapping data, such as thermal imaging data or heat-map data, used for determining where in a transmission field to transmit power waves. In some implementations, the mapping data containing the predetermined location may be stored in a mapping memory that is internal or external to the transmitter. In some implementations, the mapping data may be generated in real-time or near real-time, by a transmitter processor or a sensor processor. In addition, in some implementations, the mapping data containing the predetermined location may be provided from a user device, through a software application associated with the wireless charging system.

In some embodiments of step 402, the transmitter transmits power waves that converge in the transmission field to form a pocket of energy at the predetermined location, and also power waves that converge to form a second pocket of energy at a second location in the transmission field, which is separate from the predetermined location for the first pocket of energy. That is, in some instances, power waves may result in the generation of side lobes of power waves, which causes the formation of one or more second pocket of energy, in addition to the first pocket of energy generated at the predetermined location. In some implementations, the predetermined location for the first pocket of energy and the second location having the second pocket of energy, are both included in mapping data (e.g., thermal imaging data, heat-map data), tracking the locations of pocket-forming for the transmitter. Although waveform generation and transmission techniques may be employed to avoid or reduce formation of side lobes, various embodiments of wireless power transmission disclosed herein, such as the exemplary method 400, may intelligently protect living beings and sensitive objects when these and other types of second pocket of energy are present in a transmission field.

At a next step 404, one or more thermal imaging cameras generate thermal images in transmission field of the transmitter. The thermal imaging camera, or primary processing circuitry associated with the thermal imaging camera, communicates thermal imaging data to the transmitter. In an embodiment, a thermal imaging camera may communicate to the transmitter thermal imaging data including visually contiguous body temperature pixels. In an embodiment, the thermal imaging cameras may communicate to the transmitter location-related thermal imaging data concerning the presence and/or location of objects, such as a living being associated with visually contiguous body temperature pixels in the thermal images.

In an embodiment of step 404, a first thermal imaging camera is located at a first position on the transmitter, and a second thermal imaging is located at a second position on the transmitter separated from the first position. In an embodiment, the first and second sensors acquire stereoscopic data indicating location of a pattern of visually contiguous body temperature pixels in the thermal images.

In an embodiment, a thermal imaging camera forms a plurality of thermal images over time of one or more field of view overlapping the transmission field of the transmitter. In an embodiment, the thermal imaging camera communicates to the transmitter thermal imaging data indicating motion of visually contiguous body temperature pixels in the thermal images.

At a next step 406, the transmitter identifies a living being in the transmission field based on temperature data in the thermal images. In another embodiment, the transmitter and/or the thermal camera identifies a living in the transmission field based on visually contiguous body temperature pixels in the thermal images. As an example, one or more thermal imaging cameras may acquire raw thermal imaging data including a pattern of visually contiguous body temperature pixels, process the raw thermal imaging data, and then generate thermal imaging data containing information indicating the presence or location of a living being associated with the pattern of visually contiguous body temperature pixels.

In an embodiment of step 406, a plurality of thermal imaging cameras communicate stereoscopic thermal imaging data to the transmitter, and either one or both of the thermal imaging cameras, or the transmitter, applies disparity analysis to determine three dimensional coordinates of a living being associated with the pattern of visually contiguous body temperature pixels.

A further embodiment, one or more thermal imaging cameras may acquire thermal imaging data containing information indicating the displacement or motion of a living being, based upon a series at different times of thermal images including a pattern of visually contiguous body temperature pixels indicating the presence of the living being. In an example, the transmitter uses this motion information to sense movement of the living being relative to the other objects of the wireless power transmission system, such as the transmitter, or the predetermined location of pocket of energy formed by the transmitter. In some embodiments, one or more thermal imaging cameras, the transmitter, or both, may calculate characteristics of the pattern of thermally contiguous body temperature pixels, such as centroid, area, length and width, radius, velocity (for a time series of thermal images) and shape.

At a next step 408, transmitter determines proximity of identified living being to power waves. In order to calculate the proximity, the transmitter calculates a distance between location of identified living being and power waves being transmitted in the transmission field of the transmitter. The transmitter then adjusts the power level of the power waves upon determining that the proximity of the living being is within a pre-defined distance from the power waves. In one example, the pre-defined distance corresponds to distance from the living being to the transmitter. In another example, the pre-defined distance corresponds distance from the living being to the receiver.

In another embodiment, the transmitter determines whether to adjust the characteristics of the power waves, based upon information indicating the presence of a living being based upon visually contiguous body temperature pixels. In an embodiment, the transmitter compares location data for the living being obtained at step 406, with coordinates (e.g., one-dimensional coordinates, two-dimensional coordinates, three-dimensional coordinates) of the transmitter. In another embodiment, transmitter compares information concerning the location data for the living being, obtained at step 406, with coordinates (e.g., one-dimensional coordinates, two-dimensional coordinates, three-dimensional coordinates, polar coordinates) of the predetermined location of power transmission waves. In an embodiment, the transmitter calculates a distance of the living being from the transmitter, and reduces or terminates power in the event that distance falls below a threshold proximity value. In an embodiment, the transmitter calculates a distance of the living being from the location of the pocket of energy, and reduces or terminates power in the event that distance falls below a threshold proximity value.

In another embodiment of step 408, the transmitter compares information concerning the location data for the living being, obtained at step 406, with coordinates (e.g., one-dimensional coordinates, two-dimensional coordinates, three-dimensional coordinates, polar coordinates) of the location of the pocket of energy; and analyzes information concerning motion of the living being, obtained at step 406. If the information concerning motion of the living being indicates motion of the living being toward the location of the pocket of energy, the transmitter reduces the power level of power transmission waves; and if the information concerning the location of the living being indicates less than a threshold distance from the location of the pocket of energy, the transmitter terminates wireless power transmission.

In some implementations, in step 406, the transmitter may apply safety techniques to the determination of whether to adjust the power waves, using the location data in the sensor data associated with the living being or sensitive object. One safety technique is to include a margin of error (e.g., a margin of 10%-20%) beyond the regulatory limits or other limits on maximum permissible power level or on EMF exposure, to ensure living beings are not exposed to power levels at or near the limits. Another safety technique is to make a determination to adjust the power waves in the event an obstacle obstructs the field of view of a thermal imaging camera.

At a next step 410, the transmitter may execute one or more actions, if the transmitter determines at a previous step 408 to adjust power waves based on the information relating to presence of the living being. In some cases, the transmitter reduces the power level of the power waves at the predetermined location, when the transmitter determines at a previous step 408 to adjust the power waves. In some cases, the transmitter terminates transmission of the power waves to the predetermined location, when the transmitter determines at a previous step 408 to adjust or terminate the power waves. In some cases, the transmitter diminishes the amount of energy of the power waves at the predetermined location, when the transmitter determines at a previous step 408 to adjust the power waves. In some embodiments, the transmitter redirects the transmission of the power waves around the living being or sensitive object, when the transmitter determines at a previous step 408 to adjust the power waves. Additionally or alternatively, the transmitter may activate an alarm of the transmitter or wireless charging system, when the transmitter determines at previous step to adjust the power waves.

Exemplary System Components with Visual & Ultrasonic Devices

Figure 5:
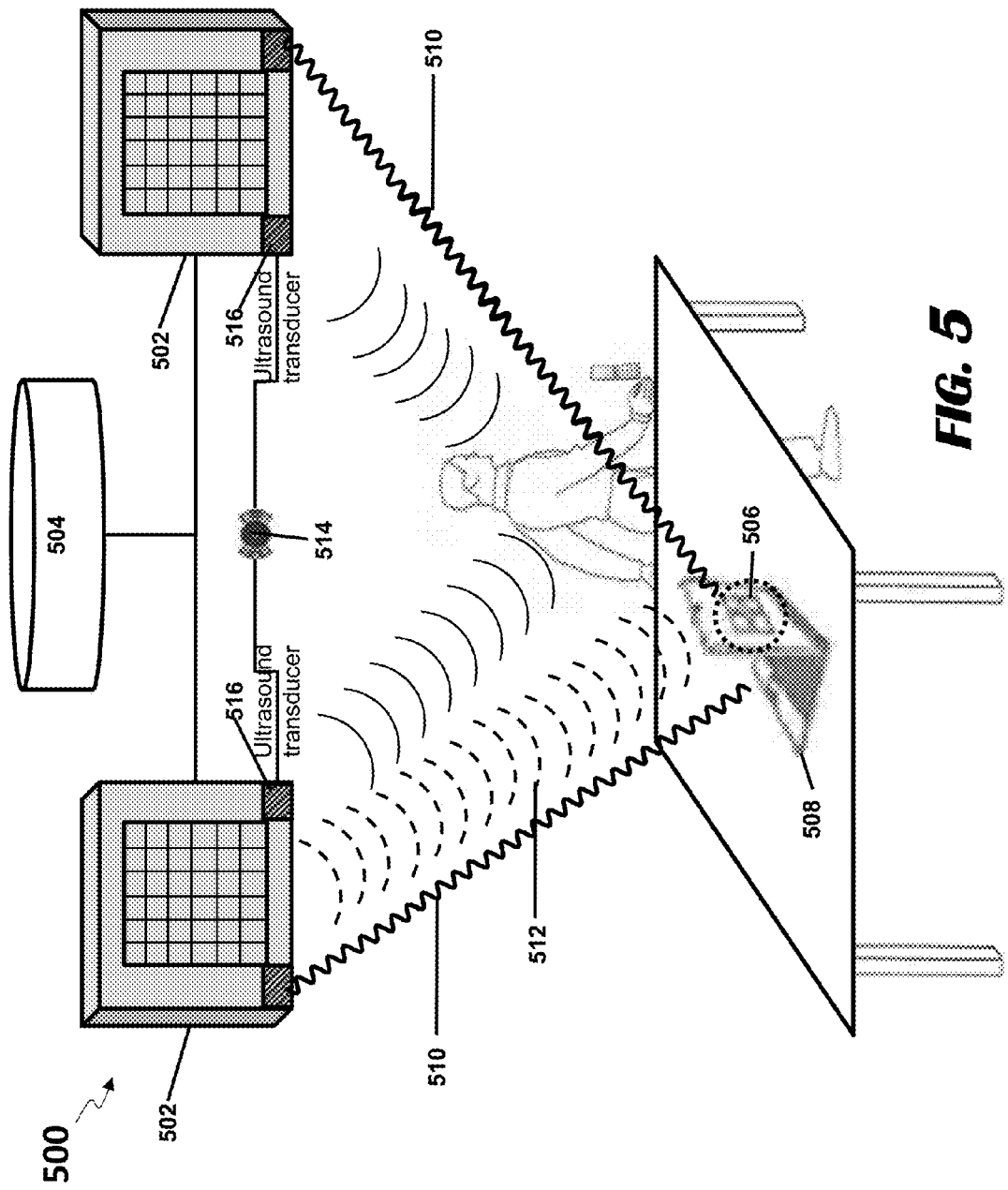
FIG. 5 shows components of an exemplary wireless charging system for identifying objects within a transmission field of a transmitter using a thermal imaging camera with ultrasonic transducers, according to an exemplary embodiment.

FIG. 5 shows components of an exemplary wireless charging system for identifying objects within a transmission field of a transmitter using a thermal imaging camera with ultrasonic transducers, according to an exemplary embodiment. FIG. 5 will now be explained in conjunction with FIG. 1-3.

The system 500 may include transmitters 502, an external mapping memory 504, a receiver 506, and an electronic device 508 to be charged. Transmitters 502 may send various types of waves, such as communication signals 510, and power waves 512, into a transmission field, which may be the two or three dimensional space into which the transmitters 502 may transmit the power waves 512.

System 500 includes an imaging sensor 514 that generates visual imaging data for a living being or sensitive object within at least a portion of a transmission field of the transmitter together with one or more ultrasonic transducers 516 that generates ultrasound detection data to detect living beings and other sensitive objects within the transmission field of the transmitter 502. The location of the living being and/or the sensitive object is then determined based on the visual imaging data and the ultrasound detector data. In another embodiment, this combination of detection devices can generate three dimensional location information for the living beings and other sensitive objects, which can be used by the transmitter 502 in controlling wireless power transmission. The combined detection devices provide significantly more effective object detection and location than would be achieved using only ultrasound, or using only a single camera or other imaging sensor, enabling reliable detection of certain objects near the transmitter 502 that may not be amenable to visual detection alone, or that may not be amenable to ultrasound detection alone. For example, ultrasound with no camera may not effectively discriminate between humans and other living beings, versus other objects. A single camera without ultrasound generally would not detect the distance from the transmitter 502 of an object in two dimensional image data, and therefore may not detect unsafe proximity to the transmitter 502 of a living being or other sensitive object.

System 500 includes the imaging sensor 514 that may receive radiation from a field of view overlapping the transmission field of the transmitters 502. In one embodiment, the imaging sensor 514 may be a video camera. In the embodiment of FIG. 17, the imaging sensor 514 may be a thermal imaging camera that may receive thermal radiation from the field of view. However, it should be understood that the imaging sensor includes other devices that can acquire two dimensional (2D) visual imaging data based upon other types of radiation within the field of view of the imaging sensor. In yet another embodiment, the imaging sensor is a visible light camera. The overlap between the field of view and the transmission field of the transmitter 502 means that at least some portions of the field of view are also within the transmission field of the transmitters 502, although in some embodiments the field of view may extend beyond the transmission field. Additionally, the transmission field of the transmitters 502 may extend beyond the field of view.

Additionally, the system 500 includes the ultrasound transducers 516, which capture ultrasonic detection data of objects in an ultrasound scan region that overlaps the field of view of the imaging sensor 514, and that overlaps the transmission field of the transmitters 502. The overlap between ultrasound scan region and the field of view means that at least some portions of the ultrasound scan region are also within the field of view, although in some embodiments the ultrasound scan region may extend beyond the field of view. The overlap between the ultrasound scan region and the transmission field means that at least some portions of the ultrasound scan region are also within the transmission field, although in some embodiments the ultrasound scan region may extend beyond the transmission field.

In an embodiment, the ultrasound transducers 516 generate ultrasound energy for range finding of objects within the ultrasound scan region. Although the following discussion refers to ultrasound pulses, it should be understood that the ultrasound energy transmitted and received by the ultrasound transducers 516 also may take the form of continuous waves. Ultrasound pulses are generated within the ultrasound scan region, overlapping the field of view. If there is an object in the path of these pulses, part or all of the pulses will be reflected back to the transmitter as an echo and can be detected through the receiver path. By measuring the difference in time between the ultrasound pulses transmitted and the echo received, the system can determine the distance of the object. By measuring a phase difference between the two echoes, the system can calculate the angle of the objects, e.g., as measured from a reference angle. A calculated distance and angle of an object can be represented as a vector from a reference point, such as a midpoint between the ultrasound transducers 516 (in the present disclosure such a vector is sometimes called a "location vector" for the object).

In one embodiment, the imaging sensor, such as the thermal imaging camera 514, is communicatively coupled to the transmitters 502 and may be physically associated with the transmitters 502 (i.e., connected to, or a component of). Although in some instances, the thermal imaging camera 514 is shown positioned between the transmitters 502, in various embodiments the thermal imaging camera 514 would be positioned on or within a housing of the transmitter 502. The imaging sensor 514 generates two dimensional imaging data, such as thermal imaging data, for the transmitters 502, which may contribute to the generation and transmission of the power waves 512 by the transmitters 502. Additionally, the one or more ultrasound transducers 516, are communicatively coupled to the transmitters 502 and may be physically associated with the transmitters 502 (i.e., connected to, or a component of). The ultrasound transducers 516 generate ultrasound detection data for the transmitters 502, which may contribute to the generation and transmission of the power waves 512 by the transmitters 502. Transmitters 502 may use the combination of the thermal imaging data from the thermal imaging camera 514 with the ultrasonic detection data to determine various modes of operation and/or to appropriately generate and transmit the power waves 512. For example as further described below, the combination of the thermal imaging data from the thermal imaging camera 514 with the ultrasonic detection data may determine three dimensional location information for a living being or sensitive object within the field of view of the thermal imaging camera 514, in controlling generation and transmission of the power waves 512, so that the transmitters 502 may provide safe, reliable, and efficient wireless power to the receiver 506.

In an illustrated embodiment, such as the exemplary system 500, the one or more ultrasound transducers 516 are internal components of the transmitter 502. In some embodiments, the one or more ultrasound transducers 516 may be external to the transmitter 502 and may communicate, over a wired or wireless connection, ultrasonic detection data to the one or more transmitters 502. The thermal imaging camera 514 and the ultrasound transducers 516 may provide the thermal imaging data and the ultrasound detection data, respectively, to the one or more transmitters 502, and the processors of the transmitters 502 may then share this data to determine the appropriate formulation and transmission of the power waves 512. Host transmitters 502 may send and receive object detection data with other detection devices, and/or with other host transmitters in the system 500. Additionally or alternatively, the thermal imaging camera 514, the ultrasound transducers 514, or the host transmitters 502 may transmit or retrieve one or more of visual imaging data, ultrasound detection data, and data derived from the processing of visual imaging data with ultrasound detection data, to or from one or more mapping memories 504.

The ultrasound transducers 516 may transmit ultrasound detection data for subsequent processing by a transmitter processor of the transmitter 502. Additionally or alternatively, an ultrasound detection processor may be connected to or housed within one or more ultrasound transducers 516. An ultrasound detection processor may comprise a microprocessor that executes various primary data processing routines, whereby the ultrasound detection data received at the transmitter processor has been partially or completely pre-processed as useable mapping data for generating the power waves 512.

In another embodiment, the thermal imaging camera 514 and the ultrasound transducers 516 may include a processor that receives detection data from other detection devices, wherein detection data received at the transmitter processor from a combination of detection devices has been partially or completely pre-processed as useable mapping data for generating the power waves 512. For example, the thermal imaging camera 514 and the ultrasound transducers 516 may include a processor that receives both two dimensional imaging data from the thermal imaging camera 514, and the ultrasound detection data from the ultrasound transducers 516, and that determines three dimensional location information for a living being or sensitive object within a field of view of the thermal imaging camera 514.

With reference to FIG. 5, it should be understood that the ultrasound scan region is not limited to the region of the ultrasound waves but may include other directions from ultrasound transducers 516 and may extend further than the cross sectional plane from the imaging sensor's field of view. The ultrasound scan region overlaps the transmission field of the transmitters 502 and the field of view of thermal imaging camera 514 but may have a greater or lesser extent than these other regions. Generally, ultrasound signal wavelengths have a relatively short reach, and ultrasound is well suited to range finding in indoor environments.

The ultrasound transducers 516 are physically associated with the transmitters 502, respectively and transmit ultrasound waves, in an ultrasound scan region that overlaps the field of view of the thermal imaging camera 514, and that overlaps the transmission field of the transmitters 502. Echoes of the ultrasound waves may be reflected by one or more objects within the ultrasound scan region, such as a living being or sensitive object. In an embodiment, each of the ultrasound transducers 516 transmits ultrasound pulses, and the time required to receive echoes of transmitted pulses is used to determine distance of objects. Ultrasound software receives object detection data from both the ultrasound transducers 516, and may perform a disparity analysis based on phase differences of ultrasound detection measurements from the ultrasound transducers 516. Based on this analysis, the system generates a location vector for each detected object. In an embodiment, the location vector is a location within a global coordinate system that can be used to specify three dimensional location information for objects within the field of view of the transmitters 502.

In an embodiment, the ultrasound transducers 516 are located along a line parallel to the X-Y area of the field of view of the imaging sensor 514. In an embodiment, the imaging sensor 514 is located substantially at a midpoint between the ultrasound transducers 516. In another embodiment not shown, the ultrasound transducers 516 may be located near the right and left edges of the transmitter housing of the transmitters 502, and the imaging sensor 514 may be located in line with the ultrasound transducers 516, substantially at a midpoint between them.

Figure 6:
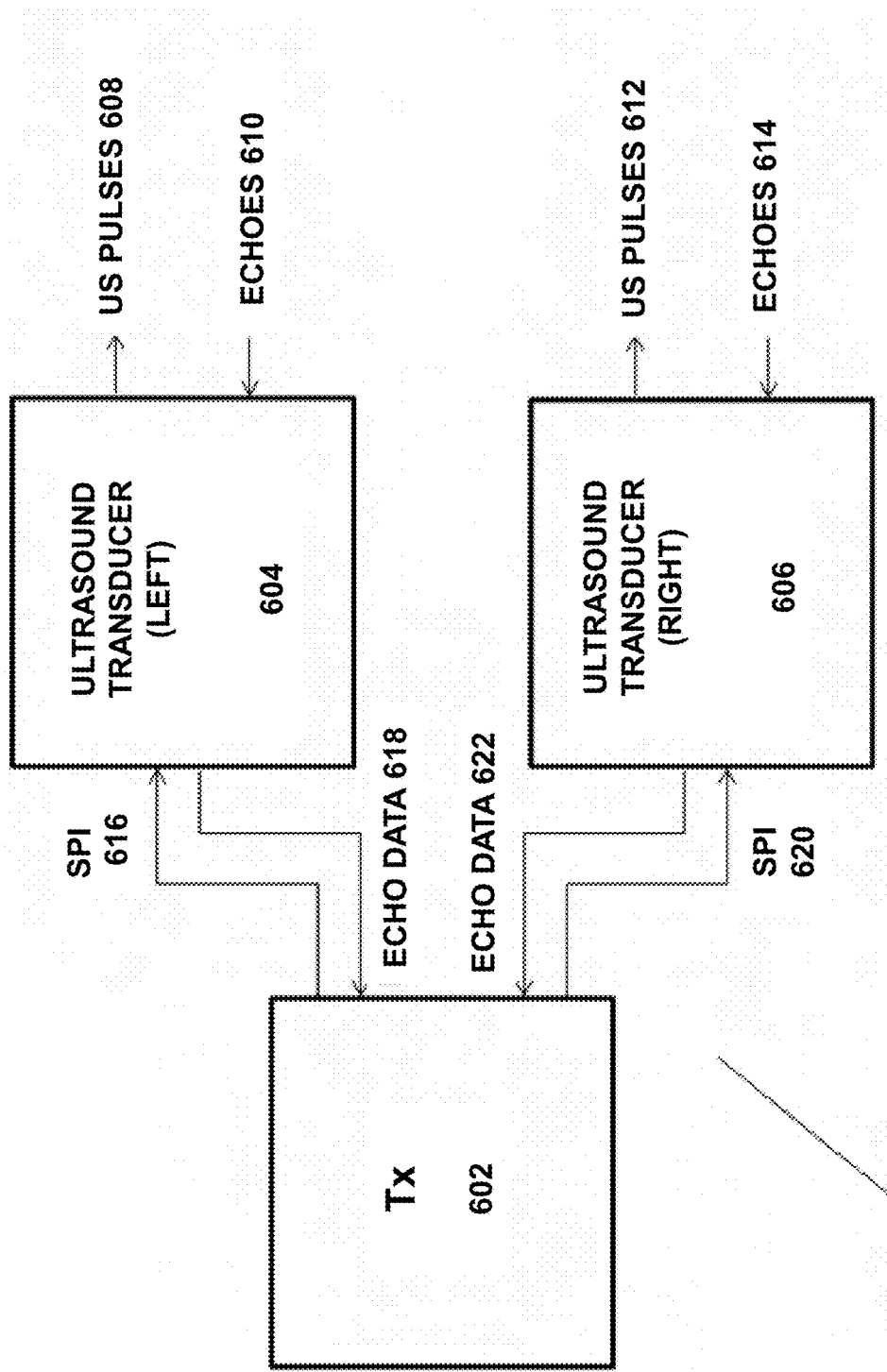
FIG. 6 illustrates components of a system for wireless power transmission system for identifying objects within a transmission field of a transmitter using ultrasonic transducers, according to an exemplary embodiment.

FIG. 6 illustrates components of a wireless power transmission system 600 for identifying objects within a transmission field of a transmitter using ultrasonic transducers, according to an exemplary embodiment.

In an embodiment, a sensor processor, or ASIC, is integrated within transmitter (Tx) 602. In some embodiments, the ASIC and/or sensor processor of Tx 602 communicates commands to, and receives data from, ultrasound transducer 604 (left transducer; "UT-L") and ultrasound transducer 606 (right transducer; "UT-R") using Serial-Peripheral-Interface (SPI) interface.

In various embodiments, the ultrasound sensor components provide a timed sequence of steps in transmitting ultrasound pulses (or pings) and receiving echoes of these pulses from objects in an ultrasound scan region of transducers 604, 606. In an embodiment, the sequence includes the following steps, in timed sequence: (1) UT-L 604 transmits ultrasound pulses (pings) 608, as commanded by SPI 616; (2) UT-L 604 receives echoes 610 of the ultrasound pulses; (3) UT-R 606 transmits ultrasound pulses (pings) 612, as commanded by SPI 620; (4) UT-R 606 receives echoes 614 of the ultrasound pulses. In an embodiment, steps (2) and (4) are allocated sufficient time to complete collection of echoes from any objects within the transmission field, and then are followed immediately by the next transmission step. After step (4) is concluded, the sequence is repeated.

In an embodiment, during steps (3) and (4) when UT-R 606 is transmitting pings and receiving echoes, UT-L 604 may communicate echo data 618 to Tx 602 based on the echoes 610 previously received during steps (1) and (2). Similarly, during steps (1) and (2) when UT-L 604 is transmitting pings and receiving echoes, UT-R 604 may communicate echo data 620 to Tx 602 based on the echoes 614 previously received during steps (3) and (4).

This timed sequence permits ultrasound transducers 604 and 606 to transmit and receive signals using the same frequency, without interference with each other. Alternatively, ultrasound transducers 604 and 606 may operate on different frequencies.

In an embodiment, ultrasound transducers operate asynchronously with thermal imaging manager, but these devices time stamp reports to transmitters of thermal imaging data and ultrasound data in order to identify contemporaneously acquired data. In an embodiment, computer vision processing for thermal imaging camera, and ultrasound processing for ultrasound transducers, collectively operate within short cycle times. In exemplary embodiments, the cycle time of system for visual imaging and ultrasound detection may be between 9 cycles per second and 30 cycles per second. Advantageously, the system recognizes a living being or sensitive object and rapidly adjusts transmission of power waves based on this information. In an embodiment, the system terminates or limits the power level of wireless power transmission within 90 milliseconds of identifying an electromagnetic field (EMF) exposure risk via visual imaging and/or ultrasound detection.

In another embodiment, system includes a global coordinate system that is defined with respect to a transmitter. In this global coordinate system, a location vector for a detected object can measure a distance between the object and transmitter. In an embodiment, the global coordinate system is a Cartesian coordinate system in which transmitter is associated with coordinates (0, 0, 0). Two dimensional visual imaging data from imaging sensor may be correlated with ultrasound detection data from ultrasound transducers within the global coordinate system, to derive three dimensional location information for detected objects (such as living beings or sensitive objects) within the field of view of imaging sensor.

Figure 7:
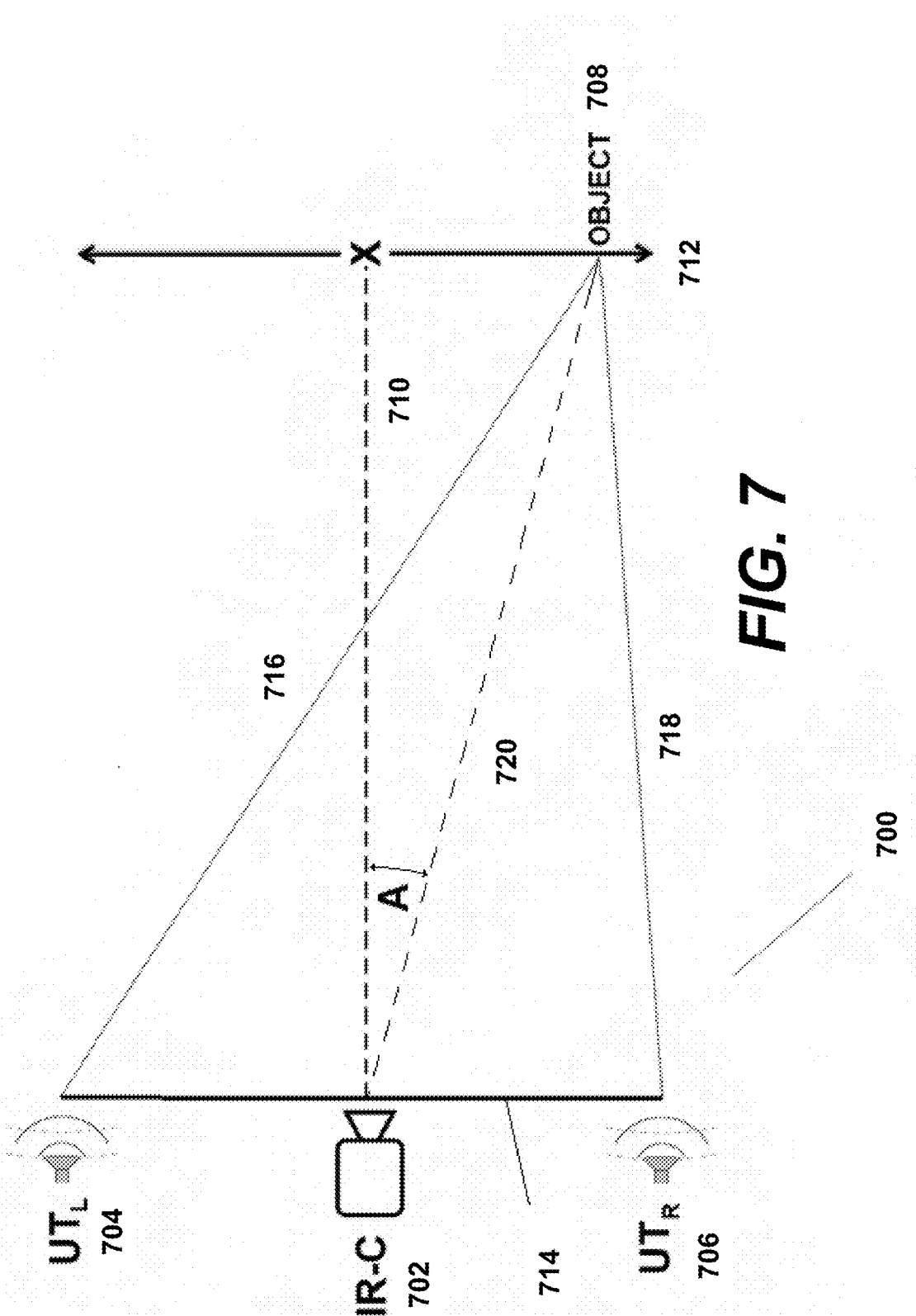
FIG. 7 is a schematic diagram of a wireless power transmission system with thermal imaging camera and ultrasonic transducers, according to an exemplary embodiment.

FIG. 7 is a schematic diagram of a wireless power transmission system 700 with thermal imaging camera and ultrasonic transducers, according to an exemplary embodiment.

Left ultrasonic transducer 704, right ultrasonic transducer 706, and thermal imaging (infrared) camera 702 are located in-line along axis 714. Infrared camera is located substantially at a midpoint between ultrasonic transducers 704 and 706. Each of ultrasonic transducers 704 and 706 transmits ultrasound pulses that are reflected off object 708, with echoes of these pulses reflected back to the transducers. Each transducer detects the amplitude and elapsed time of received echoes. The elapsed time of return of an ultrasound pulse indicates distance of an object from the ultrasound transducer. Triangulation algorithms may be employed to identify an "ultrasound angle" of object 708 based on an offset of time as between the readings by transducers 704, 706. In the present disclosure "ultrasound angle" refers to the angle of a vector to an object's location as detected by the ultrasound sensors. Thus in the exemplary configuration of FIG. 19, object 708 is closer to transducer 706 than to 708, as indicated by a commensurately greater time for the echo to return to transducer 704. In processing the echoes from object 708, therefore, the system determines a vector 716 from the left ultrasound transducer 704 to the object 708, and determines a vector 718 from the right ultrasound transducer 716 to the object 708.

An ultrasound transducer operating as a ranging device may detect echoes from numerous objects within its ultrasound scan region, maintaining a list of these echoes with associated distance measurements. Given objects, however, can provide ultrasound echo of an amplitude that is characteristic of that object. Echo readings from transducers 704, 706 can be compared to identify echoes that were generated by the same object. In this manner, the system can identify and analyze pairs of corresponding echoes associated with a common object such as object 708.

An object detected by infrared camera 702 may be defined by a horizontal location, i.e. location along the X-axis 712 from the field of view of the infrared camera. For example the horizontal location may be the X-coordinate a centroid of a pattern of visually contiguous pixels detected by thermal imaging camera 702, as further described below. A reference line, or normal, 710 extends from the infrared camera 702 perpendicular to the axis 714. Horizontal angles of objects within the field of view of infrared camera 702 may be defined with respect to the normal 710; for example an object located on the normal 710 is at the center of the field of view. In the present disclosure, the angle to the horizontal location of an object within the field of view of thermal imaging camera 702, e.g., angle A of the line 720, is called the "visual angle".

In an embodiment in which the thermal imaging camera is located at the midpoint between the ultrasound transducers, the "ultrasound angle" can be defined with reference to the same normal 710 in the global coordinate system that is used to define the visual angle. An object located on the normal 710 is equidistant from ultrasonic transducers 704 and 706, hence echoes from this object would have the same elapsed time measurement. In the configuration of FIG. 7, the system 700 would determine ultrasound angle A based upon the triangulation of object 708.

Visual angles can be compared with ultrasound angles in identifying objects. If the visual angle of an object 708 detected by the thermal imaging camera 702 substantially corresponds to the ultrasound angle of an object detected by ultrasound transducers 704, 706, it is highly probable that the object detected by the ultrasound transducers is the same as the object detected by the thermal imaging camera.

Figure 8:
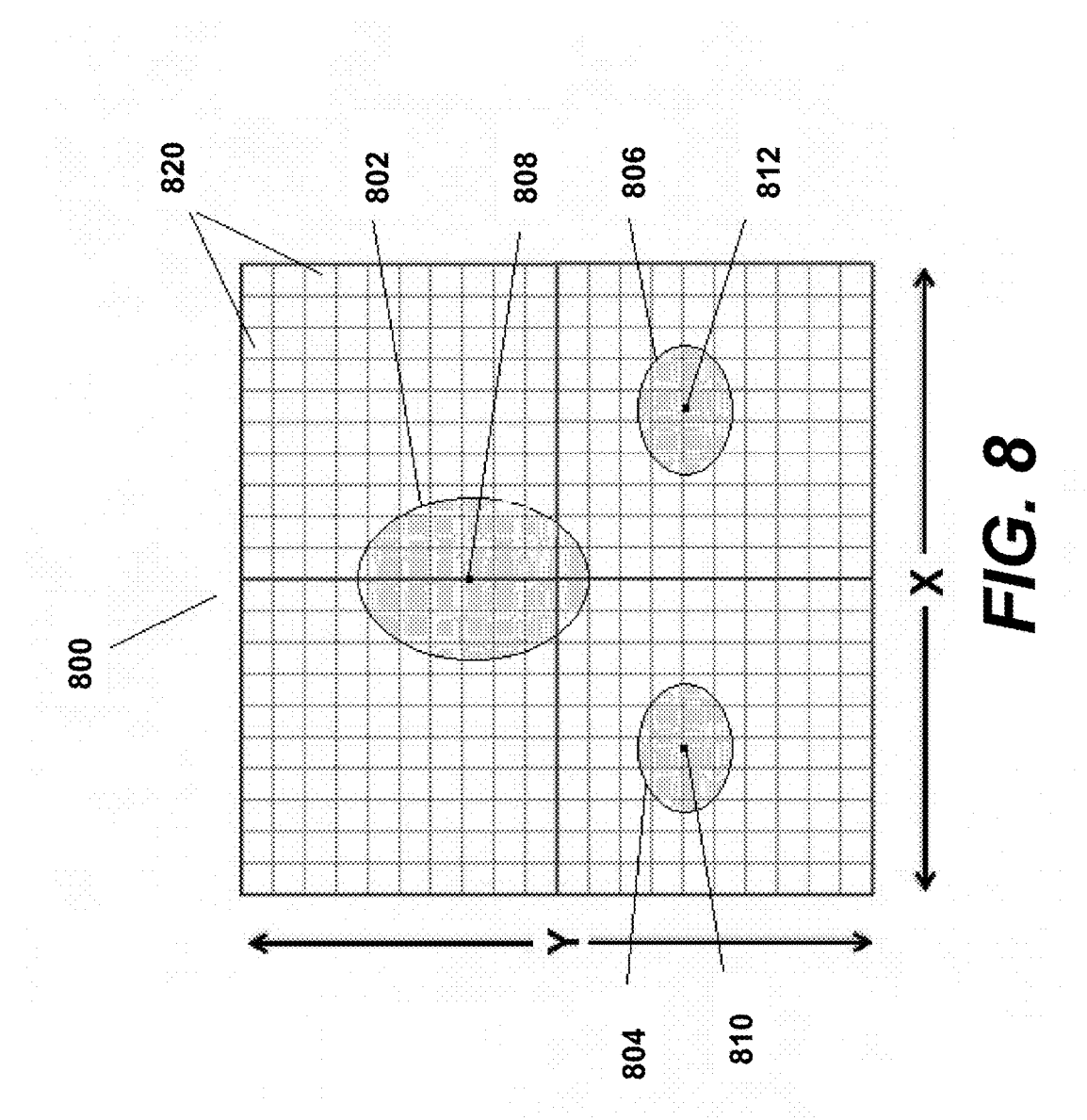
FIG. 8 is a two dimensional, X-Y grid of the field of view of a thermal imaging camera displaying several visually contiguous human temperature pixel patterns.

FIG. 8 is a two dimensional, X-Y grid of the field of view of a thermal imaging camera displaying several visually contiguous human temperature pixel patterns.

An exemplary thermographic image 800 within the field of view of a thermal imaging camera is shown. The thermographic image 800 includes a rectangular grid of pixels 820 arrayed along an X axis and Y axis. Each of the pixels has an associated numerical value based on measurement of infrared energy, wherein this value indicates a corresponding temperature. In an embodiment, pixels of varying temperature values are displayed in a thermogram using pseudo-colors. In an embodiment, the thermal imaging data is analyzed to identify patterns of pixels having temperature values within defined ranges. Pixels within defined temperature ranges are grouped in patterns of visually contiguous pixels. In an embodiment, a temperature range is selected to identify with temperature values characteristic of human body temperatures, i.e. visually contiguous body temperature pixels.

Multiple patterns of visually contiguous body temperature pixels may be arrayed in the field of view of thermal imaging camera. The thermographic image of field of view 800 includes three patterns of visually contiguous body temperature pixels, including a larger, higher central pattern 802 and smaller, lower side patterns 804, 806 of visually contiguous body temperature pixels. The thermographic image 800 might for example indicate features of a human, such as a human head corresponding to pattern 802, and human hands corresponding to patterns 804, 806.

In an embodiment, the system analyzes the patterns of visually contiguous body temperature pixels for various characteristics (symbolic thermal imaging data). These characteristics may include for example, two dimensional locations of the centroid 808 of visually contiguous body temperature pixels 802; two dimensional locations of the centroid 810 of visually contiguous body temperature pixels 804; and two dimensional locations of the centroid 812 of visually contiguous body temperature pixels 806.

In an embodiment, the system 500 of FIG. 5 combines these two-dimensional thermal imaging data with sensor measurements by ultrasound transducers 516 of objects corresponding to the visually contiguous body temperature pixels (such as living beings, or limbs or features of living beings) to obtain three dimensional locations. Each of these ultrasound measurements identifies a distance to one of the objects corresponding to patterns 802, 804, and 806. Ultrasound angles may be correlated with visual angles corresponding to horizontal locations of the centroids 808, 810, and 812 to confirm that a given ultrasound reading corresponds to one of the objects associated with the thermal imaging data. Ultrasound amplitude measurements also may be used in confirming correspondence of detected objects. In an embodiment, distances determined by ultrasound ranging are combined with the X and Y coordinates of centroids 808, 810, and 812 to determine three dimensional (X, Y, Z) coordinates for each of the visually identified objects.

Exemplary Embodiments Using Decision Manager Component

Figure 9:
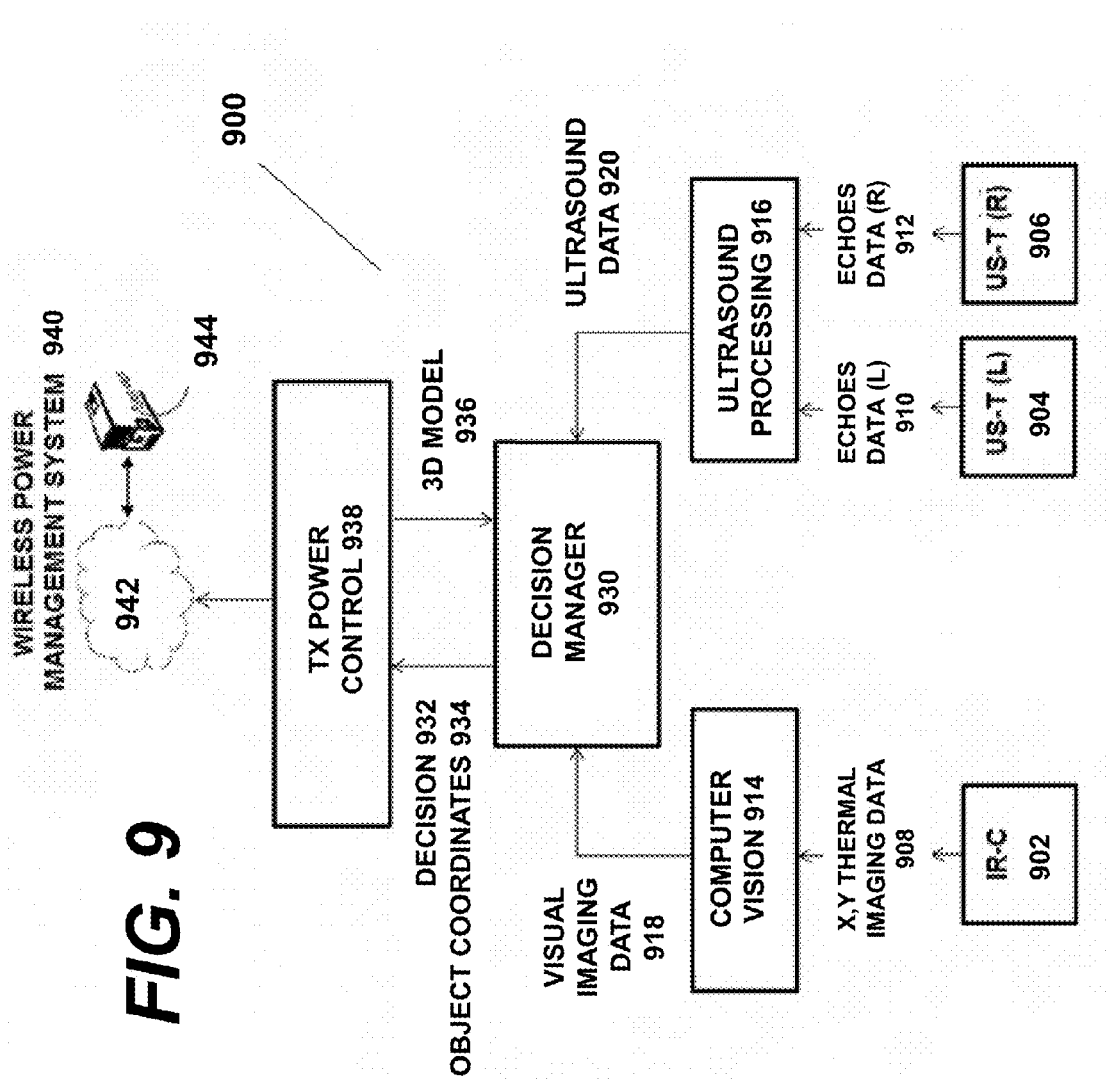
FIG. 9 illustrates an architecture of components of a wireless power transmission system, according to an exemplary embodiment.

FIG. 9 illustrates an architecture of components of a wireless power transmission system 900, according to an exemplary embodiment.

The components of the wireless power transmission system 900 may include an imaging sensor, two ultrasound transducers, and a decision manager that processes outputs of these devices. In one embodiment, the image sensor may operate as a video camera. TX power control 938 is configured to control power waves transmitted by a transmitter. In an embodiment, the transmitter transmits the power waves through at least two antennas. The power waves converge in a three dimensional space to form pocket of energy for receiving by an antenna element of a receiver, wherein the receiver is configured to harvest power from the pocket of energy. Decision manager 930 is configured to communicate a decision 932 to the TX power control 938. In an embodiment, the decision 932 instructs the TX power control 938 whether to adjust a power level of the power waves based upon three dimensional location information determined by the decision manager 930 for one or more object within the transmission field of the transmitter (e.g. living being, obstacle). Additionally the decision manager 930 may communicate to the TX power control 938 three dimensional coordinates 934 of the one or more object within the transmission field.

In an embodiment, the decision 932 communicated by decision manager 930 to the TX power control 938 is one of the following: (a) a decision to maintain full power level of the power waves; (b) a decision to reduce the power level of the power waves; or (c) a decision to terminate transmission of power waves. In options (b) or (c), immediately upon receipt of the decision 932, the TX power control 938 reduces or terminates transmission of power waves by controller, thereby enhancing system safety. The decision to reduce the power level of power waves, option (b), may include different levels of reduction of power level, for example based on different calculated distances of a living being from a transmitter based upon the three dimensional location information calculated by the decision manager 930.

To summarize the architecture and functions of the system 900, the decision manager 930 receives visual imaging data 918 (image data captured by camera) from a computer vision (CV) module 914, and receives ultrasound data 920 from an ultrasound processing (US) module 916. The decision manager 930 comprising a processor processes the visual imaging data 918 to identify a first set of coordinates of an object in the image data captured by the video camera with respect to location of the video camera, and the ultrasound data 920 to identify a second set of coordinates to identify a second set of coordinates of an object in the image data captured by the ultrasound sensors with respect to location of the video camera. In one embodiment, the processor of the decision manager 930 processes the visual imaging data 918 and the ultrasound data 920 to calculate three dimensional location information for the object within the transmission field of transmitter. In another embodiment, processor of the decision manager 930 calculate three dimensional location information for the object within the transmission field of transmitter based on the first and second set of coordinates.

The decision manager 930 may apply predetermined criteria to the calculated three dimensional location information to provide the decision 932. CV 914 generates the visual imaging data 918 based upon two dimensional imaging data (e.g., X-Y thermal imaging data) 908 that the CV 914 receives from an infrared camera 902. US 916 generates the ultrasound data 920 based upon echoes data (left) 910 and echoes data (right) that US 916 receives respectively from left ultrasound transmitter 904 (US-T (L) 904) and from right ultrasound transmitter 906 (US-T (R) 906).

In an embodiment, the TX power control 938 and the decision manager 930 are physically associated with wireless power transmitter (i.e., connected to, or a component of). Infrared camera 902 is communicatively coupled to transmitter and may be physically associated with transmitter (i.e., connected to, or a component of). The IR-C 902 may be positioned on or within a housing of a transmitter, or may be communicatively coupled to the transmitter but physically separated from transmitter. Likewise, the US-T (L) 904 and the US-T (R) 906 may be positioned on or within a housing of a transmitter, or may be communicatively coupled to the transmitter but physically separated from transmitter. In an embodiment, the IR-C 902, the US-T (L) 904, and the US-T (R) 906 are mounted to a housing of the transmitter, with the IR-C 902 located substantially at a midpoint between the US-T (L) 904 and the US-T (R) 906. The computer vision module 914 may be connected to or housed within the infrared camera 902, or may be physically separated from the IR-C 902. Similarly, the ultrasound processing module 910 may be one or more processor module connected to or housed within one or both of the US-T (L) 904 and the US-T (R) 906, or may be physically separated from the ultrasound transducers.

The infrared camera 902 forms two dimensional images using infrared radiation. The infrared camera 902 may be a near-infrared cameras that use the near-infrared part of the electromagnetic spectrum closest to visible light, or may be a thermal infrared camera that generally operates in the far infrared region. In an embodiment, the IR-C 902 captures thermal images of the objects within the camera's field of view and records these thermal images in two dimensional pixel arrays as X, Y thermal imaging data 908. Each pixel or photo site in the array detects infrared energy intensities, and the IR-C 902 stores individual temperature values for each pixel based on transformation of the infrared energy. Additional details of infrared imaging are described above.

The visual imaging data 918 of particular significance in the operations of the decision manager 930 include data indicating the presence of a living being or sensitive object within the transmission field of transmitter, and as well as data indicating presence of an obstacle within the transmission field of transmitter. Thermal imaging is especially useful in identifying living beings as warm objects within the field of view of the infrared camera 902, but thermal imaging also can be used to identify obstacles. Additionally, ultrasound imaging can provide useful ultrasound data 920 about presence, configuration, and location of obstacles to complement the visual imaging data 918.

The computer vision module 914 applies computer vision techniques to obtain the visual imaging data 918 based upon the X, Y thermal imaging data 918. Generally the visual imaging data 918 relates to two dimensional or one dimensional characteristics of the X, Y thermal imaging data 908, since the thermal imaging data 908 does not include three dimensional imaging data. In an embodiment, the CV 914 analyzes the thermal imaging data 908 to detect one or more object within the field of view of the IR-C 902 (in the present disclosure, such visually identified objects are sometimes called "visual objects"). In one embodiment, the CV 914 analyzes the thermal imaging data 908 to detect patterns of visually contiguous pixels. For example, the CV 914 may analyze the thermal imaging data 908 to detect one more pattern of visually contiguous body temperature pixels, such as the patterns 802, 804, 806 shown in FIG. 8. The CV 914 may analyze any identified patterns visually contiguous body temperature pixels for geometric characteristics such as area, centroid, length and width, and may provide visual imaging data based on this analysis to the decision manager 930.

In addition, the CV 914 may compare the visually contiguous pixel files with configuration files to look for a match with stored configurations. For example, the CV 914 may compare the configuration of visually contiguous body temperature pixels with human appearance patterns, sometimes called human shape detection (e.g., head detection, face detection, hand detection, human upper body detection). Alternatively, some of these computer vision analyses, such as human appearance pattern analysis, may be carried out by the decision manager 930. In addition, the decision manager 930 may use other computer vision techniques for human recognition such as human biometric attributes (e.g., human height); human motion detection; human activity detection (e.g., static posture, motion, and offset), and body temperature detection (e.g., skin detection). The combination of two-dimensional visual imaging data 918 with depth information obtained from the ultrasound data 920 to derive three dimensional location information can be critical to some of these techniques.

Ultrasound processing module 916 analyzes echoes data (left) 910 obtained from US-T (L) 904 and echoes data (right) 910 obtained from US-T (R) 906 to derive ultrasound data 920 for objects within ultrasound scan regions of US-T (L) 904 and US-T (R) 906. Typically ultrasound data includes vector data for a list of objects detected by US-T (L) 904 and US-T (R) 906 (in the present disclosure, such objects identified through ultrasound are sometimes called "ultrasound objects"). In an embodiment, vector data for each ultrasound object includes distance and ultrasound angle, for each of the detected objects. In an embodiment, the ultrasound processing module 916 pairs object detection data from US-T (L) 904 with object detection data from US-T (R) 906, based on determination that the paired data are associated with the same ultrasound object.

In an embodiment, the decision manager 930 compares the visual imaging data 918 for visual objects, with the ultrasound data 920 for ultrasound objects. The decision manager 930 may use various techniques to associate visual objects with ultrasound objects, as discussed above with reference to FIG. 7. For example, the decision manager 930 may look for correspondence between a visual angle for a given visual object within the field of view of the IR-C 902, with an ultrasound angle for a given ultrasound object. In an embodiment, the decision manager determines a visual angle to a visual object using a horizontal location corresponding to X, Y coordinates of a centroid of the visual object received from the computer vision module 914, calculating the visual angle to that X, Y location. If the visual angle corresponds to the ultrasound angle, decision manager may determine that the visual object corresponds to the ultrasound object.

In an embodiment, the comparison by the decision manager 930 of X-Y location information included in the visual imaging data 918 with ultrasound vectors contained in the ultrasound data 920, is based predominantly on a basis of substantially horizontal location information. In an embodiment, visual angles of visual objects included in the visual imaging data 918 correspond to substantially horizontal, X-axis, locations of the visual objects. Similarly, in an embodiment, ultrasound angles of ultrasound objects included in the ultrasound data 920 correspond to locations within a horizontal zone of the ultrasound transducers 904 and 906 and of the ultrasound scan regions of these ultrasound transducers. In an embodiment, these sensing characteristics are designed to sense most accurately objects that are at the same general height as the transmitter and the transmission field of transmitter; e.g. ground-level power transmission.

When the decision manager 930 determines that a visual object corresponds to an ultrasound object, it may use the related visual imaging data 918 and the ultrasound data 920 to calculate three dimensional location information, such as X, Y, Z location coordinates, for the object in question. The three dimensional location information can include various other three dimensional information beyond X, Y, Z location coordinates of objects, such as three dimensional data on movement of an object obtained by analyzing a series of frames of X, Y thermal imaging data 908; areas, length and widths of objects; pattern recognition data; etc.

In another embodiment, the decision manager 930 may identify multiple visual objects within the field of view of IR-C 902 and may analyze the visual objects to look for relationships. For example, decision manager may analyze whether multiple visually contiguous body temperature pixels correspond to different features of a given living being (such as head and hands) or whether the multiple patterns visually contiguous body temperature pixels correspond to more than one living being. Comparison by the decision manager 930 of the visual imaging data 918 with the ultrasound data 920 can an important element of this analysis. For example, a comparison with the ultrasound data 920 may show that a first pattern of visually contiguous body temperature pixels is located at a significantly different distance from the IR-C 902 than a second pattern of visually contiguous body temperature pixels, indicating that these patterns identify different physical objects.

In an embodiment, decision manager also may receive a 3D model 936 from Tx power control or from another component of the wireless power transmission system, such as external mapping memory. For example, multiple transmitters may communicate with one or more decision manager 930 to maintain a 3D image map, such as a point cloud model, based in part on three dimensional location information derived from visual imaging data and ultrasound data. In addition, each transmitter may generate heat-mapping data from communications signals to create a second type of 3D map of the transmission field. Multiple transmitters may upload their visual imaging data and/or heat map data to external mapping memory, which may act as a 3D model server that maintains a three dimensional point cloud model incorporating thermal imaging data received from all transmitters at a location. Individual transmitters may download the 3D models from the 3D model server to provide more accurate 3D coordinates of objects detected by all thermal imaging cameras and other sensors. Decision manager 930 may compare this 3D model with three dimensional location information obtained from analyzing the visual imaging data 918 and the ultrasound data 920, in determining the decisions 932.

In an embodiment, the decision manager 930 may communicate notifications to components of the wireless power transmission system 900. For example, a decision 932 can be considered a notification by decision manager to the TX power control 938. Tx power control may forward this and other information received from the decision manager 930 to the wireless power transmission manager 940, which oversees operations of the wireless power transmission system 900 and optionally, to other elements of the wireless power transmission system such as a set of antennas. For example, the TX power control 938 may communicate notifications to the wireless power transmission manager 940 via the cloud 942, which may be an internet cloud, a business cloud, or a service provider cloud. Wireless power management system may store these notifications and other information at the server 944.

Figure 10:
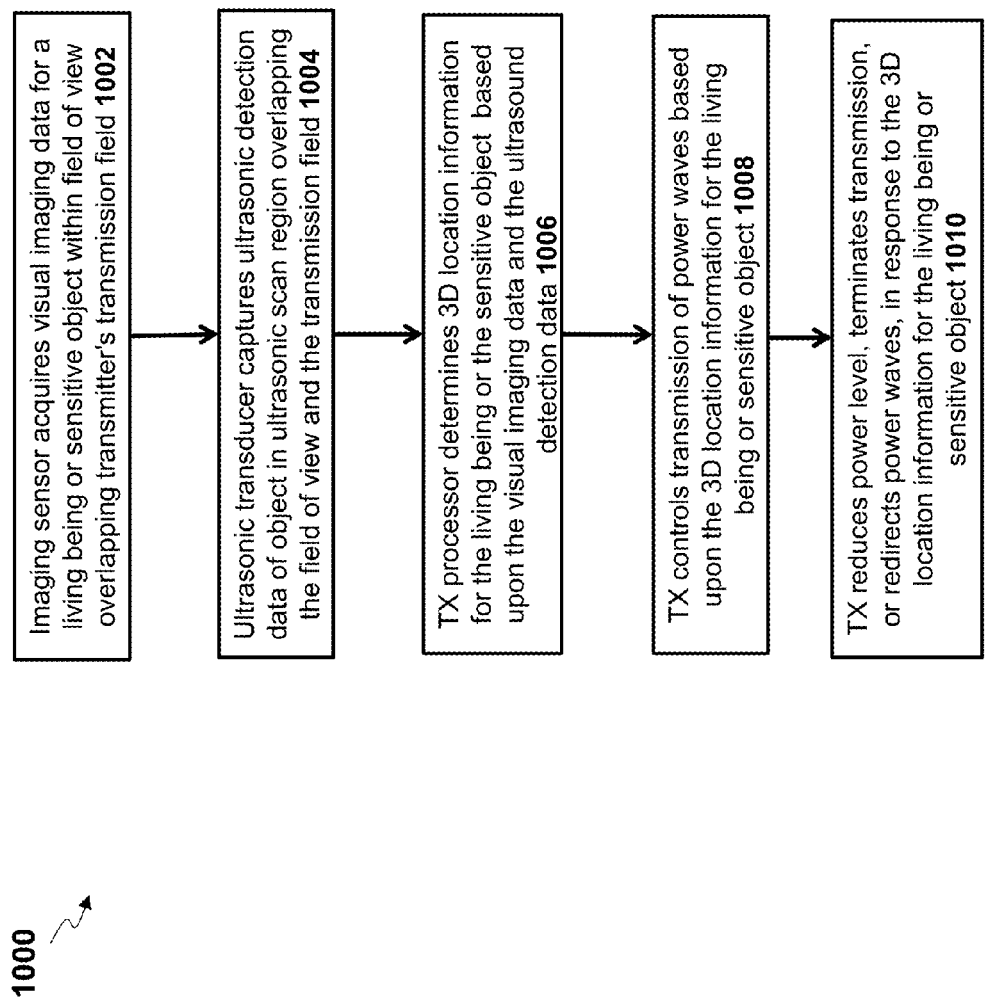
FIG. 10 is a flow diagram illustrating a method of identifying objects within a transmission field of a transmitter of a wireless power transmission system using a thermal imaging camera with ultrasonic transducers, according to an exemplary embodiment.

FIG. 10 is a flow diagram illustrating a method 1000 of identifying objects within a transmission field of a transmitter of a wireless power transmission system using a thermal imaging camera with ultrasonic transducers, according to an exemplary embodiment.

Transmitters of a wireless power system may comprise a thermal imaging camera and ultrasound detectors that collectively detect whether a living being is in proximity to one or more pocket of energy, power waves, and/or a transmitter. In these circumstances, the system may analyze thermal imaging data generated by the camera and ultrasound detection data generated by the ultrasound transducers, to determine 3D location information for a living being or sensitive object within the transmission field of the transmitter. This three dimensional location information may cause the transmitter to reduce or terminate power levels of power waves, among a number of additional or alternative actions.

At a first step 1002, a camera acquires thermal imaging data for a living being or sensitive object within a field of view of the camera. The field of view of the camera overlaps a transmission field of the transmitter. In some embodiments, the camera acquires two dimensional thermal imaging data. In an embodiment, the camera acquires two dimensional thermal imaging data for a living being or sensitive object within a field of view of the camera overlapping a transmission field of the transmitter.

In an embodiment of step 1002, the camera acquires thermal imaging data including visually contiguous pixels. In various embodiments, the camera is a thermal imaging camera. In an embodiment, the thermal imaging data includes visually contiguous body temperature pixels indicating a two dimensional location of the living being within the field of view of a thermal imaging camera. In an embodiment, the camera is a single thermal imaging camera, which may communicate to the transmitter two dimensional thermal imaging data concerning the presence and/or location of objects, such as a living being associated with visually contiguous body temperature pixels.

In an embodiment, the camera is a thermal imaging camera that forms a plurality of thermal images over time of one or more field of view overlapping the transmission field of the transmitter. In an embodiment, the thermal imaging camera communicates to the transmitter thermal imaging data indicating motion of visually contiguous body temperature pixels in the thermal images.

At a second step 1004, at least one ultrasound transducer in communication with the transmitter captures ultrasound detection data of one or more objects in an ultrasound scan region. In an embodiment, the ultrasound scan region overlaps the field of view of the imaging sensor and the transmission field of the transmitter.

In an embodiment of step 1004, a first ultrasound transducer captures first ultrasound detection data for one or more object in the ultrasound scan region, and a second ultrasound transducer captures second ultrasound detection data for the one or more object in the ultrasound scan region. In an embodiment, the first ultrasound detection data and the second ultrasound detection data is processed to provide ranging information for the one or more object. In an embodiment, the first ultrasound detection data and the second ultrasound detection data is processed to provide an ultrasound angle for the one or more object. In an embodiment, the camera of step 1002 is located substantially at a midpoint between the first ultrasound transducer and the second ultrasound transducer.

In an embodiment, at step 1002 the camera acquires the thermal imaging data for the living being or the sensitive object within an X-Y image area of the field of view of the imaging sensor; and at step 1004 a first ultrasound transducer and a second ultrasound transducer are located on a line parallel to the X-Y image area. The first ultrasound transducer and a second ultrasound transducer located on a line parallel to the X-Y image area capture ultrasound detection data for the one or more object in the ultrasound scan region.

At a next step 1006, a processor of the transmitter or in communication with the transmitter determines three dimensional location information for the living being or the sensitive object based upon the thermal imaging data and the ultrasound detection data.

In an embodiment of step 1006, two ultrasound transducers capture ultrasound detection data for the one or more object in the ultrasound scan region, and the processor determines an ultrasound angle for the one or more object. The processor determines, wherein the includes a visual angle of the living being or the sensitive object in the thermal imaging data from the camera and the ultrasound detection data includes an ultrasound angle of the one or more object from the camera. The processor of the transmitter or in communication with the transmitter determines correlating the visual angle of the living being or the sensitive object with the ultrasound angle of the one or more object to determine that the one or more object corresponds to the living being or the sensitive object.

In an embodiment of step 1006, a decision manager associated with the transmitter determines the three dimensional location information for the living being or the sensitive object based upon the thermal imaging data and the ultrasound detection data.

In a next step 1008, the transmitter controls the transmission of power waves based upon three dimensional location information for the living being or the sensitive object based upon the thermal imaging data and the ultrasound detection data. In an embodiment of step 1008, the transmitter compares the three dimensional location data for the living being or sensitive object obtained at step 1006, with coordinates (e.g., one-dimensional coordinates, two dimensional coordinates, three dimensional coordinates) of the transmitter. In an embodiment, the transmitter calculates a distance of the living being or sensitive object from the transmitter, and reduces or terminates power in the event that distance falls below a threshold proximity value. In another embodiment of step 1008, the transmitter compares information concerning the three dimensional location data for a living being or sensitive object, obtained at step 1008, with coordinates (e.g., one-dimensional coordinates, two dimensional coordinates, three dimensional coordinates, polar coordinates) of a predetermined location of a pocket of energy. In an embodiment, the transmitter calculates a distance of the living being from the predetermined location of the pocket of energy, and reduces or terminates power in the event that distance falls below a threshold proximity value.

In an embodiment of step 1008, a decision manager associated with the transmitter makes a decision whether to adjust the power level of the power waves based upon the three dimensional location information the three dimensional location information. In this embodiment, the decision whether to adjust the power level of the power waves may be one of a decision to maintain full power level of the power waves, a decision to reduce the power level of the power waves, or a decision to terminate the power waves.

In an embodiment of steps 1006 and 1008, a decision manager associated with the transmitter determines three dimensional location information for an obstacle within the transmission field of the transmitter, and determines to terminate transmission of power waves if this three dimensional location information indicates that the obstacle obstructs the field of view of the camera.

In some implementations, in step 1008 the transmitter, or the decision manager associated with the transmitter, may apply safety techniques to the determination of whether to adjust the power waves, using the location data in the sensor data associated with the living being or sensitive object. One safety technique is to include a margin of error (e.g., a nominal margin of 10%-20%) beyond the regulatory limits or other limits on maximum permissible power level or on EMF exposure, to ensure living beings are not exposed to power levels at or near the limits. Another safety technique is to make a determination to reduce or terminate the power waves in the event an obstacle obstructs the field of view of the camera.

At a next step 1010, the transmitter may execute one or more actions if the transmitter (or a decision manager associated with the transmitter) determines to adjust power waves based upon the three dimensional location information for the living being or the sensitive object based upon the thermal imaging data and the ultrasound detection data. In some cases, the transmitter reduces the power level of the power waves at the predetermined location. In some cases, the transmitter terminates transmission of the power waves. In some embodiments, the transmitter redirects the transmission of the power waves around the living being or sensitive object. Additionally or alternatively, the transmitter may activate an alarm of the transmitter or wireless charging system.

Figure 11:
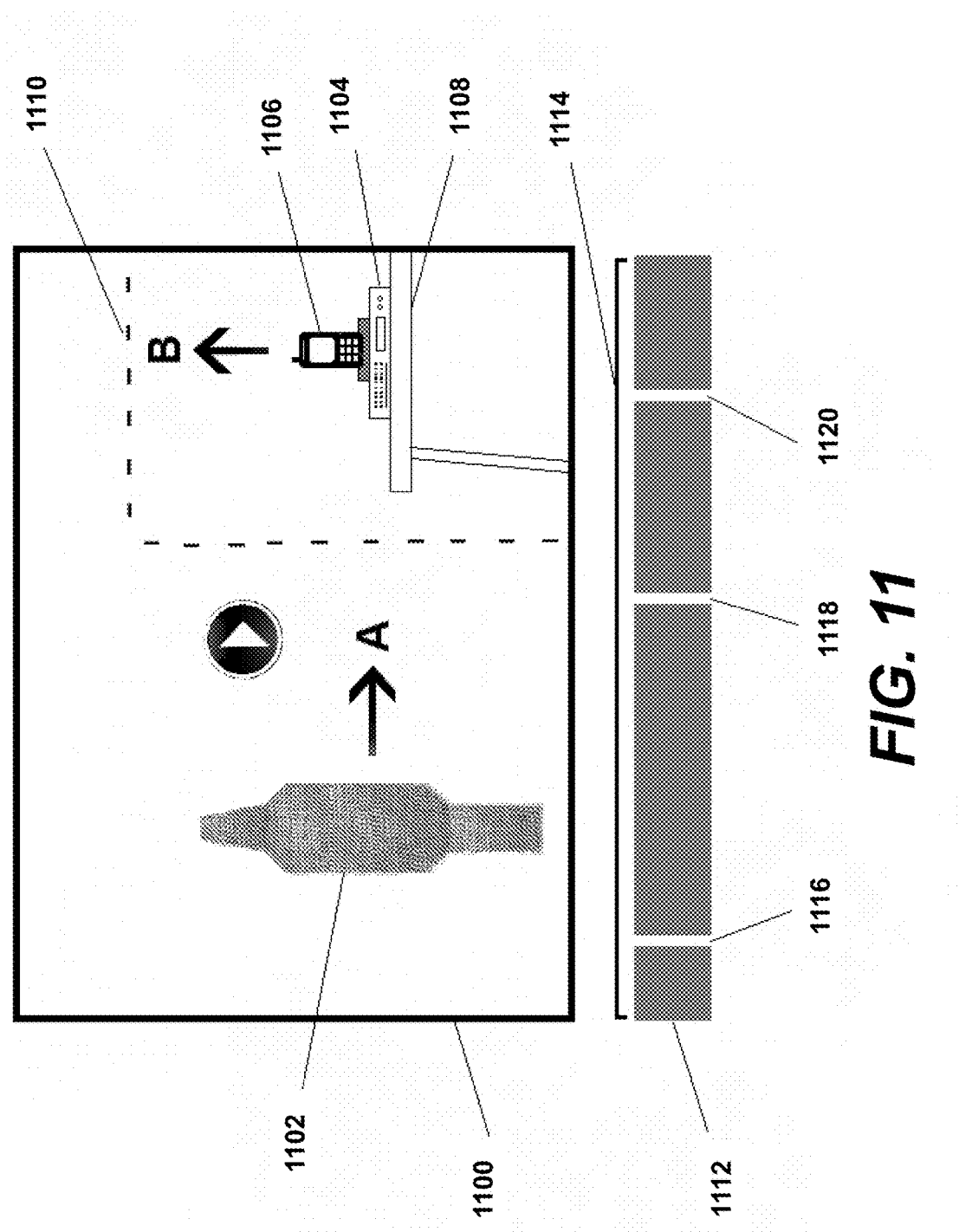
FIG. 11 is a simplified example of identification of selected features and extraction of selected video segments of wireless power transmission in a wireless power transmission system, according to an exemplary embodiment.

FIG. 11 shows an exemplary frame 1100 from a video captured by imaging sensor in a field of view overlapping the transmission field of a transmitter in a wireless power transmission system, according to an exemplary embodiment.

The imaging sensor such as a thermal imaging camera captures video imaging data of a scene including a human being 1102, wireless power receiver 1104, electronic device 1106, and table 1108 supporting the receiver 1104 and electronic device 1106. The system identifies human being 1102 as a selected object, and captures an extracted video segment in the form of a single frame showing biometric features and other visual features of the human being 1102. The "selected object" refers to an item of interest in video imaging data, usually captured within the transmission field of a wireless power transmission system. Examples of objects include a person, a pet, an electronic device that receives wireless power, a wireless power receiver, a wireless power transmitter, and an obstacle. In an embodiment, selected objects include living beings (such as human beings and animals) and other sensitive objects. Sensitive objects may include certain equipment and other valuable objects that are sensitive to electromagnetic energy in power waves. Selected objects may include object categories (such as human beings), and may include particular objects (such as a uniquely identified electronic device).

In the time indicator 1112, the system captures the single frame at time 1116. The system identifies the movement (indicated by arrow A) of human being 1102 toward wireless power receiver 1104 as a selected event, and extracts a video segment in the form of video clip showing this movement over the time span 1114. The system identifies certain activities of human being 1102 during this movement as additional selected events, and extracts an array of frames depicting these selected events. These additional selected events include human being 1102 entering a zone 1110 of defined proximity to the receiver 1104 (snapshot extracted at time 1118), and human being 1102 raising the electronic device 1106 off of the receiver 1104 (indicated by arrow B; snapshot extracted at time 1120). The zone 1110 of proximity to the receiver 1104 is a selected location corresponding to a rectangular section of frame 1100, indicated schematically by dotted lines. It should be understood that although FIG. 11 illustrates the scene of frame 1100 in two dimensions, a plurality of imaging sensors may capture three dimensional video imaging data of a scene, and various objects and locations (such as human being 1102 and zone of proximity 1110) can be defined using three dimensional coordinates.

In an embodiment, the "selected event" refers to one or more objects engaged in an activity of interest. Selected events may be referenced with respect to a particular location or time. An "activity" refers to one or more action or composites of actions of one or more objects including interactions between objects. Examples of activities include entering; exiting; moving; stopping; raising; and lowering. Examples of selected events include a living being or sensitive object entering a location in close proximity to a transmitter or a pocket of energy 2337; video imaging data of a living being growing over time (indicating that the living being is moving toward the transmitter); and movement of furniture carrying a wireless power receiver 2303 that causes an obstacle to obstruct an imaging sensor's view of the receiver.

In an embodiment, the "selected location" refers to a space, usually within the transmission field of the wireless power transmission system, where an object of interest may be located or where an activity of interest may occur. A selected location can be scene-based or image-based. Examples of scene-based locations include a room; an enclosed area within a room; an area in which wireless power transmission is authorized; an area in which wireless power transmission is prohibited; physical extent of a transmission field of a wireless power transmitter; extent of overlapping transmission fields of multiple wireless power transmitters; a zone of defined proximity to a transmitter; a zone of defined proximity to a receiver or pocket of energy; a zone of proximity to an electronic device; three dimensional coordinates of a pocket of energy; three dimensional coordinates of multiple pocket of energy; a space obstructed by an obstacle; a vertically limited space such as an area under a table carrying a wireless power receiver; and a location tagged by a system user via a tagging device. Examples of image-based locations include: a video image; a line in a video image; an area in a video image; a rectangular or polygonal section of a video image; and visually contiguous pixels within a video image. A selected location can be a three dimensional space, two dimensional space, or one dimensional space.

In an embodiment, a processor that is communicatively coupled to imaging sensors receives video imaging data captured by one or more of imaging sensors, and analyzes this video imaging data to identify one or more selected features within the transmission field of transmitters. In an embodiment, based upon the identified selected features, the processor extracts from the video imaging data, one or more selected video segments depicting the one or more selected features.

As used in the present application, the term "selected features" refers to one or more features of video imaging data that are identified in order to select video segments to be extracted from the video imaging data. Selected features are sometimes called features of interest in the present disclosure. In one embodiment, selected features may include objects, events and locations, or combinations of these items, within video imaging data that are identified in order to select video segments to be extracted from the video imaging data. In an embodiment, the selected features are features of video imaging data captured within the transmission field, such as features that are particularly important or noticeable. In an embodiment, selected features are identified by analyzing video imaging data using predetermined criteria. In an embodiment, selected features are identified via computer analysis of the video imaging data using computer vision techniques, or other object recognition techniques. As used in the present application the term "selected video segments" refers to one or more video segments that are extracted from video imaging data, and that depict one or more selected features.

The processor issues a report including the extracted selected video segments. In an embodiment, the processor communicates this report to a wireless power management system, for example, hosted in a cloud or a server. In various embodiments, the cloud may be an internet cloud; a business cloud, or a service provider cloud. In another embodiment, the processor communicates the selected video segments to a transmitter, and the transmitter reports a report including the selected video segments to the wireless power management system.

Figure 12:
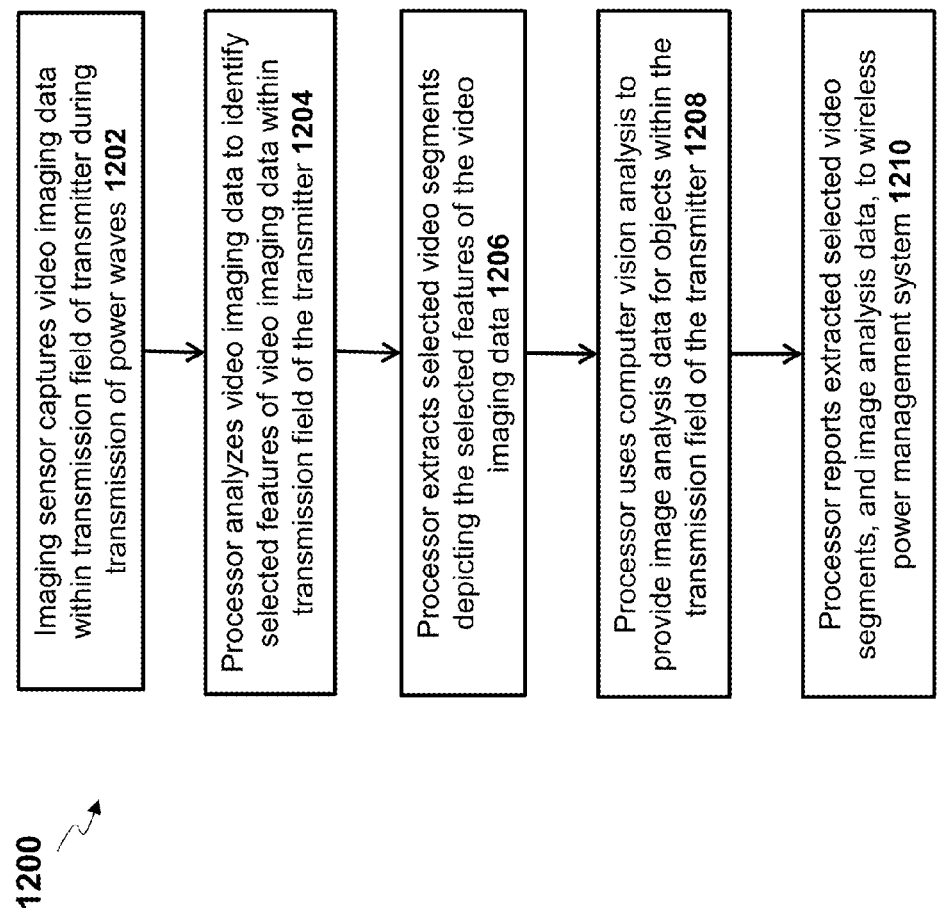
FIG. 12 is a flow diagram illustrating steps of computer video analytics of video imaging data captured during wireless power transmission in a wireless power transmission system, according to an exemplary embodiment.

FIG. 12 is a flow diagram 1200 illustrating steps of computer video analytics of video imaging data captured during wireless power transmission in a wireless power transmission system, according to an exemplary embodiment.

Imaging sensors of a wireless power system may capture actual video images within a field of view overlapping a transmission field of transmitters during the transmission of power waves for receiving by an antenna element of a receiver. A processor analyzes the actual video images to identify selected features, such as selected objects and selected events, within the transmission field and to extract one or more selected video segments depicting the selected features. Selected video segments, and related image analysis data, may be reported to a wireless power management system for use in system analytics, troubleshooting, and other purposes.

At step 1202, an imaging sensor captures video imaging data with the field of view of one or more imaging sensor, overlapping the transmission field of a transmitter. The imaging sensor captures the video imaging data during the transmission by the transmitter of power waves that form one or more pocket of energy for receiving by an antenna element of a receiver. The receiver is configured to harvest power from the one or more pocket of energy, for example to charge or power an electronic device. In an embodiment, the imaging sensor is a thermal imaging camera that captures video imaging data in the form of thermal images. In another embodiment, the imaging sensor is an optical imaging camera that captures video imaging data in the form of visible light images. In an embodiment, a plurality of imaging sensors capture stereoscopic video imaging data. In an embodiment, the system converts video imaging data captured as analog video signals into video imaging data in digital form.

In various embodiments, the video imaging data may be video feeds or recorded video. The video imaging data captured by the imaging sensors may include two dimensional video images, or three dimensional video images. The video imaging data may consist of X by Y arrays of pixel data. In an embodiment in which the imaging sensor is a thermal imaging camera, the video imaging data includes X by Y arrays of pixel data representing temperatures. In an embodiment in which the imaging sensor is an optical imaging camera, the video imaging data includes X by Y arrays of pixel data representing individual color (e.g., RGB) values.

In an embodiment, the video imaging data includes a pattern of visually contiguous pixels corresponding to one or more objects within the field of view. In an embodiment, the video imaging data includes a pattern of visually contiguous body temperature pixels corresponding to one or more living being within the field of view.

At step 1204, a processor analyzes the video imaging data to identify one or more selected features within the transmission field of the transmitter. In an embodiment, the one or more selected features include one or more of a selected object, a selected event, and a selected location. In an embodiment, the one or more selected features include one or more of a transmitter, a receiver, an electronic device that receives power from a receiver, a living being, a sensitive object, and an obstacle.

In an embodiment, the selected feature includes a selected event, including one or more object engaged in an activity of interest. In an embodiment, the object is engaged in one or more of the following activities: entering; exiting; moving; stopping; raising; lowering; growing; and shrinking. In an embodiment, the selected event includes an object engaged in an activity of interest with respect to another object. In an embodiment, the selected event includes an object engaged in an activity of interest with respect to a location within transmission field of the transmitter.

In an embodiment, the selected feature includes a selected location within the transmission field of the transmitter. In an embodiment, the selected location includes one or more of an area of authorized power transmission; an area of prohibited power transmission; a zone of predefined proximity to a transmitter; a zone of predefined proximity to a receiver; or a zone of predefined proximity to an electronic device. In an embodiment, the selected location is an image-based location within video imaging data. The selected location may include a video image; a line in a video image; an area in a video image; a rectangular or polygonal section of a video image; or a visually contiguous pixels within a video image In an embodiment of the step 1204, the selected feature includes a selected event affecting exposure of a living being or sensitive object to the power waves that form the one or more pocket of energy for receiving by an antenna element of a receiver, or affecting efficiency of transmission by the transmitter of power waves that form one or more pocket of energy.

In an embodiment, the processor uses computer vision techniques to identify one or more selected features in the video imaging data. In an embodiment, the processor additionally uses data other than imaging data (such as data from a sensor other than an imaging sensor) to identify one or more selected features in the video imaging data.

At step 1206, the processor extracts from the video imaging data, one or more selected video segments depicting the selected features identified at step 1204. In an embodiment, the selected video segments include one or more of video clips; extracted video stills, frames or snapshots; and sequences or arrays of video stills or frames. In an embodiment, the selected video segment includes a timed sequence of snapshots.

In an embodiment, the selected video segments are extracted for reporting in real time. In another embodiment, the extracted video segments are recorded for later viewing. In various embodiment, the selected video segments are accompanied by other content. In one embodiment, embodiment, the selected video segments are accompanied by audio content such as audio feeds or extracted audio clips. In another embodiment, the selected video segments are accompanied by messages or text content. In an embodiment, selected video segments are accompanied by tags or metadata.

At step 1208, the processor uses computer vision analysis to provide image analysis data of objects within the transmission field of the transmitter. In an embodiment, the video segments extracted at step 1206 are accompanied by the image analysis data obtained from computer vision analysis of video imaging data in monitoring or analyzing operations of the wireless power transmission system. In an embodiment, the image analysis data is based on analysis of one or more of the selected features identified at step 1204. In an embodiment, the image analysis data includes a model of a visual scene overlapping the transmission field of the transmitter.

At step 1210, the processor reports selected video segments extracted at step 1206 to a wireless power management system. In an embodiment, the processor reports image analysis data provided at step 1208 to a wireless power management system, along with the selected video segments. In an embodiment, the processor reports the selected video segments the wireless power management system in real time, for current monitoring of the wireless power transmission system. In an embodiment, the processor reports recordings of selected video segments to the wireless power management system, for review at a later time.

Exemplary Method of Generating Symbolic Data

Figure 13:
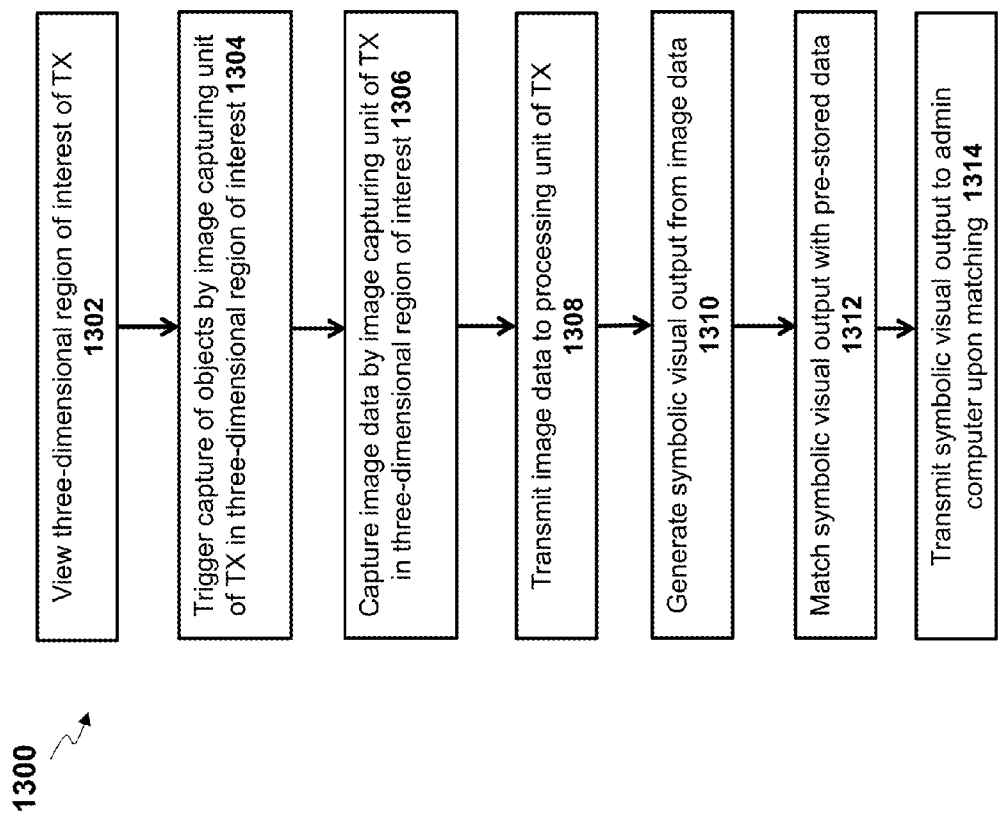
FIG. 13 is a flow diagram illustrating a method of identifying objects within a transmission field of a transmitter of a wireless power transmission system, according to an exemplary embodiment.

FIG. 13 is a flow diagram illustrating a method of identifying objects within a transmission field of a transmitter of a wireless power transmission system, according to an exemplary embodiment.

At step 1302, cameras and/or sensors coupled to a transmitter may capture location data for objects and/or receivers within a three-dimensional region of interest of a transmitter, such as the transmission field of the transmitter and/or some region beyond the transmission field. The transmitter may include one or more cameras that are configured to view the three-dimensional region of interest of the transmitter. The cameras may include one or more video cameras. The one or more video cameras may include but not limited to infrared cameras, thermal cameras, and visible light cameras.

In some embodiments, the transmitter may include a single video camera. In another embodiment, the transmitter may include an array of video cameras of same or different types such as infrared cameras, thermal cameras, and visible light cameras. The array of video cameras may be positioned for viewing a region of interest of the transmitter. In some cases, the region of interest corresponds to a transmission field (or transmission field area) of the transmitter. The array of video cameras may be arranged in a linear array in the transmitter. In an alternate embodiment, the various other spatial arrangements including two-dimensional arrays of video cameras may be used.

In some embodiments, such as an exemplary system, the cameras may be a component of the transmitter, housed within the transmitter. In some embodiments, the cameras may be external to the transmitter and may communicate, over a wired or wireless connection with one or more transmitters.

At step 1304, an image processor controlling operations of the one or more cameras of the transmitter may capture image data of one or more objects within the three-dimensional region of interest. The transmitter may comprise a separate distinct image processor, or the image processor may be the same processor of the transmitter used to manage other transmitter functions. In some implementations, the image processor may have a triggering mechanism for capturing a set of one or more image frames containing image data of one or more areas within the three-dimensional region of interest by the one or more video cameras. The triggering mechanism may have a central clock signal and an optional signal delivery unit. The central clock signal is delivered via the signal delivery unit to the one or more video cameras. In another embodiment, it is also possible to deliver the central clock signal directly to the one or more video cameras either by a physical connection or by a wireless connection. In other embodiments, the one or more video cameras may have their own internal synchronized clocks. A person of skill in the art will recognize that there are many ways to provide clock signal for the transmitter and will appreciate how to adjust the configuration of the transmitter depending on the actual way in which clock signal is generated and distributed to the one or more video cameras of the cameras of the transmitter.

The one or more objects may include electronic devices such as cell phones, laptops, humans, animals, furniture such as chairs, receivers embedded within the electronic devices, and receivers as individual components.

At step 1306, the image processor may capture image data within the three-dimensional region of interest. After a trigger signal is generated by the trigger mechanism of the transmitter, the one or more video cameras of the image processor initiates the capturing of the one or more objects in the transmission field area of the transmitter, and produces the image data capturing the one or more objects within the transmission field. The image data captured by the one or more video cameras of the image processor may include images/frames capturing the one or more objects within the transmission field of the transmitter.

In one embodiment, the trigger mechanism of the transmitter circuit may be configured such that each of the one or more video cameras of the image processor continuously and/or periodically capture the image data, video data, and audio data in the transmission field of the transmitter. In another embodiment, the trigger mechanism of the transmitter circuit may be configured such that each of the one or more video cameras of the image processor are activated at a different time with respect to each other to capture the image data in the transmission field of the transmitter.

At step 1308, the image processor may transmit the image data to a processor of the transmitter, in such embodiments where the image processor is a distinct processor from the transmitter processor. The cameras capture images within the three-dimensional region of interest of the transmitter, and transmits it to the processor of the transmitter. The processor processes the image data to generate symbolic data from the image data at step 1310. The symbolic data corresponds to data represented by a numerical value for each of the one or more objects in the image data, and the symbolic data varies depending on a video camera used from the one or more video cameras to capture the image data.

An image processor, as well as other potential processors of the transmitter, may include a single processor or a plurality of processors for configuring the transmitter as a multi-processor system, and may control functional aspects of the transmitter based on signal inputs and firmware programming. The processor includes suitable logic, circuitry, and interfaces that are operable to execute one or more instructions to perform predetermined operations. The processor can be realized through a number of processor technologies known in the art. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

The processor may include a computer vision software or any suitable software that is programmed to recognize and locate the position of the one or more objects in the captured images. In order to recognize the one or more objects, the image data may be processed to generate the symbolic data. In one embodiment, the symbolic data may include a temperature value of each of the one or more objects in the image data when the image data is captured by a thermal camera. The symbolic data is analyzed to determine number of the one or more objects, three-dimensional (XYZ) coordinates of the one or more objects, motion status of the one or more objects, and size of the one or more objects.

At step 1312, the processor compares the symbolic data with pre-stored data. The symbolic data may be compared with the pre-stored data stored in a memory unit in order to identify each object in the one or more objects captured in the image data. In one embodiment, during the step of identifying the objects from the image data whose symbolic data is temperature values, the processor recognizes the face and/or other body characteristic of the object and then compares the face and/or another relevant body characteristic read with a corresponding face and/or other pre-memorized body characteristic stored as the pre-stored data to identify the object from the one or more objects within the image data. The objects identified based on comparison with the pre-stored data may include receivers, electronic devices, humans, and animals.

The processor is further configured to transmit a signal to antennas of the transmitter on identifying the given object. The antennas are configured to control the transmission of one or more power waves towards the given object. For example, the antennas is configured to transmit the one or more power waves towards the given object when the given object is identified as a receiver unit, and the antennas are configured to not transmit the one or more power waves towards the given object when the given object is identified as a living being.

At step 1314, the processor transmits the symbolic data to admin computer based upon matching. When the computer vision software of the processor recognizes the object in the image data based on the matching of the objects with the pre-stored data, then the computer vision software of the processor is also configured to transmit the symbolic data to the admin computer. In one embodiment, the computer vision software may transmit the raw image data of the matched objects to the admin computer. In another embodiment, the computer vision software may determine the X, Y, Z coordinates of the matched objects and transmits it to the admin computer.

Exemplary Method of Matching Visual Patterns

Figure 14:
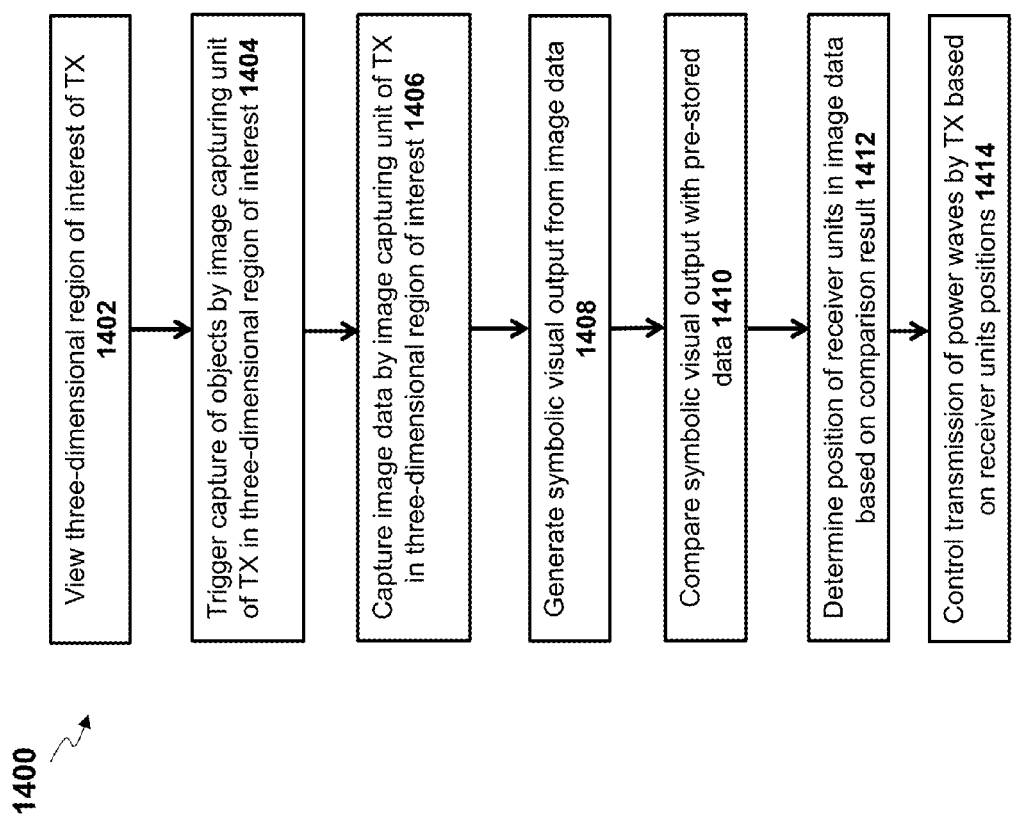
FIG. 14 is a flow diagram illustrating a method of identifying receivers within a transmission field of a transmitter of a wireless power transmission system, according to an exemplary embodiment.

FIG. 14 is a flow diagram illustrating a method of identifying receivers within a transmission field of a transmitter of a wireless power transmission system, according to an exemplary embodiment.

At 1402, cameras and/or sensors coupled to a transmitter may capture location data for objects and/or receivers within a view a three-dimensional region of interest of a transmitter, such as the transmission field of the transmitter. The transmitter may include an cameras that is configured to view the three-dimensional region of interest of the transmitter. The cameras may include one or more video cameras. The one or more video cameras may include but not limited to infrared cameras, thermal cameras, and visible light cameras.

In some embodiments, the transmitter may include a single video camera. In another embodiment, the transmitter may include an array of video cameras of same or different types such as infrared cameras, thermal cameras, and visible light cameras. The array of video cameras may be positioned for viewing a region of interest of the transmitter. In some cases, the region of interest corresponds to a transmission field (or transmission field area) of the transmitter. The array of video cameras may be arranged in a linear array in the transmitter. In an alternate embodiment, the various other spatial arrangements including two-dimensional arrays of video cameras may be used.

In some embodiments, such as an exemplary system, the cameras may be a component of the transmitter, housed within the transmitter. In some embodiments, the cameras may be external to the transmitter and may communicate, over a wired or wireless connection with one or more transmitters.

At 1404, an image processor controlling operations of the one or more cameras of the transmitter may capture image data of objects by the cameras of the transmitter in the three-dimensional region of interest. The transmitter may comprise a separate distinct image processor, or the image processor may be the same processor of the transmitter used to manage other transmitter functions. In some implementations, the image processor of the transmitter may have a triggering mechanism for capturing a set of one or more image frames containing image data of one or more areas within the three-dimensional region of interest by the one or more video cameras. In one embodiment, the triggering mechanism may have a central clock signal and an optional signal delivery unit. The central clock signal is delivered via the signal delivery unit to the one or more video cameras. In another embodiment, it is also possible to deliver the central clock signal directly to the one or more video cameras either by a physical connection or by a wireless connection. In other embodiments, the one or more video cameras may have their own internal synchronized clocks. A person of skill in the art will recognize that there are many ways to provide clock signal for the transmitter and will appreciate how to adjust the configuration of the transmitter depending on the actual way in which clock signal is generated and distributed to the one or more video cameras of the cameras of the transmitter.

The one or more objects may include electronic devices such as cell phones, laptops, humans, animals, furniture such as chairs, receivers embedded within the electronic devices, and receivers as individual components.

At 1406, the image processor may capture image data within the three-dimensional region of interest. After a trigger signal is generated by the trigger mechanism of the transmitter, the one or more video cameras of the image processor initiates the capturing of the one or more objects in the transmission field area of the transmitter, and produces the image data capturing the one or more objects within the transmission field. The image data captured by the one or more video cameras of the image processor may include images/frames capturing the one or more objects within the transmission field of the transmitter.

In one embodiment, the trigger mechanism of the transmitter circuit may be configured such that each of the one or more video cameras of the image processor continuously and/or periodically capture the image data, video data, and audio data in the transmission field of the transmitter. In another embodiment, the trigger mechanism of the transmitter circuit may be configured such that each of the one or more video cameras of the image processor are activated at a different time with respect to each other to capture the image data in the transmission field of the transmitter.

At 1408, the image processor may receive the image data including visual patterns corresponding to each of the one or more objects from the one or more cameras. The image processor may capture the visual patterns corresponding to each of the one or more objects within the three-dimensional region of interest of the transmitter, and may transmit the image data to an image processor or other processor of the transmitter. The visual patterns may be selected from a group consisting of points, lines, colors, shape, and letters.

At 1410, the image processor or other processor of the transmitter may compare the visual patterns corresponding to each of the one or more objects with pre-stored data. The corresponding to each of the one or more objects is compared with the pre-stored data. The pre-stored data includes a list of visual patterns selected from a group consisting of points, lines, colors, shapes, and letters. In an embodiment, the computer vision software of the processor of the transmitter is trained by one or more techniques to perform the comparison of the visual patterns to identify the matching visual patterns. For example, the configuration files having the visual patterns of sample objects may be stored in the pre-stored data in a memory unit of the transmitter. The computer vision software of the processor compares the received visual patterns which may be in form of pixels with the configuration files of the sample object stored in the memory unit.

At 1412, the image processor or other processor of the transmitter may identify objects based on comparison result and determine location of identified objects. In an embodiment, the processor is configured to identify objects from the one or more objects when their corresponding one or more visual patterns matches with one or more visual patterns in the list of visual patterns in the pre-stored data. In another embodiment, the processor is configured to identify each of the one or more objects when their corresponding one or more visual patterns matches with one or more visual patterns in the list of visual patterns in the pre-stored data. In one example, the identified objects may correspond to receivers. In another example, the identified objects may correspond to electronic devices having an integrated receiver unit. In yet another example, the identified objects may correspond to humans or other sensitive objects.

After identifying the objects, the processor is further configured to determine the location of the identified objects. In one example, the processor is configured to receive two-dimensional coordinates of the identified objects from the cameras. In another example, the processor is configured to determine the two-dimensional coordinates of the identified objects based on pixels of the identified objects in the capture image received by the image captured unit. The processor is further configured to determine a third dimension coordinate for each of the identified objects using the transmitter as a frame of reference for each of the identified objects to generate three-dimensional coordinates of each the identified objects based on the two-dimensional coordinates (e.g., from cameras) and the third dimension coordinate (e.g., from a sensor) that correspond to the location of each of identified objects.

At step 1414, an antenna controlling processor or other processor of the transmitter may control transmission of power waves by the transmitter based on the location of objects identified by the same or different processor of the transmitter. In an embodiment, a processor of the transmitter may report the X, Y, Z coordinates of the identified objects that are recognized as the receiver unit to an antennas of the transmitter. Based on the received coordinates of the receiver unit, a processor of the antennas or the processor may instruct the transmitter or other components of the wireless power transmission system to execute various actions based upon the identified position of the receiver unit. The processor of the antennas or the processor of the transmitter may also receive data from one or more internal sensors, one or more external sensors, and heat mapping data regarding the location of the receiver unit. The processor of the antennas or the processor of the transmitter may then compare the location data provided by the one or more internal sensors, the one or more external sensors, and the heat mapping data with the determined location (X, Y, Z coordinates) of the identified object recognized as the receiver unit.

In one embodiment, based on the position of the identified receiver unit, the processor of the antennas or the processor of the transmitter may select a waveform (e.g., radio frequency waves, ultrasound waves) to be generated by a waveform generator of the wireless power transmission system that create an optimal pocket of energy for powering the identified receiver unit. For example, based on a first position of the receiver unit, the processor of the antennas or the processor of the transmitter may select chirp waves for transmission, and based on a second position of the receiver unit, the processor of the antennas or the processor of the transmitter may select sine waves for transmission. The processor of the antennas or the processor of the transmitter may select the chirp waves since the frequency of the chirp waves continuously and/or periodically increases or decreases with time, and the first position of the receiver unit may suggest signal parameters that do not have a fixed frequency over a period of time.

In another embodiment, based on the position of the identified receiver unit, the processor of the antennas or the processor of the transmitter may adjust spacing of antennas in the antennas that create an optimal pocket of energy for powering the identified receiver unit. For example, the antennas may include one or more antenna arrays. Each of the one or more antenna arrays may include one or more antennas to transmit one or more power waves. The spacing of antennas of the one or more antennas with respect to each other may be adjusted such that the one or more power waves transmitted by the plurality of antennas are directed to form the pocket of energy to power the identified receiver unit.

In yet another embodiment, the antennas may include a timing circuit. Based on the position of the identified receiver unit, the processor of the antennas or the processor of the transmitter may control the timing circuit such that the one or more antennas of each of the one or more antenna arrays are configured to transmit the one or more power waves at a different time from each other based on the position of the identified receiver unit. The timing circuit may also be used to select a different transmission time for each of the one or more antennas. In one example, the processor of the antennas or the processor of the transmitter may pre-configure the timing circuit with the timing of transmission of the one or more transmission waves from each of the one or more antennas. In another example, based on X, Y, Z coordinate calculated of the given object that is recognized as the receiver unit, the processor of the antennas or the processor of the transmitter may delay the transmission of few transmission waves from few antennas of the one or more antennas. In yet another example, based on the comparison result of the image data received from the image processor and the information received from the one or more internal sensors, the one or more external sensors, and the communication signal, the processor of the antennas or the processor of the transmitter may delay the transmission of few transmission waves from few antennas.

In yet another embodiment, based on the position of the identified receiver unit, the processor of the antennas or the processor of the transmitter may activate a first set of antennas of the one or more antennas for directing the pocket of energy using the one or more power waves at the position of the identified receiver unit. The first set of antennas may be selected from the one or more antennas based on distance between antennas of the first set of antennas that corresponds to the desired spacing of the antennas to form the pocket of energy. In other words, the distance selected between antennas of the first set of antennas may be such that the adjacent antennas are preferably far away from each other, and one or more power waves transmitting from the first set of antennas forms the pocket of energy to power the identified receiver unit.

In yet another embodiment, the antennas may include at least two antenna arrays. The at least two antenna arrays comprises a first antenna array and a second antenna array. It should be noted that for the simplicity of explanation only the antennas with the first antenna array and the second antenna array is being described, however more than two antenna arrays may be included in the antennas without moving out from the scope of the disclosed embodiments. Each of the first antenna array and the second antenna array may include one or more rows and one or more columns of antennas configured to transmit one or more power waves. The distance between the first antenna array and the second antenna array may be dynamically adjusted, by the processor of the antennas or the processor of the transmitter, depending on the location of the identified receiver unit such that the one or more power waves transmitted by antennas of the first antenna array and the second antenna array are directed to form the pocket of energy at the targeted receiver unit.

Figure 15:
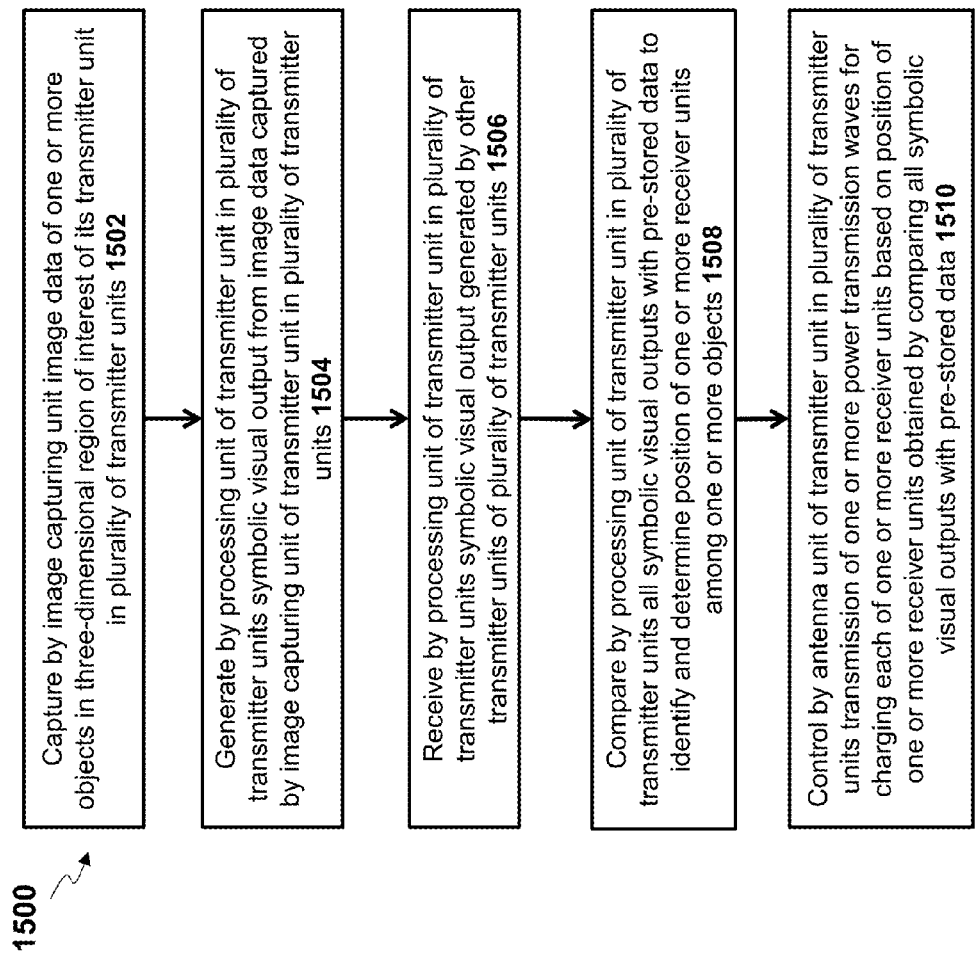
FIG. 15 is a flow diagram illustrating a method of identifying objects within a transmission field of one or more transmitters of a plurality of transmitters of a wireless power transmission system, according to an exemplary embodiment.

FIG. 15 is a flow diagram illustrating a method of identifying objects within a transmission field of one or more transmitters of a plurality of transmitters of a wireless power transmission system, according to an exemplary embodiment.

At step 1502, one or more cameras coupled to a transmitter may capture image data of one or more objects in a three-dimensional region of interest of a transmitter that is part of a plurality of transmitters. Each of the transmitters may include a processor, such as an image processor, configured to view the three-dimensional region of interest of the respective transmitter. The image processor may control or otherwise manage one or more video cameras. The one or more video cameras may include, but are not limited to, infrared cameras, thermal cameras, and visible light cameras, among others.

In some embodiments, a transmitter may include a single video camera. In some embodiments, the transmitter may include an array of video cameras. The array of video cameras are positioned for viewing a region of interest of the transmitter. The region of interest correspond to some portion, or all of, a transmission field (or transmission field area) of the transmitter. In some cases, the region of interest may stretch beyond the scope of the transmission field, so that the transmitter may identify objects before entering the transmission field. The array of video cameras may be arranged in a linear array in the transmitter. In an alternate embodiment, the various other spatial arrangements including two-dimensional arrays of video cameras may be used. In some embodiments, such as an exemplary system, the cameras is a component of the transmitter, housed within the transmitter. In some embodiments, the cameras may be external to the transmitter and may communicate, over a wired or wireless connection with one or more transmitters.

As mentioned previously, each of the transmitters may have a transmission field or energy zone where antennas of the respective transmitter may transmit power waves to charge the electronic devices. In some implementations, two or more transmitters may have the same transmission field or energy zone, or portions of the respective transmission fields may overlap. In such implementations, the video cameras of the transmitters having overlapping transmission fields may monitor and capture the image data of some portions of the overlapping regions of the transmission field (transmission area).

At step 1504, one or more processors of the transmitters may generate symbolic data from image data captured by the cameras of the transmitters. An image processor or other processor of a transmitter may capture image data for videos or still images within a three-dimensional region of interest of a transmission field of the transmitter, and may then transmit the image data to an image processor or other processor of the same transsmitter, a different transmitter in the plurality of transmitters, or some central processor of a computing device configured to consume and process image data received from the transmitters. The particular processor receiving and processing the image data may generate symbolic data from the image data.

A processor may include a single processor or a plurality of processors for configuring the transmitter as a multi-processor system. The processor includes suitable logic, circuitry, and interfaces that are operable to execute one or more instructions to perform predetermined operations. The processor can be realized through a number of processor technologies known in the art. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

The processor of the transmitter in the plurality of transmitters may include a computer vision software or any suitable software that is programmed to recognize and locate the position of the one or more objects from the captured images. In other words, the processor of the transmitter processes the captured images using a computer vision software such as but not limited to MATLAB or OpenCV. The software comprises programs configured to report X, Y, and, Z coordinates of every pixel in the captured images.

In order to recognize the one or more objects, the image data may be processed to generate the symbolic visual data. In one embodiment, the symbolic data may include a temperature value of each of the one or more objects in the image data. The symbolic data may also include data related to number of the one or more objects, three-dimensional (XYZ) coordinates of the one or more objects, motion status of the one or more objects, and size of the one or more objects.

At step 1506, a processor of a transmitter in the plurality of transmitters may receive the symbolic data generated by other transmitters of the plurality of transmitters or by a computing device coupled to the transmitters.

At step 1508, the processor of the transmitter may compare the symbolic data with pre-stored data to identify and determine position of one or more receivers among the one or more objects. The processor of each of the transmitter may include a computer vision software. The computer vision software of the processor is programmed to detect whether objects, such as person or furniture, enter a predetermined proximity of the transmitter, the receiver unit, the power waves, and/or a pocket of energy (energy pocket).

At step 1510, in one configuration, the processor may then instruct the antennas of the transmitter or other components of the system to execute various actions based upon the detected objects. For example, the processor may control the transmission of one or more power transmission waves for charging each of the one or more receivers based on position of the one or more receivers obtained by comparing all the symbolic data with pre-stored data.

In another configuration, the processor may transmit the image data to the antennas of the transmitter, and the processor of the antennas of the transmitter may determine which actions to execute (e.g., adjust a pocket of energy, cease power wave transmission, reduce power wave transmission). In one example, after the computer vision software of the processor identifies that a person has entered the transmission field of transmitted unit, and then determines that the person is within the predetermined proximity of the transmitter, the computer vision software of the processor could provide the relevant image data to the transmitter, causing the transmitter to reduce or terminate transmission of the power waves. In another example, after identifying the person entering the transmission field and then determining that the person has come within the predetermined proximity of the pocket of energy, the computer vision software of the processor may provide the image data to the antennas of the transmitter that causes the antennas to adjust the characteristics of the power waves, to diminish the amount of energy concentrated at the pocket of energy, generate a null, and/or reposition the location of the pocket energy.

In yet another example, the system may comprise an alarm device, which may produce a warning, and/or may generate and transmit a digital message to a system log or administrative computing device configured to administer the system. In this example, after the computer vision software of the processor detects the person entering the predetermined proximity of the transmitter, the power wave, and/or pocket of energy, or otherwise detects other unsafe or prohibited conditions of system, a signal may be generated and transmitted to the alarm device, which may activate the warning, and/or generate and transmit a notification to the administrator device. A warning produced by the alarm may comprise any type of sensory feedback, such as audio feedback, visual feedback, haptic feedback, or some combination.

In some embodiments, the cameras may be a component of the transmitter, housed within the transmitter. In some embodiments, the cameras may be external to the transmitter and may communicate, over a wired or wireless connection, the image data to one or more transmitters. The cameras, which may be external to one or more transmitters or part of a single transmitter, may provide the image data to the plurality of transmitters, and the processors of the plurality of transmitters may then share this image data with a central processor to determine the appropriate formulation and transmission of the power waves. Similarly, in some embodiments, multiple image processors may share the image data with multiple transmitters. In such embodiments, the cameras or host transmitters may send and receive the image data with other image processors or host transmitters in the system.

In one example of the exemplary system, a first transmitter may comprise a first cameras that captures image data, which may be stored on the first transmitter and/or a memory. The system may also have a second transmitter comprising a second cameras that captures the image data, which may be stored on the second transmitter and/or the memory of the system. In this example, both of the transmitters may comprise processors that may receive the image data from the first and second cameras, and thus, the image data captured by the respective first and second cameras may be shared among the respective first and second transmitters. The processors of each of the first and second transmitters may then use the shared image data to then determine the characteristics for generating and transmitting power waves, which may include determining whether to transmit power waves when a sensitive object such as a human is detected.

To enable the transmitter, to detect and confirm objects that the user wishes to exclude from receipt of wireless energy (i.e., power waves, pocket of energy), the user may communicate to the transmitter pre-stored data to be recorded in the memory unit of the transmitter. For example, the user may provide pre-stored data via a user device in communication with the processor of the transmitter via a graphical user interface (GUI) of the user device.

In some embodiments, tags may be assigned to particular objects and/or locations within a transmission field. During a tagging process, tagging data may be generated and stored into as the pre-stored data, and may inform the transmitter about how the transmitter should be behave with regards to specific objects or locations in the transmission field. The tagging data generated during a tagging process may inform transmitters whether to transmit power waves to an object or location, and/or where within a transmission field to transmit power waves or generate pocket of energy. For example, a record for a location in the pre-stored data may be updated or generated with the tagging data instructing the transmitter to never transmit power waves to the particular location. Likewise, in another example, tagging data may be populated into a record for a location, instructing the transmitter to always transmit power waves to that location.

In some implementations, the cameras may view sensitive objects within a transmission field that have been predetermined or "tagged" as being sensitive. In some cases, it may be desirable to avoid particular obstacles in the transmission field, such as furniture or walls, regardless of whether the cameras has identified a person or other sensitive object, entering within proximity to the particular obstacle. As such, an internal or external memory may store pre-stored data identifying the particular location of the particular obstacle, thereby effectively "tagging" the location of the particular location as being off-limits to the power waves. Additionally or alternatively, the particular object may be digitally or physically associated with a digital or physical tag that produces a signal or physical manifestation (e.g. heat-signature) detectable by the cameras of the transmitter. For example, as part of generating image data for the transmitter, the cameras may access an internal memory that stores pre-stored data comprising records of tagged obstacles to avoid, such as a table. In this example, the cameras would detect the table as a tagged obstacle, and generate the image data that causes the transmitters to reduce the amount of energy provided by the power waves where table is located, terminate the power waves being sent to the table, or redirect the power waves. Additionally or alternatively, in some implementations, the cameras may detect electrical devices that have been tagged (i.e., previously recorded in an internal memory or external memory) to receive wireless power waves.

Figure 16:
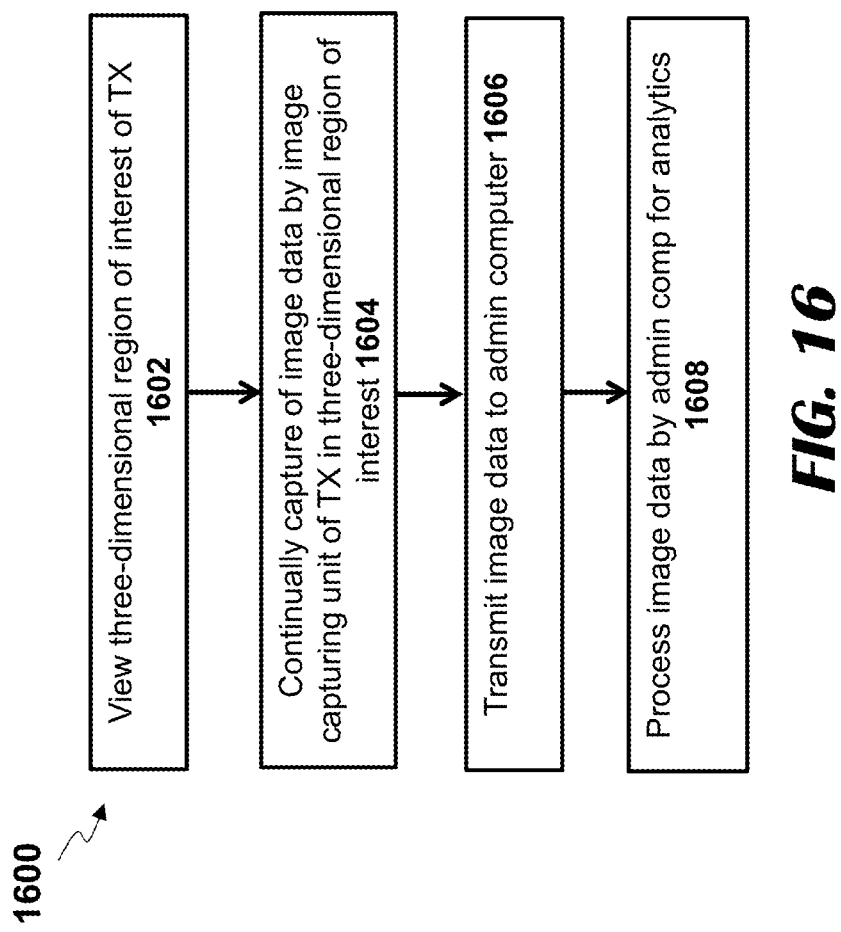
FIG. 16 is a flow diagram illustrating a method of identifying objects within a transmission field of a transmitter of a wireless power transmission system, according to an exemplary embodiment.

FIG. 16 is a flow diagram illustrating a method of identifying objects within a transmission field of a transmitter of a wireless power transmission system, according to an exemplary embodiment.

At step 1602, cameras and/or sensors coupled to a transmitter may capture location data for objects and/or receivers within a three-dimensional region of interest of a transmitter, such as the transmission field of the transmitter and/or some region beyond the transmission field. The transmitter may include an cameras that is configured to view the three-dimensional region of interest of the transmitter. The cameras may include one or more video cameras. The one or more video cameras may include but not limited to infrared cameras, thermal cameras, and visible light cameras.

In some embodiments, the transmitter may include a single video camera. In another embodiment, the transmitter may include an array of video cameras of same or different types, such as infrared cameras, thermal cameras, and visible light cameras, among others. The array of video cameras may be positioned for viewing a region of interest of the transmitter. In some cases, the region of interest corresponds to a transmission field (or transmission field area) of the transmitter. The array of video cameras may be arranged in a linear array in the transmitter. In an alternate embodiment, the various other spatial arrangements including two-dimensional arrays of video cameras may be used.

In some embodiments, such as an exemplary system, the cameras may be a component of the transmitter, housed within the transmitter. In some embodiments, the cameras may be external to the transmitter and may communicate, over a wired or wireless connection with one or more transmitters.

At step 1604, an image processor controlling operations of the one or more cameras of the transmitter may continuously and/or periodically capture image data of objects within the three-dimensional region of interest of the transmission field of the transmitter. In some implementations, the image processor of the transmitter may have a triggering mechanism for capturing a set of one or more image frames containing image data of one or more regions within the transmission field by the one or more video cameras. The triggering mechanism may have a central clock signal and an optional signal delivery unit. The central clock signal is delivered via the signal delivery unit to the one or more video cameras. In another embodiment, it is also possible to deliver the central clock signal directly to the one or more video cameras either by a physical connection or by a wireless connection. In other embodiments, the one or more video cameras may have their own internal synchronized clocks.

In one embodiment, the trigger mechanism of the transmitter circuit may be configured such that each of the one or more video cameras of the image processor continuously and/or periodically capture the image data, video data, and audio data in the transmission field of the transmitter. In another embodiment, the trigger mechanism of the transmitter circuit may be configured such that each of the one or more video cameras of the image processor are activated at a different time with respect to each other to capture the image data in the transmission field of the transmitter.

The image data captured by the one or more video cameras of the image processor may include images/frame capturing one or more objects within the transmission field of the transmitter. The one or more objects may include electronic devices such as cell phones, laptops, humans, animals, furniture such as chairs, receivers embedded within the electronic devices, and receivers as individual components.

In one embodiment, the cameras may include a pair of thermal infrared cameras that are configured to recognize an object such as the human based on the body temperature of the humans. The pair of the thermal infrared cameras transmit the image data to a computer vision software of a processor of the transmitter, and then the computer vision software perform the mapping between the image data collected from the two thermal infrared cameras to provide depth perception of the objects from the location of the transmitter. In another embodiment, the cameras may include a pair of visual cameras that are configured to recognize the objects such as the human based on the pixels. The pixels in the image data captured by the pair of the visual cameras may represent a frequency of visual light which may be scaled to a thermal scale such as Fahrenheit and Celsius.

At step 1606, a processor of the transmitter may transmit the image data to an administrative computer or other central server of the wireless charging system. In some cases, so-called "raw" image data, which may be image data captured directly from a camera before any data processing or analytics have been performed, is sent to the administrative computer for processing. Where a camera is a video camera, the raw image data from the video camera may be received via a data "stream" generated and received from the video camera. One having skill in the art would appreciate the underlying technologies used for generating, compressing, and/or transmitting a data stream for binary data representing a video. One having skill in the art would also appreciate the underlying technologies used for generating, compressing, and/or transmitting independent computing files containing one or more still images (e.g., JPG, PDF, PNG, GIF) or videos (e.g., MP4, GIF, WMV, MOV, AVI).

In another embodiment, a symbolic data of the image data is generated by the processor of the transmitter, and the symbolic data is transmitted to the admin computer. The symbolic data may include X, Y, Z coordinates of the one or more objects within the raw image data, the sizes of the one or more objects, and the velocity of the one or more objects if the one or more objects are moving. In this case, the processor may include a computer vision software that may be programmed to analyze the raw image data and search for object patterns. The stationary objects may be recognized as contiguous BLOBs of pixels of near the same background color or the moving BLOBs of pixels which are contiguous pixels near the same background color that are moving relative to the field of view as well as relative to the background pixels of the field of view. The computer vision software recognizes the BLOBs and then generate the symbolic data that comprises the X, Y, Z coordinates of the center or the centroid of the BLOB, the size of the BLOB in terms of the number of pixels or a percentage of the pixels compared to the field of view, the velocity of the BLOB, and the duration of the visibility of the BLOB in seconds.

At step 1608, the administrative computer or other computing device of the system may process the image data generated and received from the cameras. The image data may be received as the raw image data or the symbolic data generated from the raw image data, or both. The administrative computer may include software that is configured to process the image data. For instance, the software may be programmed to identify, and in some cases differentiate between, "non-receiver" objects, such as sensitive objects (e.g., people), receivers, and objects comprising receivers (e.g., laptops, tablets, smartphones). For example, if a non-receiver object is a human being or an animal within a predetermined threshold proximity to power waves servicing a particular receiver, the administrative computer or computing device may transmit a signal to the appropriate transmitter, instructing the transmitter to reduce the power level of the power waves servicing the receiver, redirect the power waves to a new location, or cease transmitting the power waves altogether. The software, thereby, monitors the non-receiver objects, and when the human or the animal gets near the receiver unit, the admin computer may send a message to the transmitter to change the phases of the antennas that transmit the power waves to reduce the power being transmitter to stay within FCC power absorption limits.

The monitoring of the non-receiver objects by the admin computer of the wireless power transmission system may also be used for security purpose. In one example, if the non-receiver object such as the human is seen in a room when the room is locked up and there shouldn't be anyone in the room, then the administrator of the system can take necessary action. In another example, if the non-receiver object such as the human falls to the floor and is immobile longer than a certain minimum amount of time, then the information about that human such as the length of the human (for instance is it a child of four feet or an adult that's five and a half feet), snap shot of the human lying on the floor, the date and time of when the object first became prone and how long it's been lying on the ground may be used by the administrator of the system to alert authorities to go investigate and see if the fallen person is in medical trouble.

In yet another example, the symbolic data generated from the raw image data may also include information related to the temperature of the non-receiver object such as a person. For example, the person may have a fever and the person's temperature may be recorded as 103 or 104 degree centigrade. The temperature data may be used by the administrator of the system to alert authorities to call a doctor.

In yet another example, the software in the admin computer is programmed to recognize the humans either near the transmitter or near the receiver unit, and then send a message to the transmitter to control the transmitted power towards the receiver unit based on proximity of the human to the receiver unit or the transmitter. Also, the transmitter may be shut down by the administrator of the system within a specific maximum amount of time from detection of the human nearby the receiver unit or the transmitter.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A system for wireless power transmission comprising:
   a radio frequency wireless power transmitter that is in communication with a video camera for capturing image data of at least a portion of a transmission field of the radio frequency wireless power transmitter, wherein the image data comprises a visual pattern; and
   a processor of the radio frequency wireless power transmitter configured to:
      identify an object when the visual pattern matches a pre-stored visual pattern representing the object; and
      control transmission of one or more radio frequency power transmission waves to a receiving electronic device based on a location of the identified object, wherein the receiving electronic device uses the one or more radio frequency power transmission waves to power or to charge the receiving electronic device.

2. The system of claim 1, wherein the video camera is selected from a group consisting of infrared cameras, thermal cameras, and visible light cameras.

3. The system of claim 1, wherein the video camera is an integral component of the transmitter.

4. The system of claim 1, wherein the pre-stored visual pattern includes one or more of: points, lines, colors, shape, and letters.

5. The system of claim 1, further comprising an additional video camera, and a trigger unit for triggering capture of image data by the video camera and the additional video cameras in a sequence by a central clock signal generated by the trigger unit.

6. The system of claim 5, wherein the video camera and the additional video camera have their own synchronized clocks.

7. The system of claim 1, wherein the processor is further configured to receive two-dimensional coordinates of the identified object from the video camera.

8. The system of claim 7, wherein the processor is further configured to create a third dimension coordinate for the identified object based on the two-dimensional coordinates and wherein the transmitter is used as a frame of reference for the identified object to generate three-dimensional coordinates of the identified object.

9. The system of claim 1, wherein the identified object corresponds to a receiver.

10. The system of claim 1, wherein the identified object corresponds to a living being.

11. A computer-implemented method for wireless power transmission comprising:
   generating, by a video camera of a radio frequency wireless power transmitter that is in communication with the video camera, image data of at least a portion of a transmission field of the radio frequency wireless power transmitter, wherein the image data comprises a visual pattern;
   identifying, by a processor of the radio frequency wireless power transmitter, an object when the visual pattern matches a pre-stored visual pattern representing the object; and
   controlling, by the processor, transmission of one or more radio frequency power transmission waves to a receiving electronic device based on a location of the identified object, wherein the receiving electronic device uses the one or more radio frequency power transmission waves to power or to charge the receiving electronic device.

12. The computer-implemented method of claim 11, wherein the video camera is selected from a group consisting of infrared cameras, thermal cameras, and visible light cameras.

13. The computer-implemented method of claim 11, wherein the video camera is an integral component of the transmitter.

14. The computer-implemented method of claim 11, wherein the pre-stored visual pattern includes one or more of: points, lines, colors, shape, and letters.

15. The computer-implemented method of claim 11, further comprising triggering, by a trigger unit of the transmitter, the capture of the image data by one or more video cameras, wherein the one or more video cameras are triggered in a sequence by a central clock signal generated by the trigger unit.

16. The computer-implemented method of claim 15, wherein each of the one or more video cameras have their own synchronized clocks.

17. The computer-implemented method of claim 15, further comprising receiving, by the processor, two-dimensional coordinates of the identified object from the video camera.

18. The computer-implemented method of claim 17, further comprising creating, by the processor, a third dimension coordinate for the identified object based on the two-dimensional coordinates, wherein the transmitter is used as a frame of reference for the identified object to generate three-dimensional coordinates of the identified object.

19. The computer-implemented method of claim 15, wherein the identified object corresponds to a receiver.

20. The computer-implemented method of claim 15, wherein the identified object corresponds to a living being.

* * * * *

UNITED STATES PATENT AND TRADEMARK OFFICE
CERTIFICATE OF CORRECTION

| | |
|---|---|
| PATENT NO. | : 10,291,056 B2 |
| APPLICATION NO. | : 15/053292 |
| DATED | : May 14, 2019 |
| INVENTOR(S) | : Bell et al. |

It is certified that error appears in the above-identified patent and that said Letters Patent is hereby corrected as shown below:

On the Title Page

The ABSTRACT, please delete in its entirety and insert:
--Systems and methods for wireless power transmission based on object identification are provided. A radio frequency wireless power transmitter is in communication with a video camera for capturing image data (e.g., a visual pattern) of at least a portion of a transmission field of the radio frequency wireless power transmitter. A processor of the radio frequency wireless power transmitter is configured to identify an object when the visual pattern matches a pre-stored visual pattern representing the object, and control transmission of one or more radio frequency power transmission waves to a receiving electronic device based on a location of the identified object, wherein the receiving electronic device uses the one or more radio frequency power transmission waves to power or to charge the receiving electronic device.--.

Signed and Sealed this
Thirtieth Day of July, 2019

Andrei Iancu
*Director of the United States Patent and Trademark Office*